US011482045B1

(12) United States Patent
Kim et al.

(10) Patent No.: US 11,482,045 B1
(45) Date of Patent: Oct. 25, 2022

(54) ASSOCIATING EVENTS WITH ACTORS USING DIGITAL IMAGERY AND MACHINE LEARNING

(71) Applicant: Amazon Technologies, Inc., Seattle, WA (US)

(72) Inventors: Jaechul Kim, Seattle, WA (US); Nishitkumar Ashokkumar Desai, Redmond, WA (US); Jayakrishnan Kumar Eledath, Kenmore, WA (US); Kartik Muktinutalapati, Redmond, WA (US); Shaonan Zhang, Redmond, WA (US); Hoi Cheung Pang, Bellevue, WA (US); Dilip Kumar, Seattle, WA (US); Kushagra Srivastava, Issaquah, WA (US); Gerard Guy Medioni, Seattle, WA (US); Daniel Bibireata, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/799,502

(22) Filed: Feb. 24, 2020

Related U.S. Application Data

(63) Continuation-in-part of application No. 16/712,914, filed on Dec. 12, 2019, which is a
(Continued)

(51) Int. Cl.
*G06K 9/00* (2006.01)
*G06V 40/20* (2022.01)
(Continued)

(52) U.S. Cl.
CPC .............. *G06V 40/20* (2022.01); *G06F 17/16* (2013.01); *G06K 9/6221* (2013.01); *G06N 3/08* (2013.01);
(Continued)

(58) Field of Classification Search
None
See application file for complete search history.

(56) References Cited

U.S. PATENT DOCUMENTS 6,154,559 A  11/2000 Beardsley
7,050,624 B2  5/2006 Dialameh et al.
(Continued)

FOREIGN PATENT DOCUMENTS

CN  104778690 B  6/2017
EP  1574986 B1  7/2008
(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
(Continued)

*Primary Examiner* — Leon Viet Q Nguyen
(74) *Attorney, Agent, or Firm* — Athorus, PLLC

(57) ABSTRACT

Where an event is determined to have occurred at a location within a vicinity of a plurality of actors, imaging data captured using cameras having the location is processed using one or more machine learning systems or techniques operating on the cameras to determine which of the actors is most likely associated with the event. For each relevant pixel of each image captured by a camera, the camera returns a set of vectors extending to pixels of body parts of actors who are most likely to have been involved with an event occurring at the relevant pixel, along with a measure of confidence in the respective vectors. A server receives the vectors from the cameras, determines which of the images depicted the event
(Continued)

in a favorable view, based at least in part on the quality of such images, and selects one of the actors as associated with the event accordingly.

22 Claims, 50 Drawing Sheets

Related U.S. Application Data continuation-in-part of application No. 16/022,221, filed on Jun. 28, 2018.

(51) Int. Cl.
*G06K 9/62* (2022.01)
*G06F 17/16* (2006.01)
*G06Q 30/02* (2012.01)
*G06N 3/08* (2006.01)
*G06N 20/00* (2019.01)
*G06V 20/10* (2022.01)
*G06V 20/52* (2022.01)

(52) U.S. Cl.
CPC ......... *G06N 20/00* (2019.01); *G06Q 30/0201* (2013.01); *G06V 20/10* (2022.01); *G06V 20/52* (2022.01)

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,285,060 B2 | 10/2012 | Cobb et al. | |
| 8,369,622 B1 | 2/2013 | Hsu et al. | |
| 8,423,431 B1 | 4/2013 | Rouaix et al. | |
| RE44,225 E | 5/2013 | Aviv | |
| 8,577,705 B1 | 11/2013 | Baboo et al. | |
| 8,630,924 B2 | 1/2014 | Groenevelt et al. | |
| 8,688,598 B1 | 4/2014 | Shakes et al. | |
| 8,943,441 B1 | 1/2015 | Patrick et al. | |
| 9,158,974 B1 | 10/2015 | Laska et al. | |
| 9,160,979 B1 | 10/2015 | Ulmer | |
| 9,208,675 B2 | 12/2015 | Xu et al. | |
| 9,449,233 B2 | 9/2016 | Taylor | |
| 9,473,747 B2 | 10/2016 | Kobres et al. | |
| 9,536,177 B2 | 1/2017 | Chalasani et al. | |
| 9,582,891 B2 | 2/2017 | Geiger et al. | |
| 9,727,838 B2 | 8/2017 | Campbell | |
| 9,846,840 B1 | 12/2017 | Lin et al. | |
| 9,881,221 B2 | 1/2018 | Bala et al. | |
| 9,898,677 B1 | 2/2018 | An jelkovic et al. | |
| 9,911,290 B1* | 3/2018 | Zalewski | G06Q 20/327 |
| 10,055,853 B1 | 8/2018 | Fisher et al. | |
| 10,133,933 B1* | 11/2018 | Fisher | H04N 5/247 |
| 10,192,415 B2 | 1/2019 | Heitz et al. | |
| 10,635,844 B1 | 4/2020 | Roose et al. | |
| 11,030,442 B1 | 6/2021 | Bergamo et al. | |
| 2003/0002712 A1 | 1/2003 | Steenburgh et al. | |
| 2003/0002717 A1 | 1/2003 | Hamid | |
| 2003/0107649 A1 | 6/2003 | Flickner et al. | |
| 2003/0128337 A1 | 7/2003 | Jaynes et al. | |
| 2004/0181467 A1 | 9/2004 | Raiyani et al. | |
| 2005/0251347 A1 | 11/2005 | Perona et al. | |
| 2006/0061583 A1 | 3/2006 | Spooner et al. | |
| 2006/0222206 A1 | 10/2006 | Garoutte | |
| 2007/0092133 A1 | 4/2007 | Luo | |
| 2007/0156625 A1 | 7/2007 | Visel | |
| 2007/0182818 A1 | 8/2007 | Buehler | |
| 2007/0242066 A1 | 10/2007 | Rosenthal | |
| 2007/0276776 A1 | 11/2007 | Sagher et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2008/0137989 A1 | 6/2008 | Ng et al. | |
| 2008/0159634 A1 | 7/2008 | Sharma et al. | |
| 2008/0166019 A1 | 7/2008 | Lee | |
| 2008/0193010 A1 | 8/2008 | Eaton et al. | |
| 2008/0195315 A1 | 8/2008 | Hu et al. | |
| 2009/0060352 A1 | 3/2009 | Distante et al. | |
| 2009/0083815 A1 | 3/2009 | McMaster et al. | |
| 2009/0121017 A1 | 5/2009 | Cato et al. | |
| 2009/0132371 A1 | 5/2009 | Strietzel et al. | |
| 2009/0210367 A1 | 8/2009 | Armstrong et al. | |
| 2009/0245573 A1 | 10/2009 | Saptharishi et al. | |
| 2009/0276705 A1 | 11/2009 | Ozdemir et al. | |
| 2010/0002082 A1 | 1/2010 | Buehler et al. | |
| 2010/0033574 A1 | 2/2010 | Ran et al. | |
| 2011/0011936 A1 | 1/2011 | Morandi et al. | |
| 2011/0205022 A1 | 8/2011 | Cavallaro et al. | |
| 2012/0148103 A1 | 6/2012 | Hampel et al. | |
| 2012/0159290 A1 | 6/2012 | Pulsipher et al. | |
| 2012/0257789 A1 | 10/2012 | Lee et al. | |
| 2012/0284132 A1 | 11/2012 | Kim et al. | |
| 2012/0327220 A1 | 12/2012 | Ma | |
| 2013/0076898 A1 | 3/2013 | Philippe et al. | |
| 2013/0095961 A1 | 4/2013 | Marty et al. | |
| 2013/0156260 A1 | 6/2013 | Craig | |
| 2013/0253700 A1 | 9/2013 | Carson et al. | |
| 2013/0322767 A1 | 12/2013 | Chao et al. | |
| 2014/0139633 A1 | 5/2014 | Wang et al. | |
| 2014/0139655 A1 | 5/2014 | Mimar | |
| 2014/0259056 A1 | 9/2014 | Grusd | |
| 2014/0279294 A1 | 9/2014 | Field-Darragh et al. | |
| 2014/0282162 A1 | 9/2014 | Fein et al. | |
| 2014/0334675 A1 | 11/2014 | Chu et al. | |
| 2014/0362195 A1 | 12/2014 | Ng-Thow-Hing et al. | |
| 2014/0362223 A1 | 12/2014 | LaCroix et al. | |
| 2014/0379296 A1 | 12/2014 | Nathan et al. | |
| 2015/0019391 A1* | 1/2015 | Kumar | G06Q 10/087 |
| | | | 705/28 |
| 2015/0039458 A1 | 2/2015 | Reid | |
| 2015/0073907 A1 | 3/2015 | Purves et al. | |
| 2015/0131851 A1 | 5/2015 | Bemal et al. | |
| 2015/0206188 A1 | 7/2015 | Tanigawa et al. | |
| 2015/0262116 A1 | 9/2015 | Katircioglu et al. | |
| 2015/0269143 A1 | 9/2015 | Park et al. | |
| 2015/0294483 A1 | 10/2015 | Wells et al. | |
| 2016/0003636 A1 | 1/2016 | Ng-Thow-Hing et al. | |
| 2016/0125245 A1 | 5/2016 | Saitwal et al. | |
| 2016/0127641 A1 | 5/2016 | Gove | |
| 2016/0292881 A1 | 10/2016 | Bose et al. | |
| 2016/0307335 A1 | 10/2016 | Perry et al. | |
| 2017/0116473 A1 | 4/2017 | Sashida et al. | |
| 2017/0206669 A1 | 7/2017 | Saleemi et al. | |
| 2017/0262994 A1 | 9/2017 | Kudriashov et al. | |
| 2017/0278255 A1 | 9/2017 | Shingu et al. | |
| 2017/0309136 A1 | 10/2017 | Schoner | |
| 2017/0323376 A1 | 11/2017 | Glaser et al. | |
| 2017/0345165 A1 | 11/2017 | Stanhill et al. | |
| 2017/0353661 A1 | 12/2017 | Kawamura | |
| 2018/0025175 A1 | 1/2018 | Kato | |
| 2018/0070056 A1 | 3/2018 | DeAngelis et al. | |
| 2018/0084242 A1 | 3/2018 | Rublee et al. | |
| 2018/0164103 A1 | 6/2018 | Hill | |
| 2018/0165728 A1 | 6/2018 | McDonald et al. | |
| 2018/0218515 A1 | 8/2018 | Terekhov et al. | |
| 2018/0315329 A1 | 11/2018 | D'Amato et al. | |
| 2018/0343442 A1 | 11/2018 | Yoshikawa et al. | |
| 2019/0102044 A1 | 4/2019 | Wang et al. | |
| 2019/0156277 A1* | 5/2019 | Fisher | G06K 9/00375 |
| 2019/0158801 A1 | 5/2019 | Matsubayashi | |
| 2019/0315329 A1 | 10/2019 | Adamski et al. | |
| 2020/0005490 A1 | 1/2020 | Paik et al. | |
| 2020/0043086 A1* | 2/2020 | Sorensen | G06Q 30/0639 |
| 2020/0090484 A1 | 3/2020 | Chen et al. | |

(56) References Cited

U.S. PATENT DOCUMENTS

| | | | |
|---|---|---|---|
| 2020/0381111 A1 | 12/2020 | Huang et al. | |
| 2021/0019914 A1 | 1/2021 | Lipchin et al. | |

FOREIGN PATENT DOCUMENTS

| | | | |
|---|---|---|---|
| JP | 2013196199 A | 9/2013 | |
| JP | 201489626 A | 5/2014 | |
| JP | 2018207336 A | 12/2018 | |
| JP | 2019018743 A | 2/2019 | |
| JP | 2019096996 A | 6/2019 | |
| KR | 20170006097 A | 1/2017 | |
| WO | 0021021 A1 | 4/2000 | |
| WO | 02059836 A2 | 8/2002 | |
| WO | 2017151241 A2 | 9/2017 | |

OTHER PUBLICATIONS

Ciplak G, Telceken S., "Moving Object Tracking Within Surveillance Video Sequences Based on EDContours," 2015 9th International Conference on Electrical and Electronics Engineering (ELECO), Nov. 26, 2015 (pp. 720-723). IEEE.

Cristian Pop, "Introduction to the BodyCom Technology", Microchip AN1391, May 2, 2011, pp. 1-24, vol. AN1391, No. DS01391A, Publisher: 2011 Microchip Technology Inc.

Fuentes et al., "People tracking in surveillance applications," Proceedings 2nd IEEE Int. Workshop on PETS, Kauai, Hawaii, USA, Dec. 9, 2001, 6 pages.

Manocha et al., "Object Tracking Techniques for Video Tracking: A Survey," The International Journal of Engineering and Science (IJES), vol. 3, Issue 6, pp. 25-29, 2014.

Phalke K, Hegadi R., "Pixel Based Object Tracking," 2015 2nd International Conference on Signal Processing and Integrated Networks (SPIN), Feb. 19, 2015 (pp. 575-578). IEEE.

Sikdar A, Zheng YF, Xuan D., "Robust Object Tracking in the X-Z Domain," 2016 IEEE International Conference on Multisensor Fusion and Integration for Intelligent Systems (MFI), Sep. 19, 2016 (pp. 499-504). IEEE.

Black, J. et al., "Multi View Image Surveillance and Tracking," IEEE Proceedings of the Workshop on Motion and Video Computing, 2002, https://www.researchgate.net/publication/4004539_Multi_view_image_surveillance_and_tracking/link/0c96051ac521f09b5b000000/download, pp. 1-6.

Harville, M.,"Stereo Person Tracking with Adaptive Plan-View Templates of Height and Occupancy Statistics," Image and Vision Computing, vol. 22, Issue 2, Feb. 1, 2004, https://www.researchgate.net/publication/223214495_Stereo_person_tracking_with_adaptive_plan-view_templates_of_height_and_occupancy_statistics/link/5e294888a6fdcc70a1437262/download, pp. 127-142.

Huang, K. S. et al. "Driver's View and Vehicle Surround Estimation Using Omnidirectional Video Stream," IEEE IV2003 Intelligent Vehicles Symposium. Proceedings (Cal. No. 03TH8683), Jun. 9-11, 2003, http://cvrr.ucsd.edu/VOW2/papers/IV03DrView_Final_Header.pdf, pp. 444-449.

Longuet-Higgins, H.C., "A Computer Algorithm for Reconstructing a Scene from Two Projections," Nature 293, Sep. 10, 1981, https://cseweb.ucsd.edu/classes/fa01/cse291/hclh/SceneReconstruction.pdf, pp. 133-135.

Rossi, M. and Bozzoli, E.A., "Tracking and Counting Moving People," IEEE Int'l Conf. on Image Processing, ICIP-94, Nov. 13-16, 1994, http://citeseerx.ist.psu.edu/viewdoc/download;sessionid=463D09F419FA5595DBF9DEF30D7EC663?doi=10.1.1.331.6672&rep=rep1&type=pdf, 5 pages.

Vincze, M., "Robust Tracking of Ellipses at Frame Rate," Pattern Recognition, vol. 34, Issue 2, Feb. 2001, pp. 487-498.

Zhang, Z., "A Flexible New Technique for Camera Calibration," IEEE Transactions on Pattern Analysis and Machine Intelligence, vol. 22, No. 11, Nov. 2000, 5 pages.

Zhang, Z., "A Flexible New Technique for Camera Calibration," Technical Report MSR-TR-98-71, Microsoft Research, Microsoft Corporation, microsoft.com/en-us/research/wp-content/uploads/2016/02/tr98-71.pdf, 22 pages.

Lee, K. and Kacorri, H., (May 2019), "Hands Holding Clues for Object Recognition in Teachable Machines", In Proceedings of the 2019 CHI Conference on Human Factors in Computing Systems (pp. 1-12).

Liu, C., et al. "Accelerating Vanishing Point-Based Line Sampling Scheme for Real-Time People Localization", IEEE Transactions on Circuits and Systems for Video Technology. vol 27. No. Mar. 3, 2017 (Year: 2017).

Grinciunaite, A., et al., "Human Pose Estimation in Space and Time Using 3D CNN," ECCV Workshop on Brave New Ideas for Motion Representations in Videos, Oct. 19, 2016, URL: https://arxiv.org/pdf/1609.00036.pdf, 7 pages.

He, K., et al., "Identity Mappings in Deep Residual Networks," ECCV 2016 Camera-Ready, URL: https://arxiv.org/odf/1603.05027.pdf, Jul. 25, 2016, 15 pages.

Redmon, J., et al., "You Only Look Once: Unified, Real-Time Object Detection," University of Washington, Allen Institute for Al, Facebook Al Research, URL: https://arxiv.org/pdf/1506.02640.pdf, May 9, 2016, 10 pages.

Redmon, Joseph and Ali Farhadi, "YOLO9000: Better, Faster, Stronger," URL: https://arxiv.org/pdf/1612.08242.pdf, Dec. 25, 2016, 9 pages.

Toshev, Alexander and Christian Szegedy, "DeepPose: Human Pose Estimation via Deep Neural Networks," IEEE Conference on Computer Vision and Pattern Recognition, Aug. 20, 2014, URL: https://arxiv.org/pdf/1312.4659.pdf, 9 pages.

\* cited by examiner

SIDE VIEW IMAGE FROM CAMERA 1

TOP VIEW IMAGE FROM CAMERA 2

SIDE VIEW IMAGE FROM CAMERA 1

TOP VIEW IMAGE FROM CAMERA 2

CALCULATE EVENT-HEAD REGRESSION VECTORS
FOR PIXEL $(P_i)_1$ OF $(P_n) : (x_j, y_j, C_{ij})_1$
WHERE $(x_j, y_j)$ ARE COORDINATES OF
HEAD j OF AN ACTOR AND
$C_{ij}$ IS CONFIDENCE SCORE

CALCULATE HAND-HEAD REGRESSION VECTORS
FOR PIXEL $(P_i)_2$ OF $(P_n)_2$ : $(x_j, y_j, C_{ij})_2$
WHERE $(x_j, y_j)$ ARE COORDINATES OF
HAND j AND $C_{ij}$ IS CONFIDENCE SCORE

US 11,482,045 B1

ASSOCIATING EVENTS WITH ACTORS USING DIGITAL IMAGERY AND MACHINE LEARNING

CROSS-REFERENCE TO RELATED APPLICATIONS

This application is a continuation-in-part of U.S. patent application Ser. No. 16/712,914, filed Dec. 12, 2019, which is a continuation-in-part of U.S. patent application Ser. No. 16/022,221, filed Jun. 28, 2018. The contents of each of these applications are incorporated by reference herein in their entirety.

BACKGROUND

Today, imaging devices such as digital cameras are frequently used for monitoring operations. For example, digital cameras are also often used to monitor the arrivals or departures of goods or the performance of services in materials handling facilities such as warehouses, fulfillment centers, retail establishments or other like facilities. Digital cameras are also used to monitor the travels of persons or objects in locations such as airports, stadiums or other dense environments, or the flow of traffic on one or more sidewalks, roadways or highways. Additionally, digital cameras are commonplace in financial settings such as banks or casinos, where money changes hands in large amounts or at high rates of speed.

A plurality of digital cameras (or other imaging devices) may be provided in a network, and aligned and configured to capture imaging data such as still or moving images of actions or events occurring within their respective fields of view. The digital cameras may include one or more sensors, processors and/or memory components or other data stores. Information regarding the imaging data or the actions or events depicted therein may be subjected to further analysis by one or more of the processors operating on the digital cameras to identify aspects, elements or features of the content expressed therein.

In dynamic environments such as materials handling facilities, transportation centers, financial institutions or like structures in which diverse collections of people, objects or machines enter and exit from such environments at regular or irregular times or on predictable or unpredictable schedules, it is frequently difficult to determine which, if any, of the people, objects or machines is associated with a given event based on imaging data alone. In particular, where the digital cameras of a network each have fixed orientations, or where fields of view of the digital cameras include large numbers of people, objects or machines of varying sizes or shapes or traveling at varying velocities, recognizing and distinguishing between poses of multiple actors may be exceptionally challenging.

DETAILED DESCRIPTION

Figure 1A:
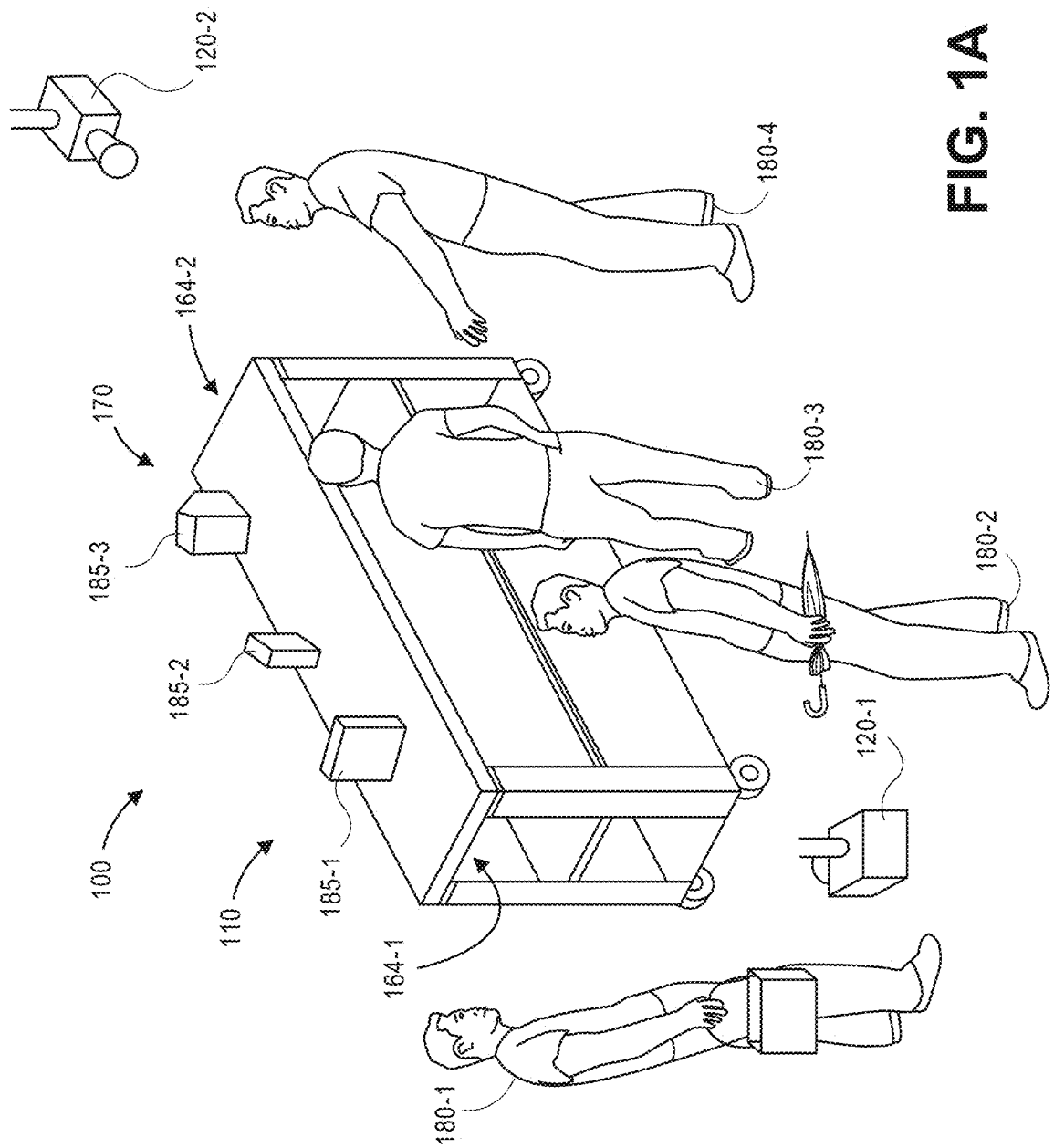
FIGS. 1A through 1J are views of aspects of one system for associating events with actors using digital imagery and machine learning in accordance with implementations of the present disclosure.

As is set forth in greater detail below, the present disclosure is directed to processing digital imagery captured from one or more fields of view to associate events with actors (e.g., users, workers, customers or other personnel), such as one or more actors within a materials handling facility. More specifically, one or more implementations of the present disclosure are directed to imaging devices (e.g., digital cameras) that are configured to capture imaging data and to processing the imaging data using one or more machine learning systems or techniques operating on the imaging devices, or on one or more external devices or systems. The imaging devices may provide imaging data (e.g., images or image frames) as inputs to the machine learning systems or techniques, and determine, for one or more of the pixels of each of an image, which of bodies (or body parts) of actors depicted within the image is most likely associated with an event occurring at that pixel, as well as a confidence level or other metric, e.g., a confidence score (or confidence factor)

representative of that determination, based on outputs received from the machine learning systems. For each relevant pixel of an image, a camera may determine a pair of coordinates of a body part (e.g., a head, a shoulder, a torso, a waist or a foot) of an actor appearing within the image that is most likely associated with an event occurring at that pixel, as well as a level or metric of confidence in the determination, and provide a set of data including records of coordinate pairs and confidence scores for each image to a server.

When an event is determined to have occurred at a location and at a time (or for a duration), the server may determine which of the cameras included the location within their respective fields of view at the time, e.g., based on geometric properties of the fields of view or the scene, or on any other basis, and identify data regarding trajectories, or "tracklets," representative of motion of actors within a vicinity of the location, as well as identifiers of the actors. The server may further determine which of the cameras reliably held the event within their respective fields of view, and which of the cameras did not, and subsequently calculate an overall (or aggregate) confidence score for each of the actors based on the quality of the view of the respective cameras at the time or during the duration of the event. For example, for each potential actor identified in one or more of the images depicting the location at the time or during the duration of the event, a predetermined number (e.g., five) of the highest confidence scores associated with that actor may be summed, averaged or otherwise combined to generate an overall confidence score for each actor. If an overall confidence score for one actor is sufficiently greater than the overall confidence scores for each of the other actors, then that actor is determined to have been associated with the event with a sufficiently high degree of confidence. If the overall confidence scores calculated for two or more people are too close to one another, however, then the actor having the highest confidence score may be identified with a low degree of confidence, or the event may not be associated with any of the actors based on the imaging data, and an alternate determination may be made.

Referring to FIGS. 1A through 1J, views of aspects of one system 100 for associating events with actors using digital imagery and machine learning in accordance with implementations of the present disclosure are shown. As is shown in FIGS. 1A and 1, the system 100 includes a scene 110 such as a materials handling facility, a fulfillment center, a warehouse, or any other like facility. The scene 110 includes a pair of imaging devices 120-1, 120-2 (e.g., digital cameras) and a storage unit 170 (e.g., a set of inventory shelves) having a plurality of load sensors (or weight sensors) 164-1, 164-2 and a plurality of items 185-1, 185-2, 185-3 on the storage unit 170.

Figure 1B:
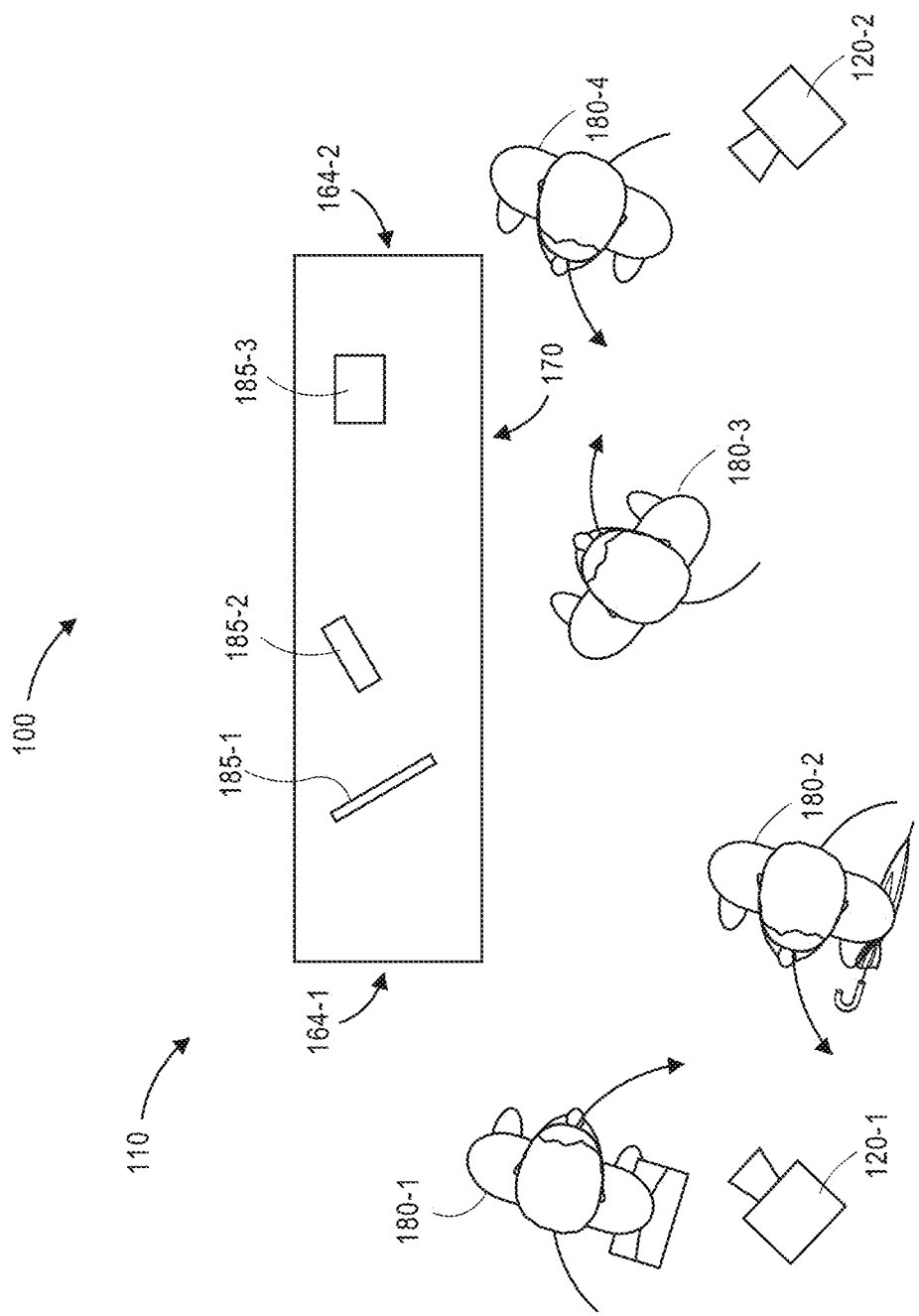

As is shown in FIGS. 1A and 1B, the imaging devices 120-1, 120-2 are aligned with fields of view that overlap at least in part over a portion of the scene 110, and are configured to capture imaging data, such as still or moving images, from the scene 110. The imaging devices 120-1, 120-2 may be installed or otherwise operated independently or as components of an imaging device network (or camera network), and may be in communication with one or more computer devices or systems (not shown), e.g., over one or more computer networks. As is also shown in FIGS. 1A and 1B, the load sensors 164-1, 164-2 may be disposed beneath or otherwise in association with one or more of the shelves of the shelving unit 170, or one or more supports of such shelves, and may also be in communication with one or more computer devices or systems (not shown), e.g., over one or more computer networks, which may further include one or more databases or other data stores having information regarding attributes that are, have been or might be stored on one or more of the shelves of the shelving unit 170. Such attributes may include, but are not limited to, one or more dimensions and/or masses of such items, locations on the shelving unit 170 where such items are typically placed, or colors or textures of surface elements (e.g., packaging, wrapping, coverings or the like) of such items, or any other attributes. In some implementations, discussed below, the system 100 may operate without the use of the load sensors 164-1, 164-2, or any other sensors, and may rely instead on imaging data or other data captured by the imaging devices 120-1, 120-2 to determine whether one or more items have been placed on or removed from the shelving unit 170, or to identify the one or more items.

The scene 110 may be any open or enclosed environment or space in which any number of actors (e.g., humans, other animals or machines) may execute one or more poses, gestures or other actions within the fields of view of the imaging devices 120-1, 120-2, such as actors 180-1, 180-2, 180-3, 180-4 as shown in FIG. 1A. For example, as is shown in FIG. 1B, the actors 180-1, 180-2, 180-3, 180-4 are in motion within a vicinity of the shelving unit 170, and each is partially or entirely within the fields of view of the imaging devices 120-1, 120-2. The locations and/or motion of the actors 180-1, 180-2, 180-3, 180-4 may be detected and tracked, such that a trajectory, or "tracklet," representative of locations or motion of one or more body parts of the actors 180-1, 180-2, 180-3, 180-4 on the scene 110 may be generated based on the presence of such body parts within images captured by a single imaging device, e.g., from a common field of view, or within images captured by multiple imaging devices. The trajectories may be generated over a predetermined number or series of frames (e.g., tens of frames or more), subject to any compatibility or incompatibility parameters or constraints.

The load sensors 164-1, 164-2 may be load cells or other systems that are configured to generate load signals consistent with levels of loading on one or more of the shelves of the storage unit 170, and such signals may be processed to determine weights of items placed thereon, or changes in such weights. Any number of load sensors may be provided in association with the storage unit 170, in various layouts, configurations or positions. For example, in some implementations, load sensors may be provided symmetrically or asymmetrically, with one or more of such sensors provided at front or rear sides of the storage unit 170, or one or more of such sensors provided on left or right sides of the storage unit 170. Additionally, in some implementations, the storage unit 170 may be outfitted generally with one or more sets of such load sensors that may be configured to generate load signals consistent with levels of loading on the storage unit 170 as a whole. Alternatively, in some other implementations, one or more of the shelves of the shelving unit 170 may be respectively outfitted with load sensors that may be configured to generate load signals consistent with levels of loading on each of the respective shelves of the shelving unit.

Figure 1C:
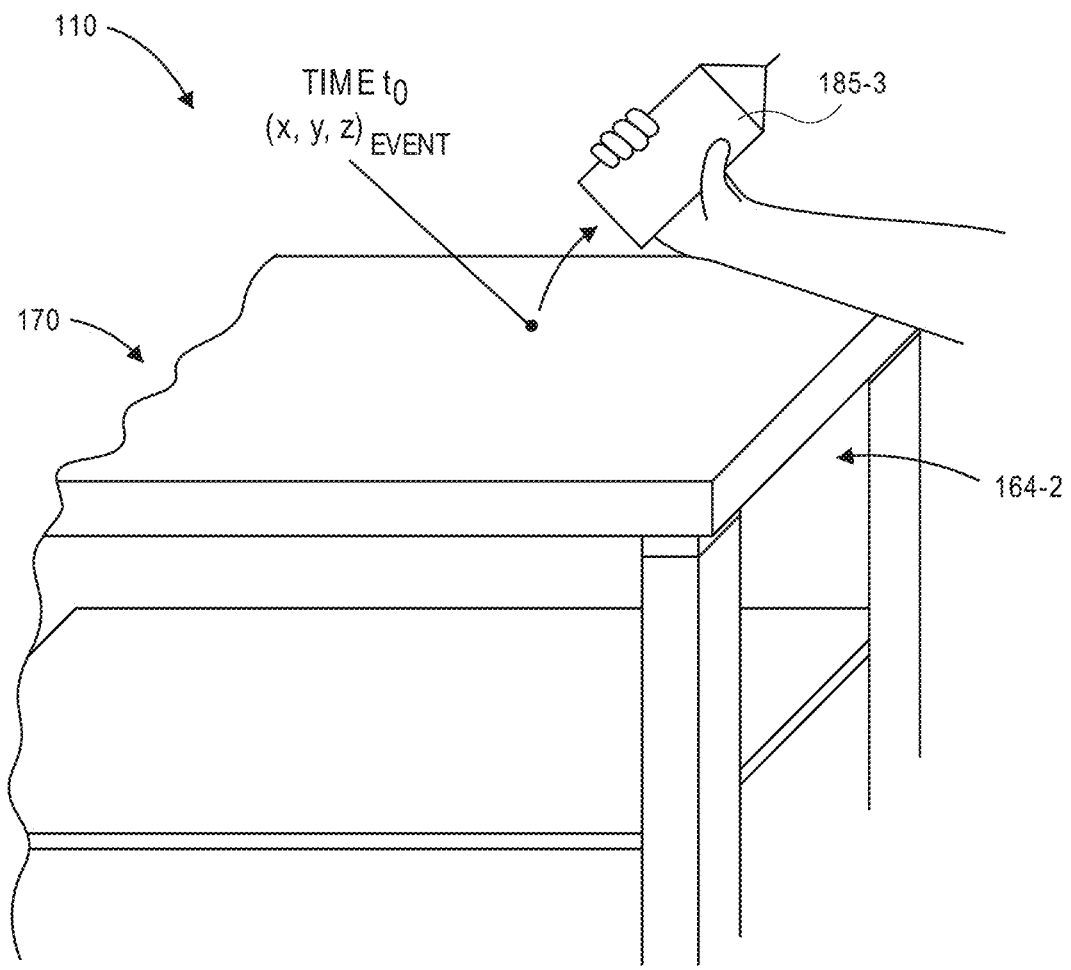

One or more of the implementations of the present disclosure may be configured to associate an event involving an item that occurs on a scene with one or more actors on the scene based on information or data obtained prior to, during or after the event in any manner and by any number of devices or components. For example, as is shown in FIG. 1C, an event may be detected when an item 185-3 is lifted from the storage unit 170, e.g., at a location on one of the shelves of the storage unit 170, at a time $t_0$. In some implementations, the event may be detected based on changes in loading on one or more of the shelves of the storage unit 170 (e.g., due to picking or stowing events, or other events in which one or more items are placed thereon or removed therefrom), as detected by one or more of the load sensors 164-1, 164-2. In still other implementations, the event may be detected by one or more radiofrequency identification (RFID) sensors (e.g., antennas and/or tags), light detection and ranging (LIDAR) sensors (e.g., laser light sources and/or receivers), or by any other type or form of sensors (not shown) that may be provided in association with the item 185-3 and/or the storage unit 170.

In some other implementations, an event may be detected (or a location or time of the event may be determined) based on any analysis of imaging data captured by the imaging devices 120-1, 120-2, or any other imaging devices (not shown). For example, in any set of imaging data (e.g., video data captured by an imaging device), aspects of any number of events may be depicted therein, and the imaging data may be continuously or regularly monitored in order to determine whether an event has occurred. In some implementations, an event may be detected where contents of the scene 110 are determined to have changed in any pair of images (e.g., a before-and-after comparison of images depicting aspects of the scene 110, such as the storage unit 170, at different times). In some other implementations, an event may be determined to have occurred where one or more body parts (e.g., a hand of an actor) are detected within a predetermined range or distance of the storage unit 170 in one or more images. Therefore, the scene 110 need not require any sensors (e.g., the load sensors 164-1, 164-2), other than the imaging devices 120-1, 120-2, in order to determine that an event involving one or more items has occurred, particularly where imaging data being captured by the imaging devices 120-1, 120-2 is analyzed on a regular basis. Rather, events may be detected and locations or times of events may be determined based on information or data (e.g., the imaging data captured by the imaging devices 120-1, 120-2) that has already been captured. For example, in some implementations, imaging data may be continuously or regularly evaluated to determine whether an event has occurred. In such implementations, imaging data may be processed according to one or more of the systems or methods disclosed herein if an event is determined to have occurred, to a predetermined level of confidence or accuracy, or discarded when it is determined that no event has occurred.

Moreover, an event may be determined to have occurred based on information or data obtained by a combination of sensors. For example, information or data may be captured by an imaging device (e.g., one or more of the imaging devices 120-1, 120-2, or others), a load sensor (e.g., one or more of the load sensors 164-1, 164-2, or others), or any other sensors (e.g., any RFID sensors, LIDAR sensors, or any other type or form of sensors). The information or data captured by the variety of sensors may be independently or collectively evaluated in order to determine a measure of a probability or likelihood that an event has occurred at a specific location at the scene 110, and processed according to one or more of the systems or methods disclosed herein if an event is determined to have occurred, to a predetermined level of confidence or accuracy, or discarded when it is determined that no event has occurred. Likewise, a location or a time of an event may be determined based on information or data captured by any of such sensors, which may be independently or collectively evaluated in order to identify the location or the time at which the event has most likely occurred.

A location or time of an event may be determined by any of such sensors or components, or according to any algorithm or technique, and represented in space by a set of Cartesian coordinates, e.g., the location $(x, y, z)_{EVENT}$, or coordinates according to any other system. Although the event shown in FIG. 1C involves the removal of the item 185-3 from the shelving unit 170 at the time $t_0$, the systems and methods disclosed herein may detect events regarding the removal of any number of items from shelving units or other locations or at any other times, or the placement of any number of items on such shelving units or other locations or at such times, in accordance with the present disclosure. Moreover, where the item 185-3, or items of a type of the item 185-3, is commonly picked from or stowed at the location $(x, y, z)_{EVENT}$ and at the time $t_0$, a determination that an event has occurred at the location $(x, y, z)_{EVENT}$ based on information or data provided by any source or system may be used to identify the item 185-3 or the type of item 185-3 accordingly. In some implementations, the location $(x, y, z)_{EVENT}$ and/or the time $t_0$ may be associated with a type of the item 185-3 such as a brand, a category, an identifier, or any other attribute associated with items such as the item 185-3. The items of the type of the item 185-3 may share common dimensions, contents or other attributes, or may be identical in form or function.

Figure 1D:
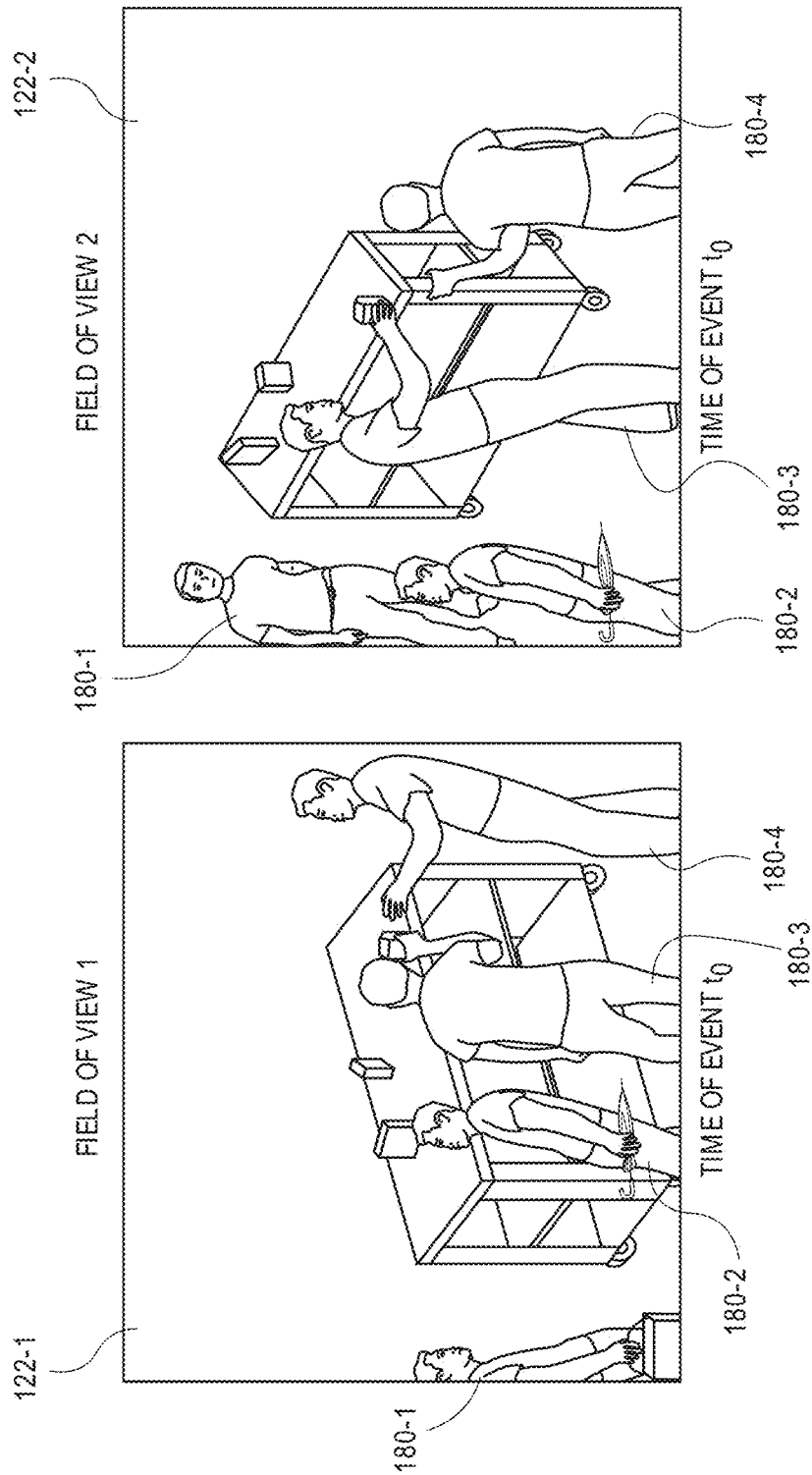
Figure 1E:
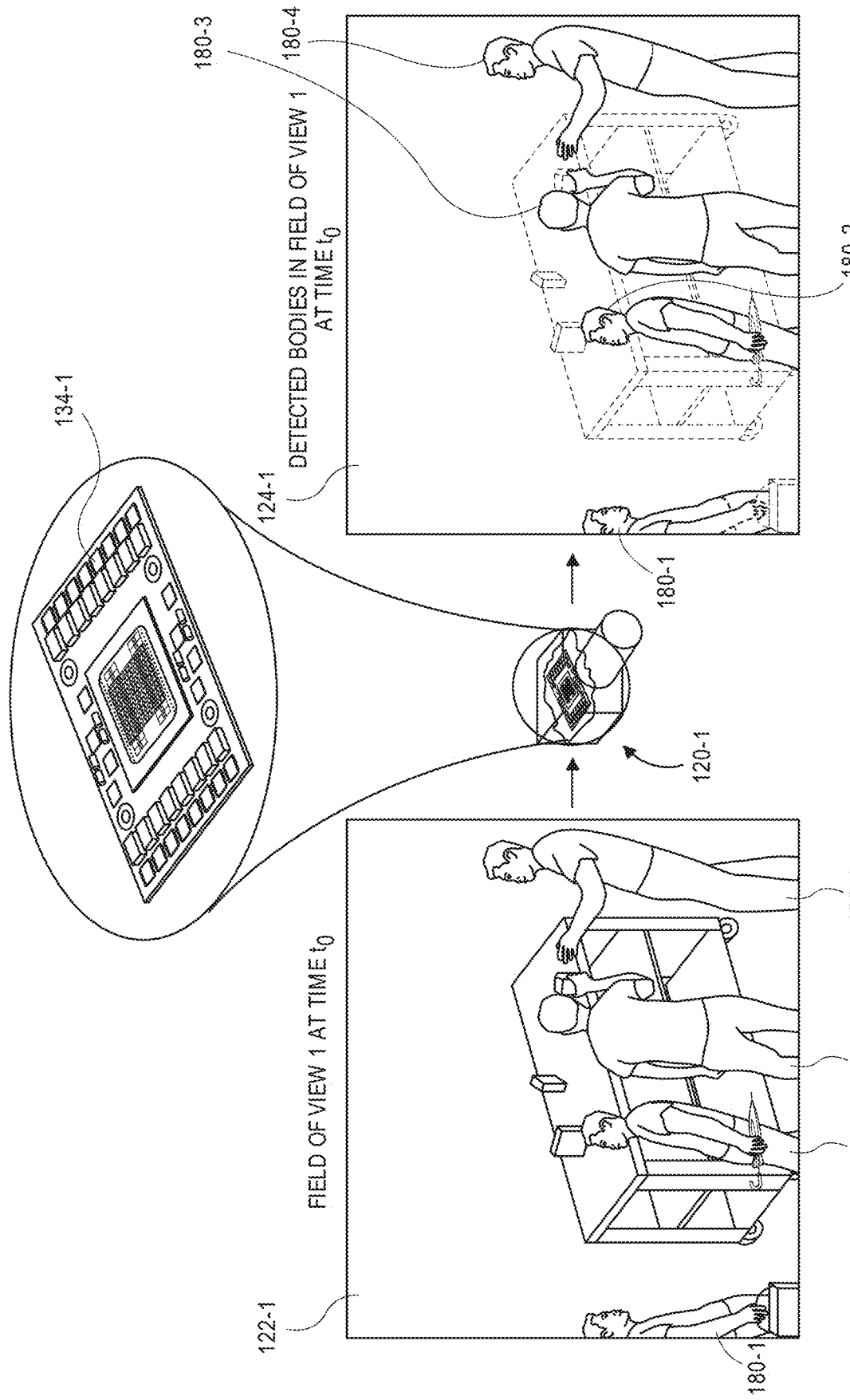

Digital images captured by the respective imaging devices 120-1, 120-2 may be processed to identify actors that are present on the scene 110 prior to, during and after an event. As is shown in FIG. 1D, images 122-1, 122-2 captured by the respective imaging devices 120-1, 120-2 at the time $t_0$ at which the event is determined to have occurred, or simultaneously or substantially simultaneously, e.g., during an interval of time that includes the time $t_0$, are shown. The images 122-1, 122-2 depict the positions of the respective actors 180-1, 180-2, 180-3, 180-4 within the fields of view of the imaging devices 120-1, 120-2 at the time $t_0$. Moreover, the digital images 122-1, 122-2 may include visual images, depth images, or visual images and depth images.

Figure 1F:
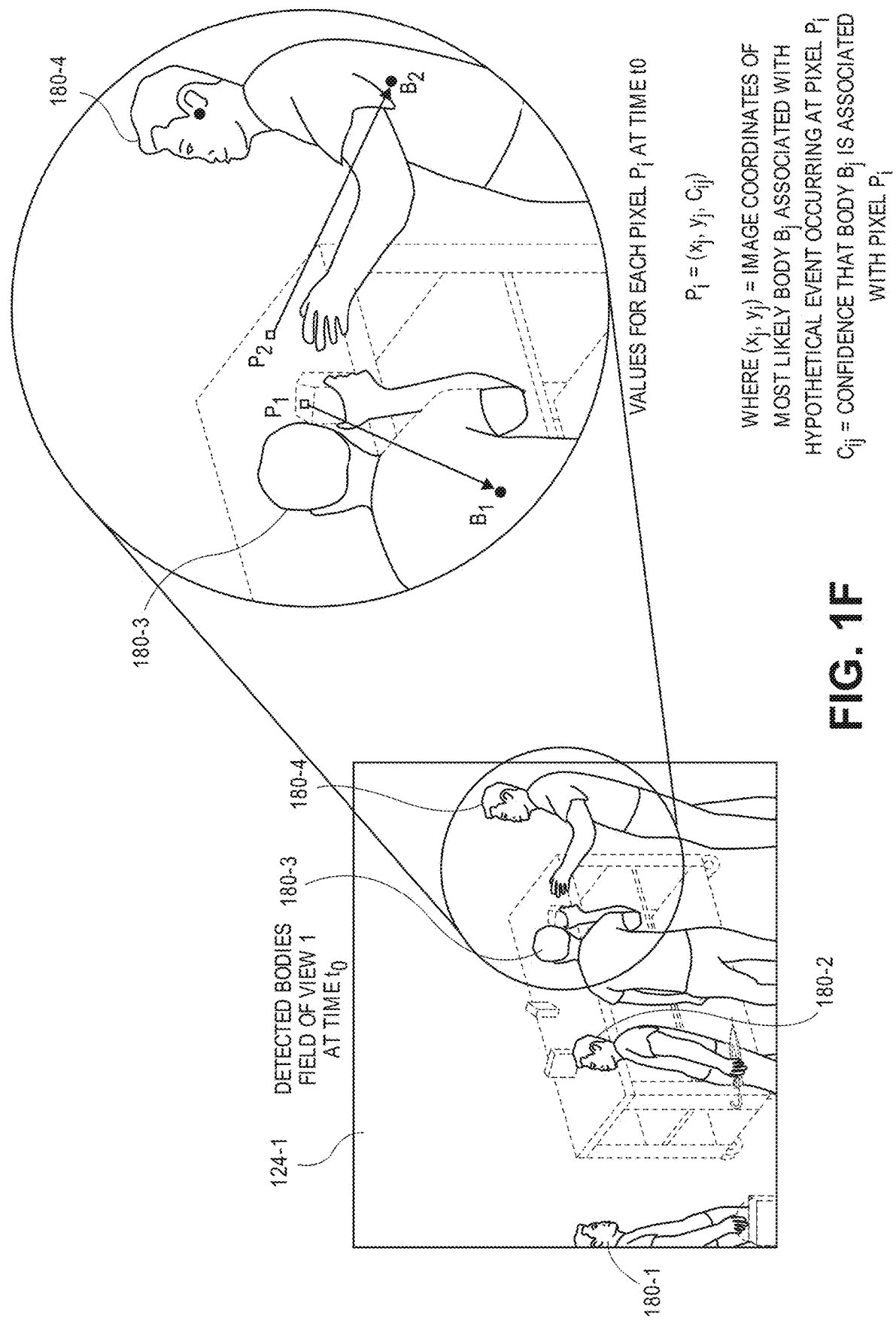

In some implementations of the present disclosure, imaging devices may be programmed to execute one or more machine learning systems or techniques that are trained to detect one or more body parts of actors depicted within images captured by such imaging devices, and to identify, for one or more pixels of such images, an actor depicted therein that would be most likely associated with an event that might occur at such pixels. For example, as is shown in FIG. 1F, a processor unit 134-1 operating on the imaging device 120-1 may receive the image 122-1 captured by the imaging device 120-1 at the time $t_0$ (or substantially at the time $t_0$), and generate a segmentation record 124-1 identifying locations of bodies (e.g., one or more of the body parts) of the actors 180-1, 180-2, 180-3, 180-4 that are depicted within the image 122-1. The machine learning systems or techniques may be any type or form of tool that is trained to detect one or more body parts of actors within images, and to associate such body parts or actors with events occurring within image planes of the images. In some implementations, a processor unit provided on an imaging device may be programmed to execute a fully convolutional network (e.g., a residual network, such as a deep residual learning network) on inputs including images captured thereby. Alternatively, the one or more machine learning systems or techniques that are trained to detect body parts of actors within images may be executed by one or more computer devices or machines in other locations, e.g., alternate or virtual locations, such as in a "cloud"-based environment.

As is shown in FIG. 1F, outputs received from the machine learning system or technique may be used to calculate values regarding a most likely body (or body part) of an actor to have been associated with each of the respective pixels $P_i$ of the image 122-1 if an event were to occur at such pixels at time $t_0$. In some implementations, the values may represent vectors extending from each of such pixels $P_i$ to one of the bodies of the actors 180-1, 180-2, 180-3, 180-4 depicted within the image 122-1. For example, such values may include $P_i=(x_j, y_j, C_{ij})$, where $x_j$, $y_j$ are coordinates of a centroid or other aspect of a body $B_j$ of an actor that is most likely associated with a hypothetical event occurring at pixel $P_i$, and where $C_{ij}$ is a confidence score or other metric indicative of confidence in a determination that the body $B_j$ of the actor is associated with the hypothetical event occurring at the pixel $P_i$.

In some implementations, the values $x_j$, $y_j$, $C_{ij}$ may be calculated for each of the pixels of the image 122-1. In other implementations, however, such values may be calculated for a subset of the pixels of the image 122-1, e.g., pixels corresponding to regions of inventory shelves or storage units where events are likely to occur, pixels of the image 122-1 that are determined to depict background features, or pixels that are determined to not depict one or more of the actors 180-1, 180-2, 180-3, 180-4. For example, referring again to FIG. 1D, a machine learning system or technique operating on the imaging device 120-1 or elsewhere may receive the entire image 122-1 as an input, and may return outputs from which pixels of most likely bodies (or body parts) may be identified and confidence scores for such bodies may be calculated. Alternatively, a machine learning system or technique operating on the imaging device 120-1 or elsewhere may receive portions of the image 122-1 (e.g., subsets of the pixels of the image 122-1) corresponding to accessible surfaces of the storage unit 170, or other portions of the scene 110 where one or more events might occur, as inputs and may return outputs from which pixels of most likely body parts of actors may be identified and confidence scores for such actors may be calculated. For example, in some implementations, one or more accessible surfaces of the storage unit 170 and/or the contents thereof (e.g., items associated with such surfaces) may be identified based on planogram data, which may indicate which of such pixels corresponds to such surfaces and may identify the items associated with such pixels. In this regard, efficiencies of the processes by which body parts are identified and actors are associated with pixels may be enhanced accordingly, thereby conserving processing power, memory and/or bandwidth.

Figure 1G:
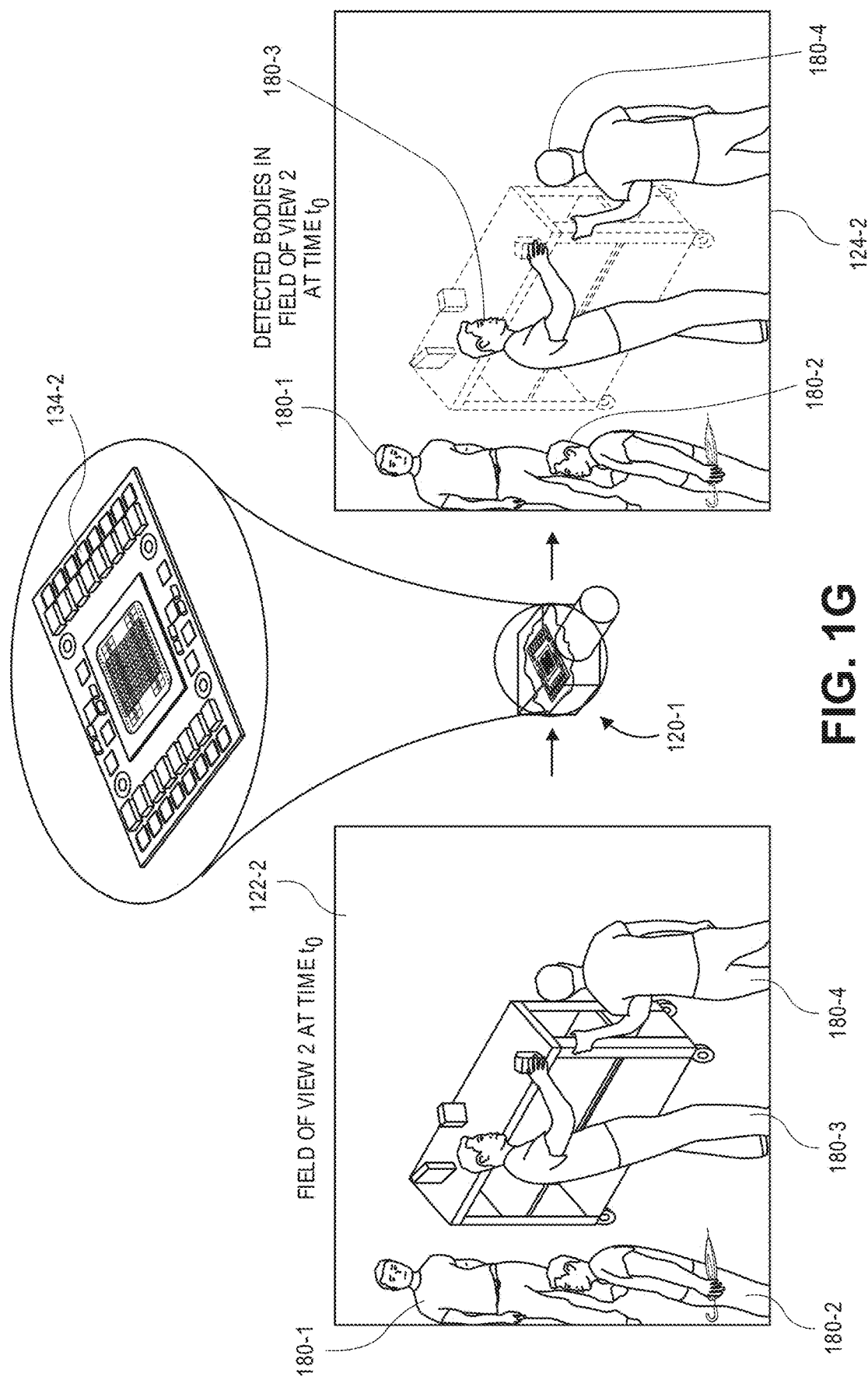
Figure 1H:
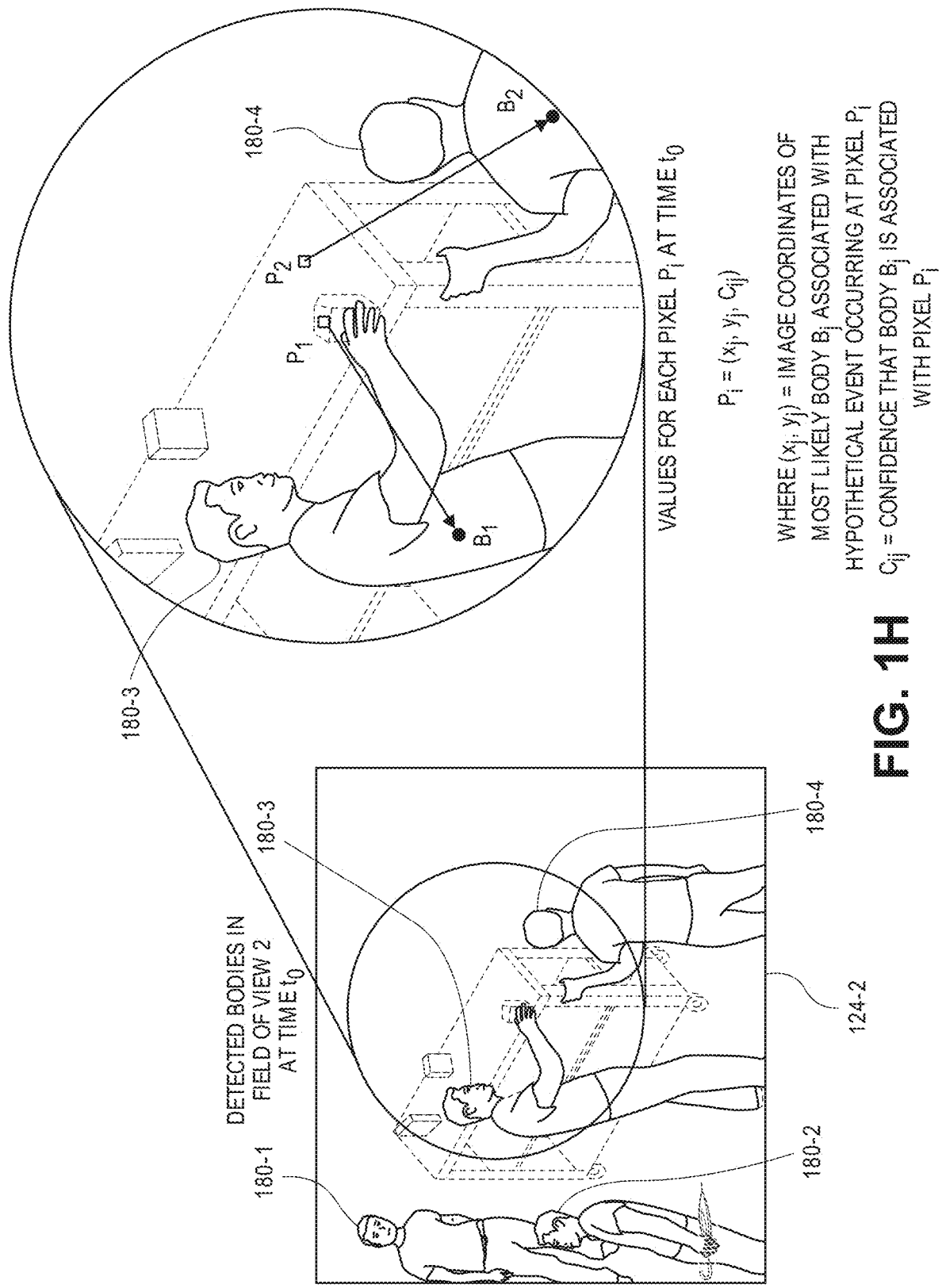

Likewise, as is shown in FIG. 1G, a processor unit 134-2 operating on the imaging device 120-2 may receive the image 122-2 captured by the imaging device 120-2 at the time $t_0$, and generate a segmentation record 124-2 identifying locations of body parts of the actors 180-1, 180-2, 180-3, 180-4 that are depicted within the image 122-2. The machine learning systems or techniques by which the locations of such actors 180-1, 180-2, 180-3, 180-4 are identified may be the same machine learning systems or techniques, or other machine learning systems or techniques. Alternatively, in some implementations, the segmentation record 124-2 identifying the locations of the body parts of the actors 180-1, 180-2, 180-3, 180-4 may be generated by one or more processor units that are external to the imaging device 120-2. As is shown in FIG. 1H, outputs received from the machine learning system or technique may be used to calculate values regarding a most likely actor to have been associated with each of the respective pixels $P_i$ of the image 122-2 if an event were to occur at such pixels at time $t_0$, in a manner similar to that which is shown in FIG. 1G for the image 122-1.

Figure 1I:
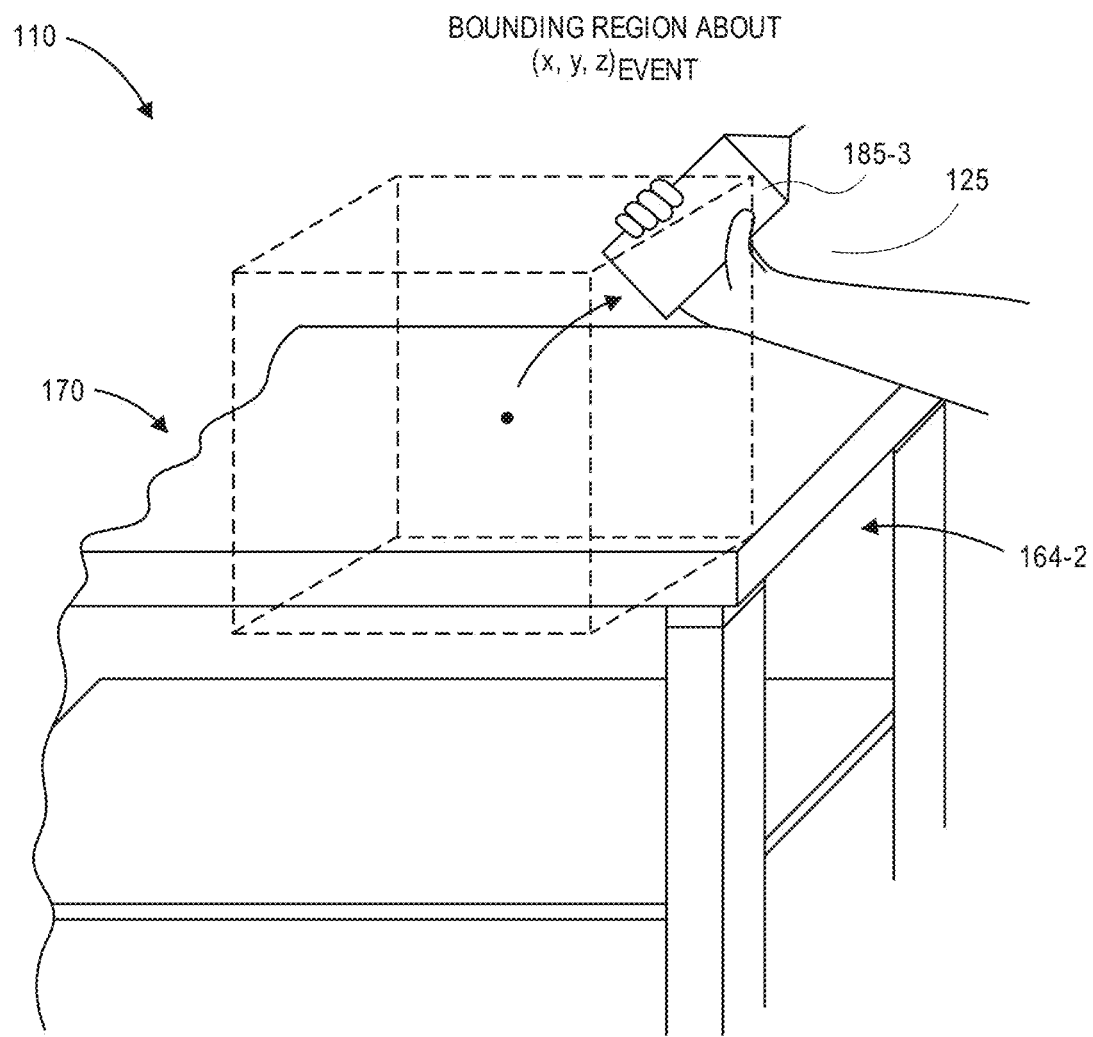

Upon determining that the event has occurred at the location $(x, y, z)_{EVENT}$ and/or the time $t_0$, a server 112 may identify a region in space associated with the event. For example, as is shown in FIG. 1I, where the location $(x, y, z)_{EVENT}$ of the event is determined by the load sensors 164-1, 164-2, or based on data captured or received from any other source, the server 112 may define a three-dimensional ("3D") bounding region 125 in the form of a set of pixels corresponding to the location $(x, y, z)_{EVENT}$, as well as a buffer having a nominal length (e.g., a predetermined number of millimeters, inches, pixels or other measures of distance in three-dimensional space or within an image plane) in one or more directions about or around the location $(x, y, z)_{EVENT}$, with respect to the event. Although the bounding region 125 shown in FIG. 1D is a cube, a bounding region defined about a location of an event may have any shape, e.g., a sphere, a cylinder, a cone, a pyramid, a tetrahedron, or any other shape, and may be defined by buffers of any size in accordance with the present disclosure. The server 112 may be located at the scene 110, or at one or more alternate or virtual locations, e.g., in a "cloud"-based environment.

Figure 1J:
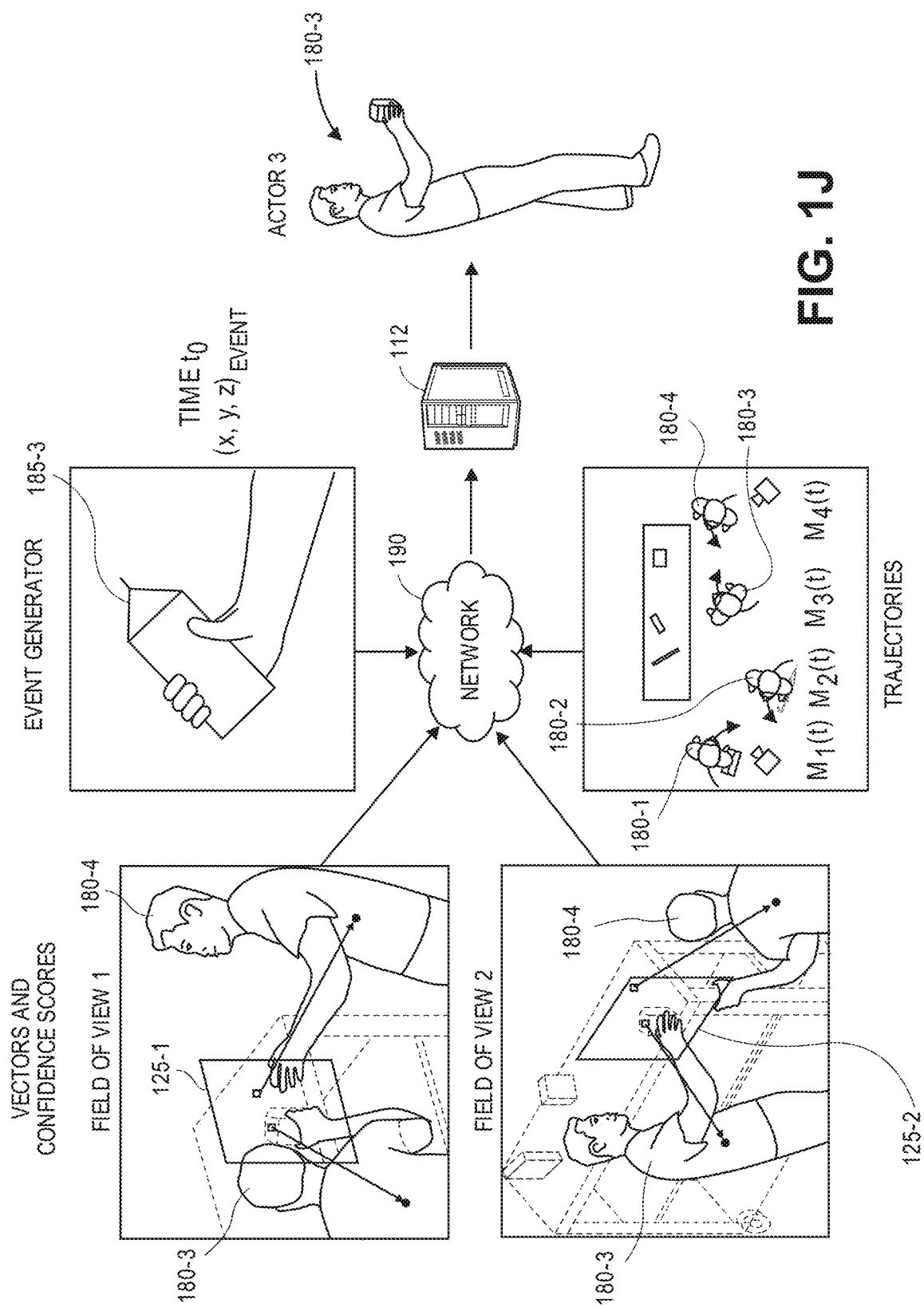

As is shown in FIG. 1J, records of the vectors and the confidence scores determined from images captured from each of a plurality of fields of view may be provided over a network 190 to the server 112, along with information regarding the location $(x, y, z)_{EVENT}$ where the event occurred, and the time $t_0$ at which the event occurred, as determined based on information or data obtained by the load sensors 164-1, 164-2 or from any other source. Upon determining that the event has occurred at the location $(x, y, z)_{EVENT}$ and/or the time $t_0$, the server 112 may determine, based on the records of the vectors and the confidence scores received from the imaging devices 120-1, 120-2, which of the pixels of the images captured thereby is most likely associated with the location $(x, y, z)_{EVENT}$ at the time $t_0$. A most likely actor to have been associated with the event may be identified by merging the records of the vectors and the confidence scores captured at the time $t_0$, or during a duration preceding and/or following the time $t_0$, and selecting one or more of the actors 180-1, 180-2, 180-3, 180-4 having the highest confidence scores during the duration. For example, the server 112 may evaluate each of the records and the vectors and confidence scores contained therein to identify the one of the actors 180-1, 180-2, 180-3, 180-4 that is most likely associated with pixels in or around the location $(x, y, z)_{EVENT}$ at the time $t_0$ (or at substantially the time $t_0$, e.g., during an interval of time that includes the time $t_0$), and, therefore, is most likely associated with the event. Alternatively, the server 112 may evaluate only the vectors and confidence scores corresponding to portions of the images 122-1, 122-2 within two-dimensional ("2D") representations 125-1, 125-2 of the bounding region 125, which may be back-projected into the respective image planes of the images 122-1, 122-2 in order to identify such vectors and confidence scores.

In some implementations, such as where the scene 110 includes a substantially large number of imaging devices, or where a substantially large number of images must be evaluated to determine which of the actors is associated with the event, the images may be evaluated to determine their respective levels of quality by any algorithm or technique, e.g., one or more trained machine learning systems or techniques, such as a convolutional neural network or another artificial neural network, or a support vector machine (e.g., a linear support vector machine) or another classifier. Images may be selected or excluded from consideration, or the confidence scores of the various actors depicted within such images may be adjusted accordingly, in order to enhance the likelihood that an actor may be properly identified as associated with an event based on such images.

Additionally, where the identities of the actors 180-1, 180-2, 180-3, 180-4 are known or may be determined, one of the actors 180-1, 180-2, 180-3, 180-4 may be associated with the event. For example, where the trajectories $M_1(t)$, $M_2(t)$, $M_3(t)$, $M_4(t)$ of the actors 180-1, 180-2, 180-3, 180-4 may be determined by a locating service or other system and associated with identities of the respective actors 180-1, 180-2, 180-3, 180-4, based on a match between a position of one or more body parts of the one of the actors 180-1, 180-2, 180-3, 180-4, as determined from the vectors and confidence scores, and positions of the trajectories $M_1(t)$, $M_2(t)$, $M_3(t)$, $M_4(t)$ at the time $t_0$, or at approximately the time $t_0$. Moreover, where the event involves a retrieval of an item, e.g., the item 185-3, the item may be added to a virtual shopping cart or other record of the one of the actors 180-1, 180-2, 180-3, 180-4, viz., the actor 180-3, that has been identified as being associated with the event.

Accordingly, implementations of the systems and methods of the present disclosure may capture imaging data from a scene using a plurality of digital cameras or other imaging devices that are aligned with various fields of view. In some implementations, two or more of the digital cameras or other imaging devices may have fields of view that overlap with one another at least in part, such as the imaging devices 120-1, 120-2 of FIGS. 1A and 1B. In other implementations, the digital cameras or other imaging devices need not have overlapping fields of view.

The scene may be a facility such as a materials handling facility, a fulfillment center, a warehouse or any other facility (e.g., indoor or outdoor). One or more processors or processor units within each of the digital cameras or other imaging devices may be programmed to execute a machine learning system or technique that is trained not only to detect body parts within images, but also to generate vectors extending from pixels of such images to positions of body parts, and to calculate confidence scores based on such vectors. The digital cameras may generate records of the vectors and confidence scores for each of the pixels within an image, or for a subset of the pixels within the image, thereby associating each of such pixels with a position of a body part depicted within the image, and provide such records to a central server or other computer device. In some implementations, the records may be accompanied by digital images (e.g., visual images or depth images) captured by such digital cameras or images from which the vectors and confidence scores were generated. Alternatively or additionally, the processors or processor units that are programmed execute the trained machine learning system or technique may reside external to the digital cameras or imaging devices, such as in one or more alternate or virtual locations, e.g., in a "cloud"-based environment.

Upon determining that an event has occurred, the server or other computer device may identify records of vectors and confidence scores that were generated based on images captured prior to and/or after the event, and may merge such records to determine a most likely actor at the scene who is associated with the event. In some implementations, the images from which the records were generated may be further evaluated to determine measures of quality of such images, and such measures may be used to modify (or to weight, to preferentially select or to preferentially exclude) confidence scores within one or more of the records generated therefrom, in an effort to enhance the reliability of such confidence scores based on the quality of the images from which the confidence scores were generated. For each of the actors that is detected at the scene, a predetermined number of confidence scores (e.g., unmodified or modified) may be selected (e.g., the highest confidence scores for each actor) and a most likely one of the actors may be identified as associated with the event based on values of such confidence scores.

Those of ordinary skill in the pertinent arts will recognize that imaging data, e.g., visual imaging data, depth imaging data, infrared imaging data, radiographic imaging data, or imaging data of any other type or form, may be captured using one or more imaging devices such as digital cameras, depth sensors, range cameras, infrared cameras or radiographic cameras. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBz or RGBD imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

Similarly, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NNrefer to the portion of green contained in the color, and the third two characters NN refer to the portion of blue contained in the color. For example, the colors white and black are expressed according to the hexadecimal model as #FFFFFF and #000000, respectively, while the color candy apple red is expressed as #FF0800. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations (e.g., intervals of time). Such algorithms or tools may be directed to recognizing and marking transitions (e.g., the contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny detectors or algorithms; Sobel operators, algorithms or filters; Kayyali operators; Roberts detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine learning classifiers, algorithms or techniques, including but not limited to nearest neighbor methods or analyses, artificial neural networks, support vector machines, factorization methods or techniques, K-means clustering analyses or techniques, similarity measures such as log likelihood similarities or cosine similarities, latent Dirichlet allocations or other topic models, or latent semantic analyses.

The systems and methods of the present disclosure may be utilized in any number of applications in which identifying an actor that is associated with an event is desired, including but not limited to events occurring within a materials handling facility. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to detect and distinguish between actors (e.g., customers) and recognize their respective interactions within a materials handling facility, including but not limited to interactions with one or more items (e.g., consumer goods) within the materials handling facility. Such systems and methods may also be utilized to identify and locate actors and their interactions within transportation centers, financial institutions or like structures in which diverse collections of people, objects or machines enter and exit from such environments at regular or irregular times or on predictable or unpredictable schedules.

Figure 2A:
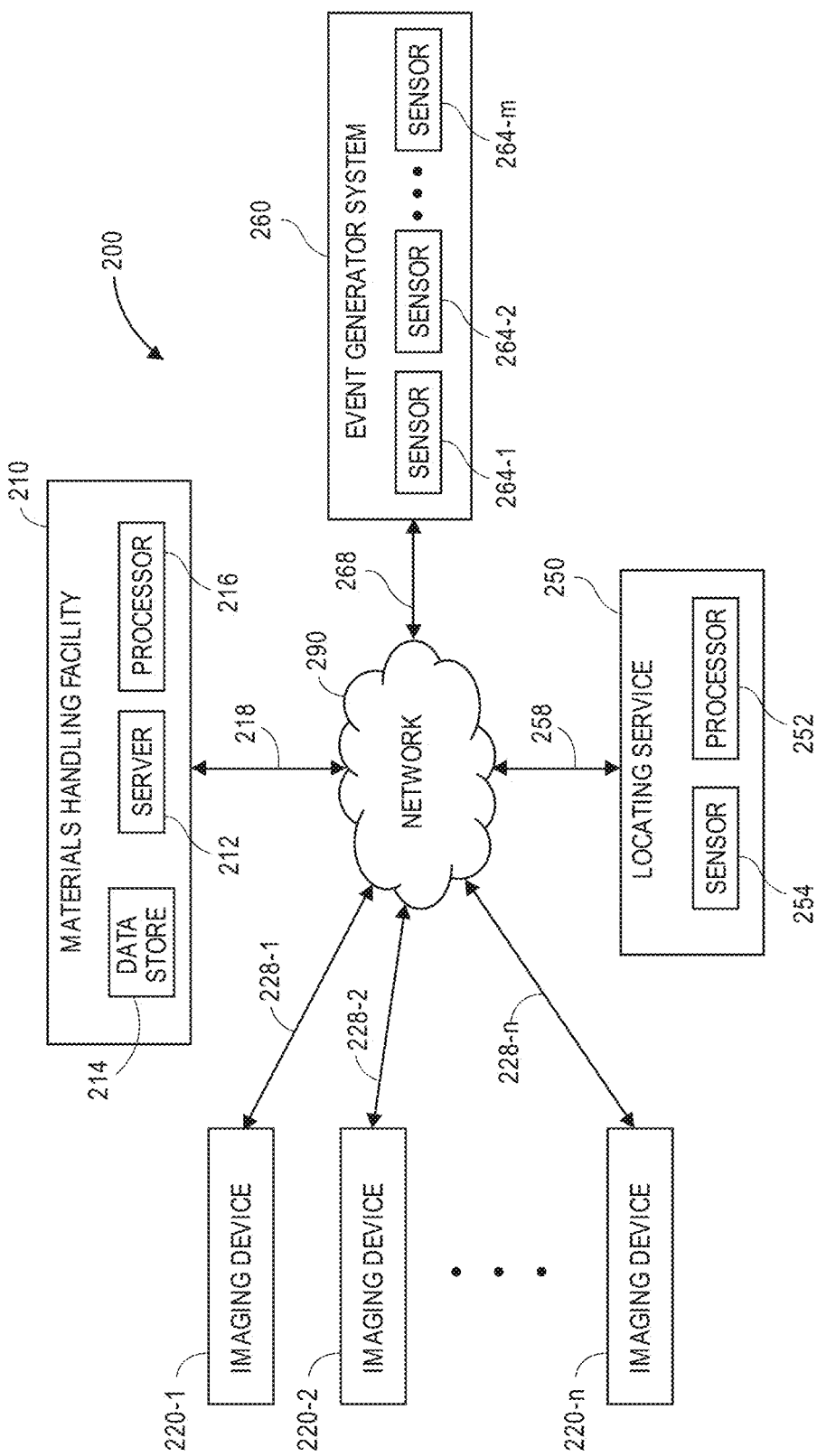
FIGS. 2A and 2B are block diagrams of components of one system for associating events with actors using digital imagery and machine learning in accordance with implementations of the present disclosure.
Figure 2B:
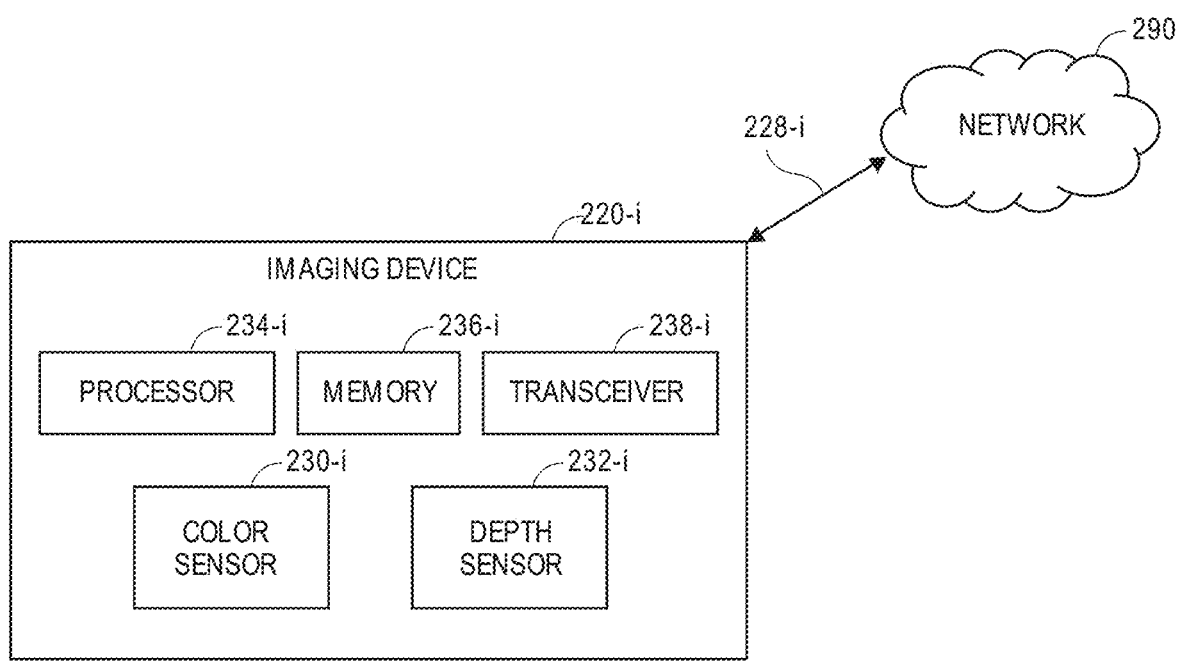

Referring to FIGS. 2A and 2B, a block diagram of components of one system 200 for associating events with actors using digital imagery and machine learning in accordance with implementations of the present disclosure is shown. The system 200 includes a materials handling facility 210, a plurality of imaging devices 220-1, 220-2 . . . 220-n, a locating service 250 and an event generator system 260 that are connected to one another across a network 290, which may include the Internet in whole or in part. Except where otherwise noted, reference numerals preceded by the number "2" shown in FIG. 2A or 2B indicate components or features that are similar to components or features having reference numerals preceded by the number "1" shown in FIGS. 1A through 1J.

The materials handling facility 210 may be any facility that is adapted to receive, store, process and/or distribute items from a variety of sources to a variety of destinations, e.g., on behalf of or for an electronic marketplace, or on behalf of or for any other entity. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Inventory items may be stored within an inventory area on an inventory shelf, a storage unit or another like system, such as in bins, on shelves or via other suitable storage mechanisms. The inventory shelves, storage units or like units may be flat or angled, stationary or mobile, and of any shape or size. In some implementations, all inventory items of a given type or kind may be stored in a common location within an inventory area. In other implementations, like inventory items may be stored in different locations. For example, to optimize the retrieval of inventory items having high turnover rates or velocities within a large materials handling facility, such inventory items may be stored in several different locations to reduce congestion that might be encountered if the items are stored at a single location.

When a request or an order specifying one or more of the inventory items is received, or as a user progresses through the materials handling facility 210, inventory items that are listed in the request or order, or are desired by the user, may be selected or "picked" from an inventory area at the materials handling facility 210. For example, in one implementation, a customer or other user may travel through the materials handling facility 210 with a list (e.g., a paper list, or a handheld mobile device displaying or including such a list) and may pick one or more of the inventory items from an inventory area at the materials handling facility 210. In other implementations, an employee of the materials handling facility 210 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first location (e.g., a first inventory shelf or other storage unit) in an inventory area, moved a distance, and placed at a second location (e.g., a second inventory shelf or other storage unit) in the inventory area.

As is shown in FIG. 2A, the materials handling facility 210 includes a networked computer infrastructure for performing various computer-related functions associated with the receipt, storage, processing and distribution of such items, including one or more physical computer servers 212, data stores (e.g., databases) 214 and/or processors 216, that may be provided in the same physical location as the materials handling facility 210, or in one or more alternate or virtual locations, e.g., in a "cloud"-based environment. In some implementations, the servers 212, the data stores 214 and/or the processors 216 or any number of other computing devices or resources may further execute any type of computer-based function or compute any type or form of calculation, including but not limited to any formulas, equations, algorithms or techniques for determining one or more probabilities or performing any number of statistical tests.

In some implementations, the servers 212, the data stores 214 and/or the processors 216 may be configured to execute one or more machine learning systems or techniques. For example, in some implementations, the servers 212 may be configured to execute an artificial neural network, such a convolutional neural network, to process imaging data received from one or more of the imaging devices 220-1, 220-2 . . . 220-n over the network 290.

Such computer devices or resources may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The materials handling facility 210 may include one or more inventory areas having predefined two-dimensional or three-dimensional storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 210 may further include one or more receiving stations featuring any apparatuses that may be required in order to receive shipments of items at the materials handling facility 210 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 210 may further include one or more distribution stations where items that have been retrieved from a designated inventory area may be evaluated, prepared and packed for delivery from the materials handling facility 210 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 210 may be transferred directly to a distribution station for further processing, or "cross-docked," without first being placed into storage in an intermediate inventory area. The materials handling facility 210 may also include one or more additional stations for receiving and distributing items to customers, as well as one or more conveying systems, autonomous mobile robots, or other manual or automated vehicles for transporting items between such stations or areas (not shown in FIG. 2A or FIG. 2B). The materials handling facility 210 may operate one or more order processing and/or communication systems using computer devices or resources in communication with one or more of the servers 212, the data stores 214 and/or the processors 216, or through one or more other computing devices or resources that may be connected to the network 290, as is indicated by line 218, in order to transmit or receive information in the form of digital or analog data, or for any other purpose.

The materials handling facility 210 may be associated with a plurality of imaging devices 220-1, 220-2 . . . 220-*n* (or other sensors), which may be any form of optical recording device that may be used to photograph or otherwise record imaging data of structures, facilities or items within the materials handling facility 210, or for any other purpose. The imaging devices 220-1, 220-2 . . . 220-*n* may be mounted in any specific location or orientation within the materials handling facility 210, e.g., above, below or alongside one or more inventory areas or stations for receiving or distributing items. Alternatively, the imaging devices 220-1, 220-2 . . . 220-*n* may be provided in any open or enclosed environment or space in which any number of actors (e.g., humans, other animals or machines) may execute one or more poses, gestures or other actions within one or more of their fields of view.

Each of the imaging devices 220-1, 220-2 . . . 220-*n* shown in FIG. 2A may include one or more sensors, memory or storage components and processors, and such sensors, memory components or processors may further include one or more photosensitive surfaces, filters, chips, electrodes, clocks, boards, timers or any other relevant features (not shown). As is shown in FIG. 2B, a representative imaging device 220-*i* includes one or more optical sensors, including color sensors (or grayscale sensors or black-and-white sensors) 230-*i* and/or depth sensors 232-*i* configured to capture visual imaging data (e.g., textures) or depth imaging data (e.g., ranges) to objects within one or more fields of view of the imaging device 220-*i*. The imaging device 220-*i* further includes one or more processors 234-*i*, one or more memory components 236-*i* and one or more transceivers 238-*i*, and any other components (not shown) that may be required in order to capture, analyze and/or store imaging data from within the materials handling facility 210 environment in which the imaging device 220-*i* is provided. For example, the imaging device 220-*i* may capture one or more still or moving images (e.g., streams of visual and/or depth images or image frames), along with any relevant audio signals or other information (e.g., position data), and may also connect to or otherwise communicate with the servers 212, or any other computer devices within the materials handling facility 210 (not shown), or with one or more external computer devices over the network 290, through the sending and receiving of digital data. In some implementations, the transceiver 238-*i* may be configured to enable the imaging device 220-*i* to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 212 or over the network 290 directly.

The processors 234-*i* may be configured to execute an artificial neural network, such a convolutional neural network, to process imaging data captured by one or more of the color sensors 230-*i* or the depth sensors 232-*i*. For example, in some implementations, one such neural network may be a neural network backbone (e.g., a residual neural network backbone) with one or more output layers. In some implementations, a neural network may have two output layers, including one output layer associated with a prediction of an event-to-actor regression (e.g., a vector) extending between one or more pixels of an image and one or more pixels corresponding to one or more body parts (e.g., a head, a shoulder, a torso, a waist or a foot) of an actor, and one output layer associated with a confidence score or other metric associated with the regression (or vector). For example, for a given pixel of an image, a vector extending to a pixel of a body or body part of an actor may be defined by coordinate points of the pixel of the body or body part of that actor, e.g., a two-dimensional score corresponding to the coordinate points within an image plane of the image (e.g., an x, y coordinate pair). The confidence score may be represented by a one-dimensional score for each pixel, as well.

In some implementations, the processor 234-*i* may calculate regression outputs by two-layer perceptrons for each pixel. For example, a first layer may combine features from multiple resolutions of an image, with the use of multiple filters, and a second layer may be a conventional output layer that is configured to generate a two-dimensional regression vector, e.g., one or more coordinate pairs corresponding to a body or body part of an actor. In some implementations, confidence outputs may also be generated from the same image, at a single resolution or at multiple different resolutions of the image, either unfiltered or with the use of one or more filters.

The imaging devices 220-1, 220-2 . . . 220-*n* may be homogenous or heterogeneous in nature, in accordance with the present disclosure. For example, one or more of the imaging devices 220-1, 220-2 . . . 220-*n* may have both the color sensor 230-*i* and the depth sensor 232-*i*. Alternatively, one or more of the imaging devices 220-1, 220-2 . . . 220-*n* may have just a color sensor 230-*i* (or grayscale sensor or black-and-white sensor) or just a depth sensor 232-*i*. For example, in some implementations, one or more of the imaging devices 220-1, 220-2 . . . 220-*n* may be configured to capture depth imaging data, e.g., distances or ranges to objects within their respective fields of view. In some implementations, one or more of the imaging devices 220-1, 220-2 . . . 220-*n* may be configured to capture visual imaging data, e.g., visual images or images in color, grayscale or black-and-white.

For example, one or more of the imaging devices 220-1, 220-2 . . . 220-n may be an RGB color camera, a still camera, a motion capture/video camera or any other type or form of camera. In other implementations, one or more of the imaging devices 220-1, 220-2 . . . 220-n may be depth-sensing cameras, such as an RGBz or RGBD camera. In still other implementations, one or more of the imaging devices 220-1, 220-2 . . . 220-n may be a thermographic or infrared (IR) camera. Additionally, in some implementations, the imaging devices 220-1, 220-2 . . . 220-n may simply be camera modules that include a lens and an image sensor configured to convert an optical image obtained using the lens of the camera into a digital signal or digital representation of the image (generally referred to herein as imaging data). In one implementation, the image sensor may be a RGB sensor capable of supporting an image resolution of at least 860×480 at six frames per second that may likewise be configured to provide image data to other components (e.g., a graphics processing unit) for processing. In some implementations, the imaging devices 220-1, 220-2 . . . 220-n may be paired to provide stereo imagery and depth information, and may include a pair of camera modules. Additionally, imaging data may be stored in any variety of formats, including but not limited to YUYV, RGB, RAW, .bmp, .jpeg, .gif, or the like.

The imaging devices 220-1, 220-2 . . . 220-n may also include manual or automatic features for modifying their respective fields of view or orientations. For example, one or more of the imaging devices 220-1, 220-2 . . . 220-n may be configured in a fixed position, or with a fixed focal length (e.g., fixed-focus lenses) or angular orientation. Alternatively, one or more of the imaging devices 220-1, 220-2 . . . 220-n may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 220-1, 220-2 . . . 220-n, or changes in one or more of the angles defining the angular orientation.

For example, one or more of the imaging devices 220-1, 220-2 . . . 220-n may be hard-mounted to a support or mounting that maintains the device in a fixed configuration or angle with respect to one, two or three axes. Alternatively, however, one or more of the imaging devices 220-1, 220-2 . . . 220-n may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some of the imaging devices 220-1, 220-2 . . . 220-n may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of the imaging devices 220-1, 220-2 . . . 220-n, e.g., digital cameras, may be affected based on the lighting conditions and characteristics of the scenes in which the imaging devices 220-1, 220-2 . . . 220-n are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the system 200 of FIG. 2A includes boxes corresponding to three imaging devices 220-1, 220-2 . . . 220-n, those of ordinary skill in the pertinent arts will recognize that any number or type of imaging devices may be provided within the materials handling facility 210 in accordance with the present disclosure, including but not limited to digital cameras, depth sensors or range cameras, infrared cameras, radiographic cameras or other devices having one or more optical sensors. In some implementations, the system 200 (e.g., the materials handling facility 210) may include dozens or even hundreds of imaging devices of any type or form.

The materials handling facility 210 may also include any number of other sensors, components or other features for controlling or aiding in the operation of the materials handling facility 210, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The materials handling facility 210 may also include one or more human operators (not shown), such as one or more workers, who may be any designated personnel tasked with performing one or more tasks within the materials handling facility 210 in general, or within one or more inventory areas, receiving stations, distribution stations or other locations of the materials handling facility 210 in particular. Such workers may handle or transport items (e.g., any type or form of good, product, media or other tangible consumer article) within the materials handling facility 210, or operate one or more pieces of equipment therein (not shown). Such workers may also operate one or more specific computing devices or resources for registering the receipt, retrieval, transportation or storage of items within the materials handling facility 210, e.g., a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, such devices may include one or more wireless modules to facilitate communications with the servers 212, with one or more of the imaging devices 220-1, 220-2 . . . 220-n, or with one or more computer devices or resources, such as the servers 212, over the network 290, as well as a display (e.g., a touchscreen display) to facilitate the visible presentation to and interaction with a human operator. Such devices may be configured to store a unique identifier associated with a given human operator, and provide the unique identifier to the servers 212 or to another computer device or resource in order to identify the human operator. In some implementations, a portable device may also include one or more other features, e.g., audio input/output peripherals or accessories, such as speakers or microphones, as well as video input/output peripherals or accessories, such as cameras, projectors, haptic peripherals, accessories such as keyboards, keypads, touchscreens, joysticks, control buttons, or other components. Such portable devices may operate in conjunction with or may otherwise utilize or communicate with one or more components of the materials handling facility 210.

The locating service 250 includes one or more processors 252 and one or more sensors 254 for detecting the presence or absence of one or more actors within the materials handling facility 210, and locating one or more poses, gestures or other actions executed by such actors within the materials handling facility 210. The processors 252 provided in the same physical location as the materials handling facility 210 or in one or more alternate or virtual locations, e.g., in a "cloud"-based environment.

The sensors 254 may include, but are not limited to, one or more imaging devices (e.g., digital cameras) having diverse fields of view of the materials handling facility 210, or other scenes, that are configured to capture imaging data that may be processed to recognize and locate motion, locations and/or orientations of various actors within the materials handling facility 210. For example, in some implementations, an actor may present one or more credentials prior to entering the materials handling facility 210, or while such actors are present within the materials handling facility 210, within the fields of view of the sensors 254. One or more identifiers of the actor (e.g., an account number associated with the actor) may be determined based on such credentials, and assigned to pixels that are depicted within such imaging data and correspond to the actor. By assigning identifiers of actors to pixels, or by creating descriptors of pixels that are associated with actors, an actor may be identified in images that are subsequently captured by the imaging devices 220-1, 220-2 . . . 220-n. The motion, locations and/or orientations of the actors within the materials handling facility 210 may be monitored by the one or more sensors 254. When an actor has been identified as being associated with an event in which an item is retrieved or deposited, one of the item may be added to a virtual shopping cart or other record associated with the actor, or removed from the virtual shopping cart or other record associated with the actor, as necessary.

Alternatively, the sensors 254 may include any other type of sensing systems for detecting actors and recognizing their motion, locations and/or orientations within the materials handling facility 210. Such sensors 254 may include, but are not limited to, one or more load or weight sensors provided on walking or traveling surfaces within the materials handling facility 210, one or more RFID components (e.g., antennas or tags) for transmitting and/or receiving RFID signals associated with actors, one or more LIDAR sensors or receivers for detecting actors, or any other systems or components by which information regarding actors and their motion, locations and/or orientations may be gathered. The type or form of sensors 254 that may gather information or data regarding actors and their motion, locations and/or orientations at the materials handling facility 210 are not limited.

The processors 252 may be programmed or otherwise configured to generate one or more trajectories or tracklets representative of the motion, the locations and/or the orientations of each of the actors within the materials handling facility 210, such as one or more three-dimensional articulated models of partial or complete sets of body parts of the actors within the materials handling facility 210, based on information or data gathered by the sensors 254. Such models may be generated as vectors or functions over time that represent motion of body parts embodied by nodes and edges between such nodes, or in any other manner.

For example, a number and positions of actors within a material handling facility may be identified based on imaging data captured by a plurality of cameras, such as based on one or more outlines, faces or other attributes of actors (e.g., customers, workers or other humans) detected in images captured by any of the cameras and recognized as corresponding to one or more actors, or possibly corresponding to one or more actors. A record of the number of actors within the materials handling facility, or the identities of the actors, may be determined based on images captured by such cameras (e.g., according to one or more other facial recognition and/or other object recognition techniques). Alternatively, a number and/or a position of one or more actors within the materials handling facility may be determined based on information or data gathered by one or more sensors other than a camera. For example, a materials handling facility may include a scanner, a reader or other device configured to identify actors who enter or exit the materials handling facility, e.g., based on information or data provided by an application operating on a mobile device carried by such actors, or in any other manner. In some implementations, the cameras that are used to determine the number and/or the position of the actors within the materials handling facility may be one or more of the same sensors that detected the event. In some implementations, the cameras need not be the same sensors that detected the event.

In some implementations, nodes corresponding to body parts may be represented in space by a set of Cartesian coordinates, or coordinates according to any other system, and an articulated model in the form of a record or vector may include one or more of such sets of coordinates. In some implementations, edges extending between a pair of nodes may be established by reference to each of the nodes of the pair, as well as a linear formula, a linear equation or other representation of points extending between the respective nodes of the pair, and an articulated model in the form of a record or a vector may identify edges by reference to their respective nodes, or include one or more of such formulas, equations or other representations for such edges. For example, detections of body parts may be matched across multiple views in two-dimensional images and converted to three-dimensional rays that begin at optical elements of the respective imaging devices and terminate at surfaces of objects at a given pixel, based on the intrinsic properties of such imaging devices and extrinsic properties of a scene, and merged into one, e.g., by triangulating the rays corresponding such detections, thereby enabling a body part to be detected and re-detected in the multiple views even if the body part is temporarily occluded in one of the views. The trajectories may be models of smoothed three-dimensional tracks that best fit a plurality of two-dimensional observations of a body part within multiple images. In some implementations, trajectories may be defined by minimizing differences between ray projections extending from optical elements of imaging devices to pixels depicting specific body parts detected within images captured by such imaging devices and splines or other curves defined from such frames, e.g., according to a least squares problem. Any method or technique for defining a three-dimensional track or trajectory of a body part or an actor from two-dimensional observations of the body part or the actor in images may be utilized in accordance with the present disclosure.

The event generator system 260 comprises a plurality of sensors 264-1, 264-2 . . . 264-*m* that are provided in one or more select locations within the materials handling facility 210. Each of the sensors 264-1, 264-2 . . . 264-*m* may be configured to detect information or data from which a location at which an event has occurred, or a time (or duration) of the event, e.g., an interval of time that includes the time of the event, may be determined. In some implementations, an item associated with an event may be identified based on the location and/or the time (or duration) of the event based on planogram data, which may indicate the placement of one or more items in inventory areas or storage units within the materials handling facility 210.

For example, one or more of such sensors 264-1, 264-2 . . . 264-*m* may be an imaging device configured to capture imaging data regarding an inventory area and/or storage unit, and whether an event has occurred, and a time of such an event, may be determined based on such imaging data. One or more of such sensors 264-1, 264-2 . . . 264-*m* may include load or weight sensors provided in association with inventory area or storage unit, and whether an event has occurred, and a time of such an event, may be determined based on load signals received from such load or weight sensors or, alternatively, changes in load signals indicating increases or decreases in loading applied to the inventory area or storage unit. An item associated with such an event may be determined based on one or more magnitudes of such changes. For example, when an actor is determined to have accessed an inventory area or shelving unit to retrieve an item therefrom at a specific location, and a number of items are located within a vicinity of the specific location, a change in the mass of all of the items present on the shelf may be determined, and one of the items within the vicinity of the specific location having a mass consistent with the determined change in the mass of all of the items present on the shelf may be presumed to have been retrieved by the actor.

Alternatively, one or more of such sensors 264-1, 264-2 . . . 264-*m* may include RFID components (e.g., antennas or tags) for transmitting and/or receiving RFID signals associated with items or inventory areas and/or storage units, and whether an event has occurred, and a time of such an event, may be determined based on the receipt of such signals, or the loss of such signals. An item associated with such an event may be determined based on the respective RFID signals that are transmitted or received, or are no longer received. As another alternative, one or more of such sensors 264-1, 264-2 . . . 264-*m* may include one or more LIDAR components for transmitting and/or receiving one or more light signals in association with inventory areas and/or storage units, and whether an event has occurred, and a time of such an event, may be determined on the light signals that are transmitted or received.

The type or form of sensors 264-1, 264-2 . . . 264-*m* provided in association with the event generator system 260 are not limited. Moreover, one of the sensors 264-1, 264-2 . . . 264-*m* may be in communication with a central processor or server of the event generator system 260 (not shown) that may receive information or data from such sensors 264-1, 264-2 . . . 264-*m*, and provide such information or data (e.g., digital and/or analog data) to one or more other computing devices or resources that may be connected to the network 290, as is indicated by line 268, or for any other purpose. Alternatively, one or more of the sensors 264-1, 264-2 . . . 264-*m* may be outfitted with processors and/or transceivers for independently transmitting or receiving information or data (e.g., digital and/or analog data) to or from one or more other computing devices or resources that may be connected to the network 290, as is indicated by line 268, or for any other purpose.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

Those of ordinary skill in the pertinent arts will understand that process steps described herein as being performed by a "materials handling facility," a "locating service," an "event generator system," an "actor" (or "customer," or "user," or "worker," or "human operator") or like terms, may be automated steps performed by their respective computer devices or resources, or implemented within software modules (or computer programs) executed by one or more general purpose computers. Those of ordinary skill in the pertinent arts would also recognize that process steps described as being performed by a "materials handling facility," a "locating service," an "event generator system" or an "actor" (or "customer," or "user," or "worker," or "human operator") may be typically performed by a human, but could, alternatively, be performed by an automated agent.

The materials handling facility 210 (or any actors associated therewith), the imaging devices 220-1, 220-2 . . . 220-*n*, the locating service 250 and/or the event generator system 260 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages. For example, the servers 212 may be adapted to transmit or receive information or data in the form of synchronous or asynchronous messages to or from the imaging devices 220-1, 220-2 . . . 220-*n*, the locating service 250 and/or the event generator system 260, or any other computer device (e.g., any device having any number of other servers, data stores, processors or the like) in real time or in near-real time, or in one or more offline processes, via the network 290. Those of ordinary skill in the pertinent art would recognize that the materials handling facility 210 (or any actors associated therewith), the imaging devices 220-1, 220-2 . . . 220-*n*, the locating service 250 and/or the event generator system 260 may operate any of a number of computing devices or resources that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a transitory and/or non-transitory computer-readable medium that is within or accessible by computers or computer components such as the servers 212, the data stores 214, the processor 216, the imaging devices 220-1, 220-2 . . . 220-*n*, the processor 252, the sensors 254 and/or the sensors 264-1, 264-2 . . . 264-*m*, or any other computers or control systems utilized by the materials handling facility 210, the imaging devices 220-1, 220-2 . . . 220-*n*, the locating service 250 and/or the event generator system 260 and having sequences of instructions which, when executed by a processor (e.g., a central processing unit, or "CPU," or a graphics processing unit, or "GPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an imaging device, or two or more imaging devices, which may control one or more aspects of the capture, processing and/or storage of imaging data. In some other implementations, each of such functions or tasks may be executed by processors that are external to an imaging device, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more imaging devices, while other functions or tasks may be executed by processors located in one or more other physical, alternate or virtual locations.

Figure 3:
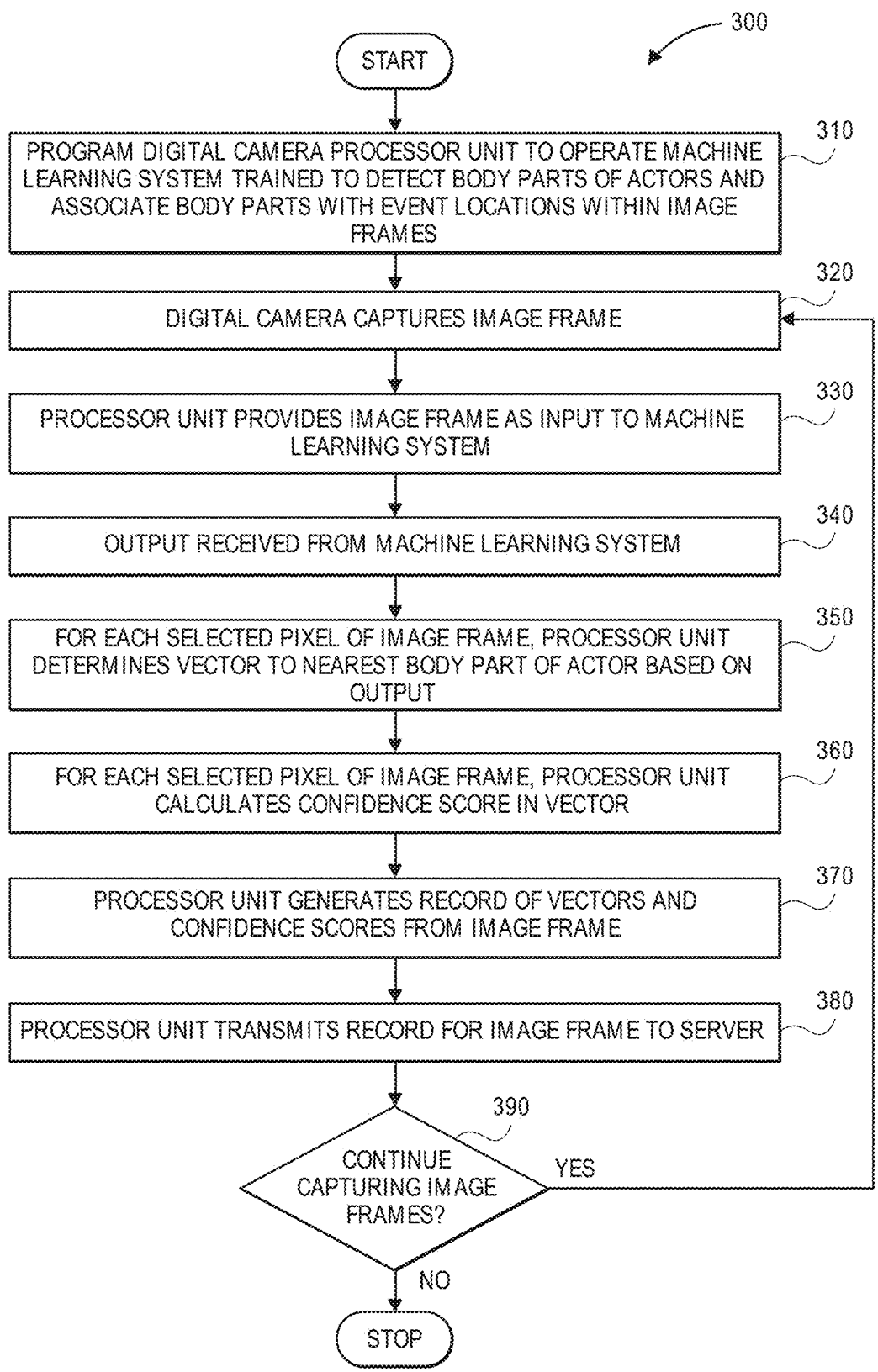
FIG. 3 is a flow chart of one process for associating events with actors using digital imagery and machine learning in accordance with implementations of the present disclosure.

As is discussed above, one or more imaging devices of the present disclosure, or one or more other computer processors, systems or resources, may be programmed to execute a machine learning system or technique for detecting bodies or body parts of actors within imaging data (e.g., images) captured thereby, for determining which of the pixels expressed within the imaging data is most likely associated with one of such bodies, and for calculating a confidence score or other metric reflective of confidence in the determined association between a given pixel and a given body. Referring to FIG. 3, a flow chart 300 of one process for associating events with actors using digital imagery and machine learning in accordance with implementations of the present disclosure is shown. At box 310, a processor unit operating on a digital camera is programmed to operate a machine learning system that is trained to detect body parts (e.g., heads, or any other body parts) within images, and to associate such body parts with locations within the images (e.g., pixels). For example, the machine learning system may be a convolutional neural network, a deep learning neural network, or other machine learning system or technique that includes one or more output layers for predicting event-to-actor regressions from each pixel of an image received as an input, and for determining a confidence score associated with such predictions. In some implementations, for each pixel of the image, event-to-actor regressions may take the form of a coordinate pair, e.g., an (x, y) pair identifying a pixel associated with a body part of an actor within an image plane of the image, and confidence scores may range between zero and one, or have any other value. Alternatively, one or more processors or processor units operating on other computer devices or machines may be configured to operate the machine learning system to detect the body parts within the images captured by the digital camera, or to associate such body parts with locations within such images. In some implementations, such processors or processor units may be provided in the same physical location as the digital camera, or in close proximity to the digital camera. In other implementations, the processors or processor units may be provided in one or more computer devices or machines in other locations, e.g., alternate or virtual locations, such as in a "cloud"-based environment.

In some implementations, a plurality of imaging devices or other digital cameras may be mounted and installed to include one or more common locations within overlapping fields of view of two or more of the imaging devices, and each of the imaging devices may be programmed to operate one or more of such machine learning systems accordingly. In some other implementations, however, the imaging devices or other digital cameras need not have overlapping fields of view. Additionally, in some implementations, the imaging devices and the machine learning systems or techniques operating thereon may be pre-trained by one or more image classification systems, using images having sequentially increasing levels of resolution, and the images may be flipped, cropped, rotated, scaled or otherwise transformed during training, which may occur individually or in one or more batch processes.

At box 320, the digital camera captures an image, which may be a single image (e.g., a still image) or a plurality of images captured in series (e.g., moving images, or motion pictures). The image may have any at any frame rate, such as fifteen, twenty, thirty or sixty frames per second. At box 330, the processor unit provides the image to the machine learning system as an input, and at box 340, an output is received from the machine learning system.

At box 350, the processor unit determines a vector to a nearest body part for each selected pixel of the image, and at box 360, the processor unit calculates a confidence score associated with the vector. In some implementations, the output may include coordinates of bodies or body parts and confidence scores for each of the pixels of the image. In some implementations, however, the output may include coordinates of body parts and confidence scores for select pixels within the image, such as portions of the image depicting predetermined regions such as inventory shelves, storage units or other like systems. In some implementations, the vectors may be determined and the confidence scores may be calculated by one or more processors or processor units that are external to the digital camera.

For example, when an inventory area is established and includes a plurality of inventory shelves or other storage units, pixels corresponding to centroids or other regions associated with access points for such inventory shelves or storage units (e.g., "touchpoints") may be identified within the image planes of an imaging device as portions of the image planes where an event is likely to occur, thereby functionally reducing the amount of data and the scope of the processing that is required for each image. Thus, when an image is captured, rather than identifying coordinates of bodies or body parts and confidence scores for each of the pixels of the image, the machine learning system may be configured to produce coordinates of bodies or body parts and confidence scores for only the predetermined pixels associated with locations within the image planes where an event is likely to occur, thereby conserving processing power and memory capacity of the digital camera, as well as network bandwidth.

At box 370, the processor unit generates a record of the vectors and confidence scores associated with the selected pixels of the image, and at box 380, the processor unit transmits the record for the image to a server. The records may take any form, and may be transferred to the server wirelessly or via a wired connection, in a synchronous or asynchronous manner, separately or in one or more records of a batch. In some implementations, the records may take the form of an array or grid of cells that mimicking the size or shape of an image from which each was generated, with each of the cells corresponding to a pixel of the image and having values of the coordinates of an image plane corresponding to a body part of a most likely actor, and a value of a confidence score for that body part. The records may include values for each of the pixels of the image or, alternatively, values for a select number of the pixels (e.g., fewer than all of the pixels of the image). Additionally, in some implementations, the processor unit may transmit the record to the server, along with the image from which the record was generated. As is noted above, in some implementations, the records may be generated and transmitted by one or more processors or processor units that are external to the digital camera.

In some implementations, a plurality of digital cameras may be installed within a materials handling facility or other facility and include one or more locations within overlapping fields of view, such as the imaging devices 120-1, 120-2 of FIGS. 1A and 1B. Each of the digital cameras may be configured to capture digital images and to process one or more of the digital images by machine learning to detect body parts within such images and to associate pixels with such body parts, e.g., by performing one or more of the process steps associated with boxes 310 through 370, or other process steps, and may individually transmit their respectively generated records to the server wirelessly or via one or more wired connections. In other implementations, the digital cameras need not have overlapping fields of view.

At box 390, whether the digital camera is to continue capturing images is determined. If the continued capture of images is desired, then the process returns to box 320, where the digital camera captures another image, and to box 330, where the digital camera provides the image to the machine learning system as an input. If the continued capture of images is no longer desired, however, then the process ends.

As is discussed above, records of vectors extending between pixels and a body part (e.g., a head, or any other body part) of an actor that is most likely associated with an event occurring at such pixels may be generated for each of the pixels of an image, or for a subset of the pixels of the image. For example, a select number of the pixels of an image corresponding to an inventory area or storage unit depicted therein may be identified as associated with access points (or contact points) for items stored on such inventory areas or storage units, namely, locations where an actor may interact with such items during an event. The select number of the pixels of the images corresponding to the inventory area or the storage unit may be determined based on planogram data, or other information or data, which may identify locations of inventory areas or storage units and, alternatively, one or more items stored or maintained in each of such locations. Referring to FIGS. 4A through 4E, views of aspects of one system for associating events with actors using digital imagery and machine learning in accordance with implementations of the present disclosure are shown. Except where otherwise noted, reference numerals preceded by the number "4" shown in FIGS. 4A through 4E indicate components or features that are similar to components or features having reference numerals preceded by the number "2" shown in FIG. 2A or 2B, by the number "1" shown in FIGS. 1A through 1J.

Figure 4A:
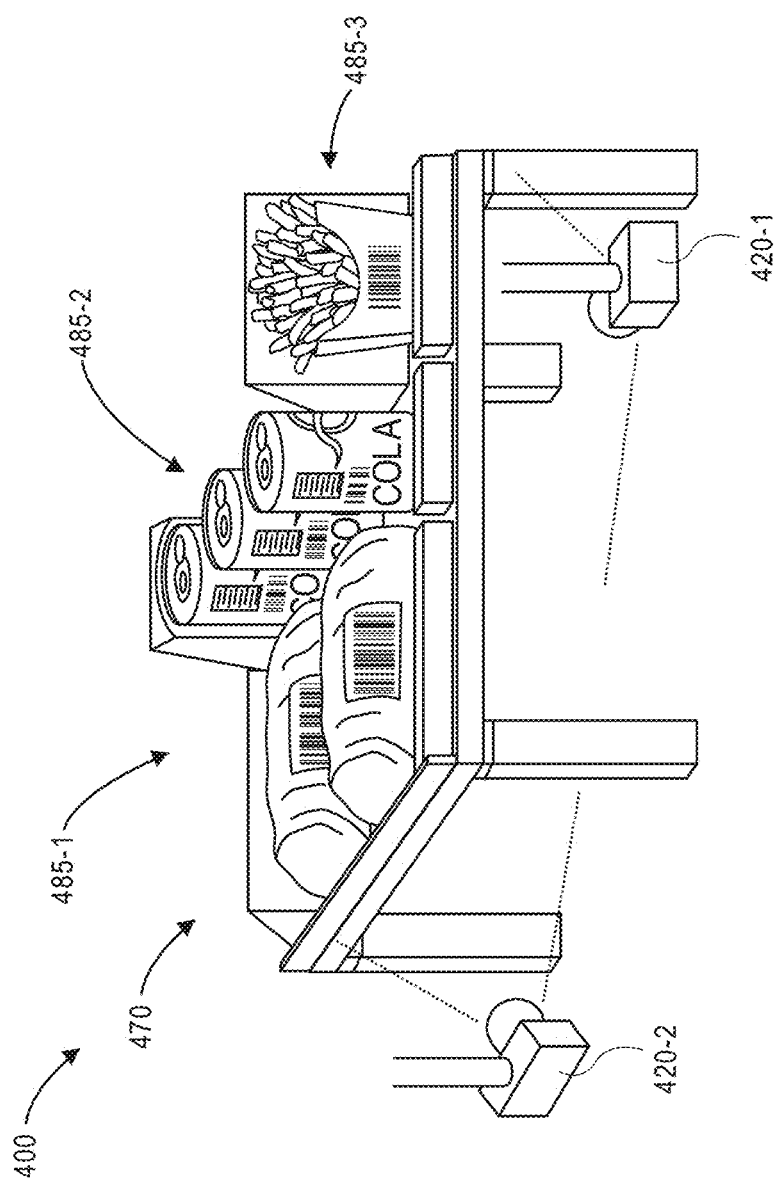
FIGS. 4A through 4E are views of aspects of one system for associating events with actors using digital imagery and machine learning in accordance with implementations of the present disclosure.
Figure 4B:
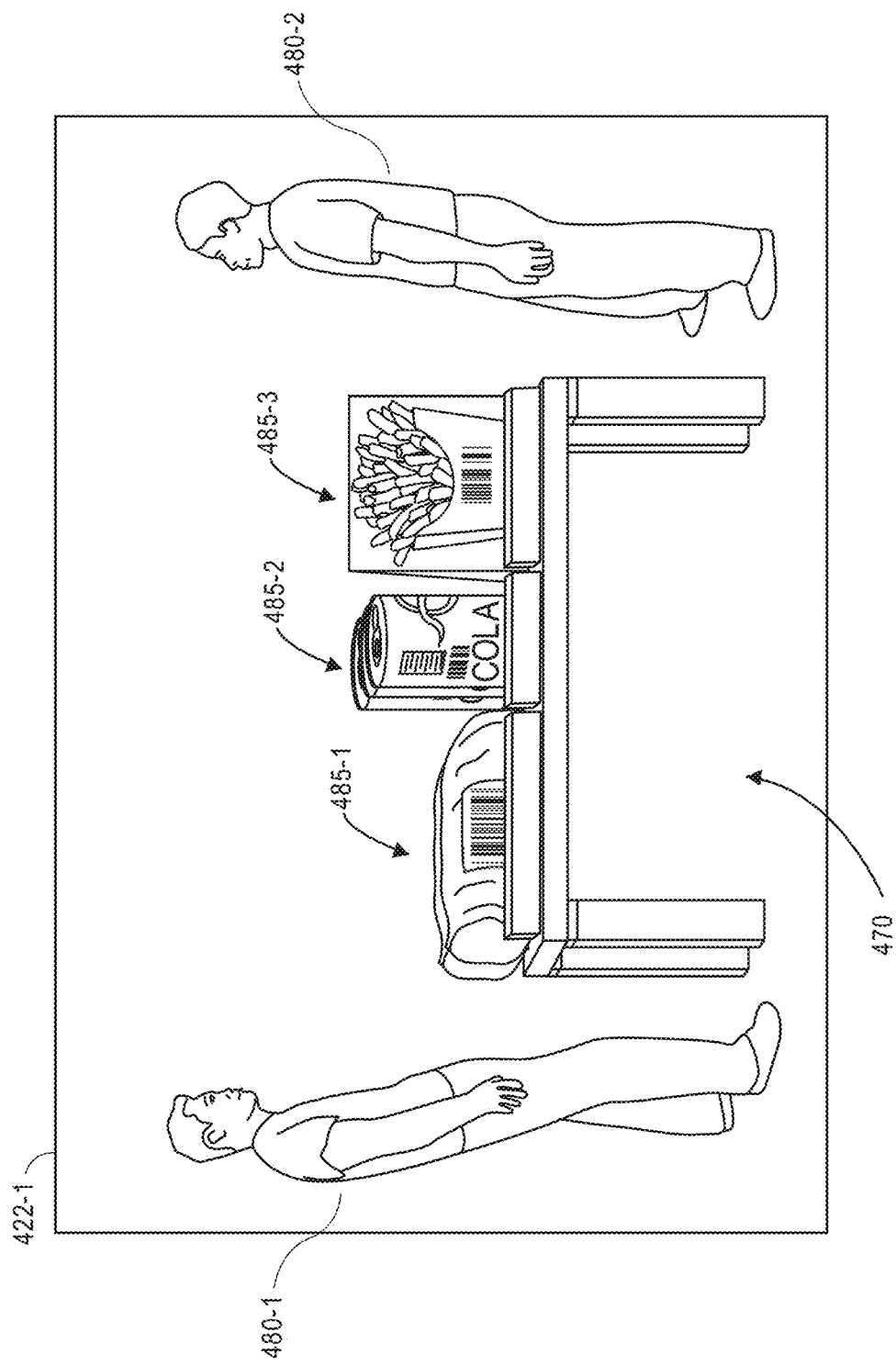

As is shown in FIG. 4A, a system 400 includes a pair of imaging devices 420-1, 420-2 and an inventory area 470 (or storage unit) provided at least partially within the fields of view of the imaging devices 420-1, 420-2. The inventory area 470 includes a storage area having a plurality of items 485-1, 485-2, 485-3 provided thereon. As is shown in FIG. 4B, an image 422-1 captured by the imaging device 420-1 depicts a pair of actors 480-1, 480-2 within a vicinity of the inventory area 470.

Figure 4C:
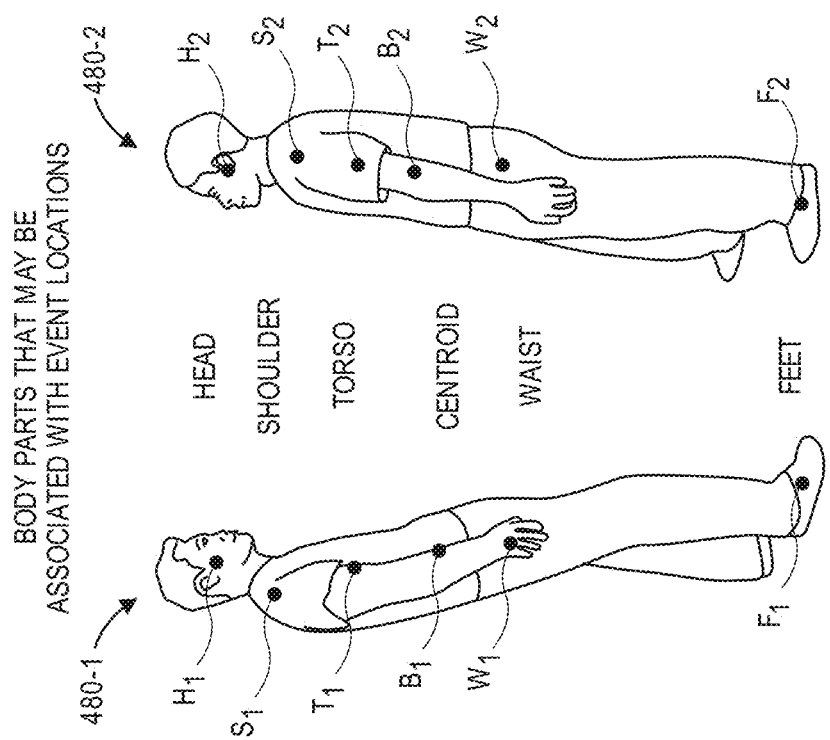

In accordance with the present disclosure, the imaging devices 420-1, 420-2 may be configured to execute one or more machine learning systems or techniques for detecting one or more body parts of actors depicted within images captured thereby and for associating pixels of such images with one of such body parts. As is shown in FIG. 4C, the machine learning systems or techniques may be configured to detect any body parts of the actors 420-1, 420-2 depicted within images, and to associate such body parts with locations of events within such images. For example, as is shown in FIG. 4C, a machine learning system or technique, such as a residual neural network, may be trained to recognize heads $H_1$, $H_2$, shoulders $S_1$, $S_2$, torsos $T_1$, $T_2$, waists $W_1$, $W_2$, feet $F_1$, $F_2$, or other body parts of the actors 480-1, 480-2, or a region or portion of such actors, such as centroids $B_1$, $B_2$ of the actors 480-1, 480-2, within the images. In some implementations, the body parts may be recognized within the image by one or more processors or processor units that are external to the imaging devices 420-1, 420-2.

Figure 4D:
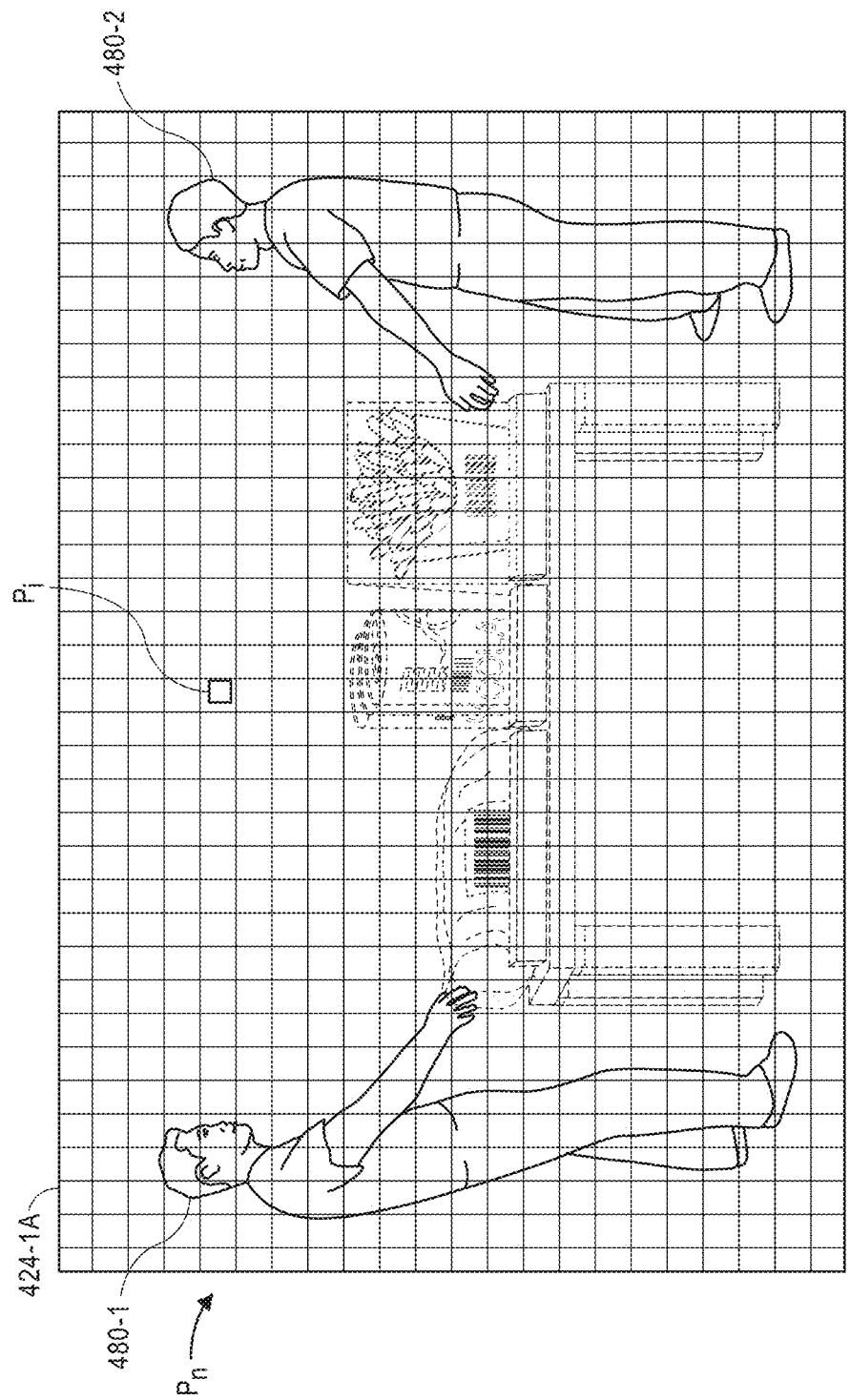

In accordance with the present disclosure, machine learning systems or techniques operated by processor units of imaging devices or elsewhere may generate one or more records, e.g., segmentation records, including vectors extending from locations (e.g., pixels) within images to detected portions of bodies or body parts within such images, and confidence scores associated with such vectors. As is shown in FIG. 4D, a segmentation record 424-1A is generated by a processor unit (e.g., a CPU, or a GPU) or other processors operating on the imaging device 420-1 from the image 422-1, which may be provided as an input to a machine learning system or technique operated by the processor unit. The segmentation record 424-1A may be generated based on outputs received from the machine learning system or technique. In some implementations, the segmentation record 422-1A may be generated from the image 422-1 by one or more processors or processor units that are external to the imaging devices 420-1, 420-2. As is shown in FIG. 4D, the segmentation record 424-1A identifies, for each of the pixels $P_i$ of the pixels $P_n$ of the image 422-1, values of coordinates $(x_j, y_j)$ of one body part $B_j$ of one of the actors 480-1, 480-2 with which an event occurring at the pixel $P_i$ is most likely associated. The segmentation record 424-1A further includes a value of a confidence score $C_{ij}$ associated with a level or metric of confidence in the identification of the one of the body parts $B_j$, e.g., a level or metric of confidence in the coordinates $(x_j, y_j)$, of the one of the actors 480-1, 480-2 for that pixel $P_i$. The imaging device 420-2 may be similarly programmed or configured to generate a segmentation record for images captured thereby, as well.

Thus, for each image captured by the imaging devices 420-1, 420-2, a record of vectors extending from each pixel of the image to a location of a body part depicted within the image, as well as a score or other metric reflecting a level of confidence in a selection of the body part, may be calculated for each pixel of the image.

Alternatively, vectors and confidence scores may be determined for fewer than all of the pixels of an image. In particular, pixels that are associated with locations where events are most likely to occur may be identified, e.g., based on planogram data or any other information or data, and associated with body parts depicted within such images. Vectors identifying locations of such body parts, and confidence scores associated with such body parts, may be calculated and stored in one or more records that may be transferred to a central server or other location, along with records that are similarly generated by other imaging devices.

Figure 4E:
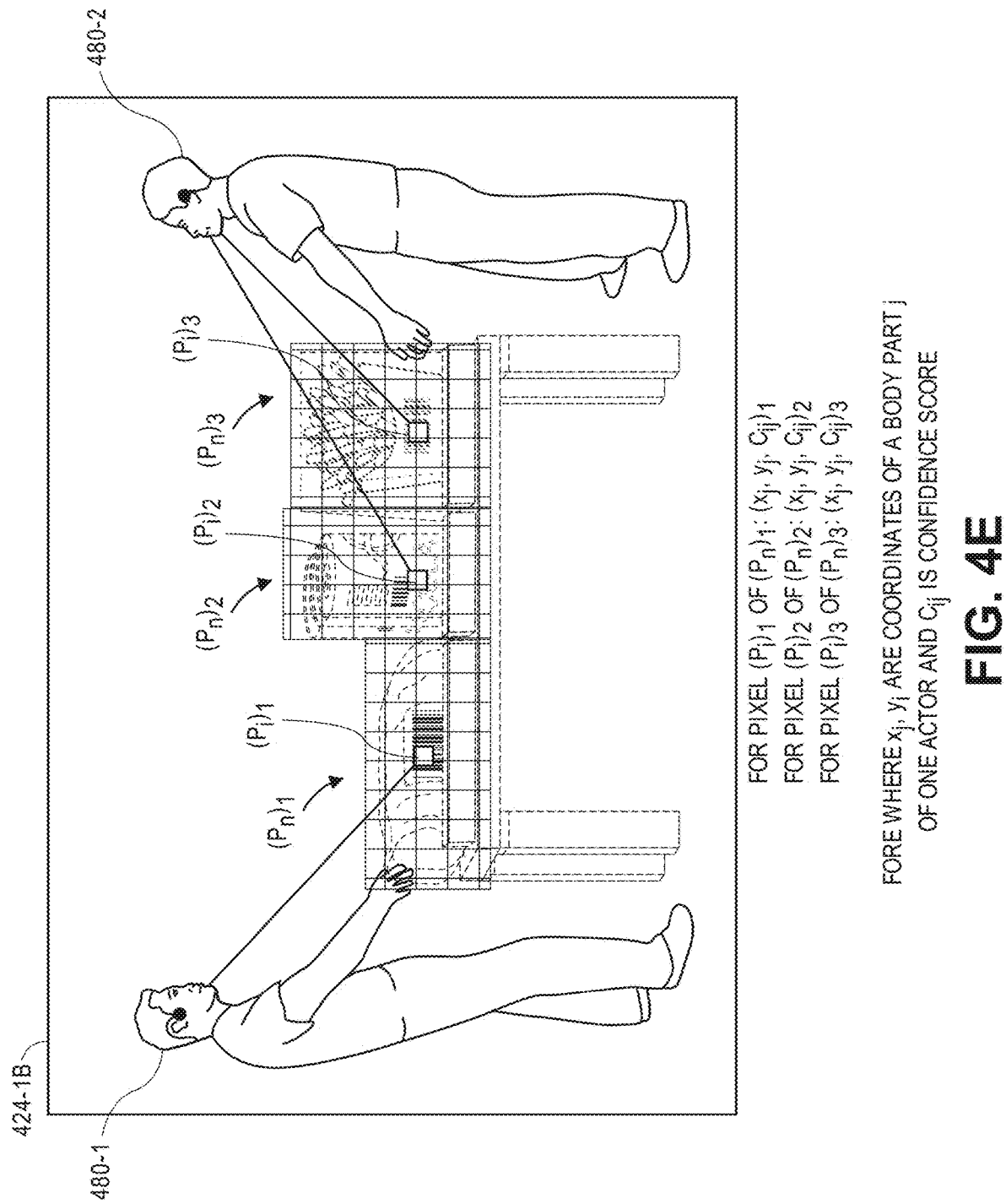

As is shown in FIG. 4E, a segmentation record 424-1B is generated by the processor unit operating on the imaging device 420-1 from on the image 422-1, which may be provided as an input to a machine learning system or technique operated by the processor unit. The segmentation record 424-1B may be generated based on outputs received from the machine learning system or technique. As is shown in FIG. 4E, the segmentation record 424-1B identifies body parts that are associated with subsets of pixels $(P_n)_1$, $(P_n)_2$, $(P_n)_3$ of the image 422-1. In some implementations, the segmentation record 424-1B may be generated from the image 422-1 by one or more processors or processor units that are external to the imaging devices 420-1, 420-2.

The subsets of the pixels $(P_n)_1$, $(P_n)_2$, $(P_n)_3$ shown in FIG. 4E correspond to locations within an image plane of the imaging device 420-1 where an event may be most likely to occur (e.g., touchpoints for one or more of the items 485-1, 485-2, 485-3 at the storage unit 470), which may be identified based on planogram data or any other information or data regarding at the storage unit 470. By identifying pixels where an event will be most likely detected within an image plane, efficiencies of the processes by which body parts are identified within images and associated with pixels of such images may be enhanced accordingly, thereby conserving processing power, memory and/or bandwidth of the imaging devices 420-1, 420-2.

For each of the pixels $(P_i)_1$, $(P_i)_2$, $(P_i)_3$ of the subsets of the pixels $(P_n)_1$, $(P_n)_2$, $(P_n)_3$, the segmentation record 424-1B includes values of coordinates $(x_j, y_j)$ of one body part $B_j$ of one of the actors 480-1, 480-2 depicted within the image 422-1 with which an event occurring at such pixels $(P_i)_1$, $(P_i)_2$, $(P_i)_3$ is most likely associated. The segmentation record 424-1B further includes a value of a confidence score $C_{ij}$ associated with a level or metric of confidence in the identification of the one body part $B_j$ of one of the actors 480-1, 480-2 for each of the pixels $(P_i)_1$, $(P_i)_2$, $(P_i)_3$ of the subsets of the pixels $(P_n)_1$, $(P_n)_2$, $(P_n)_3$.

Although the subsets of the pixels $(P_n)_1$, $(P_n)_2$, $(P_n)_3$ shown in FIG. 4E are shown as collections of pixels of the image 422-1 corresponding to locations at the storage unit 470 where an event may be most likely to occur, e.g., within an image plane of the imaging device 420-1, any number of pixels within the image 422-1 may be identified and provided to a machine learning system or technique as inputs in order to identify which of the body parts depicted within the image 422-1 is most likely associated with such pixels. For example, one or more single pixels of interest corresponding to surfaces of the storage unit 470 where the items 485-1, 485-2, 485-3 are located may be selected and provided to a machine learning system or technique as inputs. Such pixels may be identified when the storage area 470 is initially assembled, or when the items 485-1, 485-2, 485-3 are placed thereon, e.g., based on planogram data. Alternatively, pixels of interest within an image plane of an imaging device may be identified based on one or more images captured by the imaging device. For example, where the imaging device 420-1 captures an image, e.g., the image 422-1, the image may be processed to determine whether the image depicts one or more items (e.g., the one or more items 485-1, 485-2, 485-3). Upon determining that the image depicts the one or more items, and not to background features or other aspects of the shelving unit 470, portions of the image depicting such items that are to be provided to a machine learning system as inputs may be identified by any technique and in any manner in accordance with the present disclosure.

Imaging devices that generate records of vectors extending between pixels of such images and body parts depicted within such images, and scores reflecting confidence in such vectors, may provide such records to a server or other computer system on a continuous basis. When an indication that an event has occurred at a location is received by the server, records pertaining to images that depicted the event may be identified and utilized to determine which of a plurality of actors is associated with the event. Referring to FIGS. 5A through 5E, views of aspects of one system for associating events with actors using digital imagery and machine learning in accordance with implementations of the present disclosure are shown. Except where otherwise noted, reference numerals preceded by the number "5" shown in FIGS. 5A through 5E indicate components or features that are similar to components or features having reference numerals preceded by the number "4" shown in FIGS. 4A through 4E, by the number "2" shown in FIG. 2A or 2B, by the number "1" shown in FIGS. 1A through 1J.

Figure 5A:
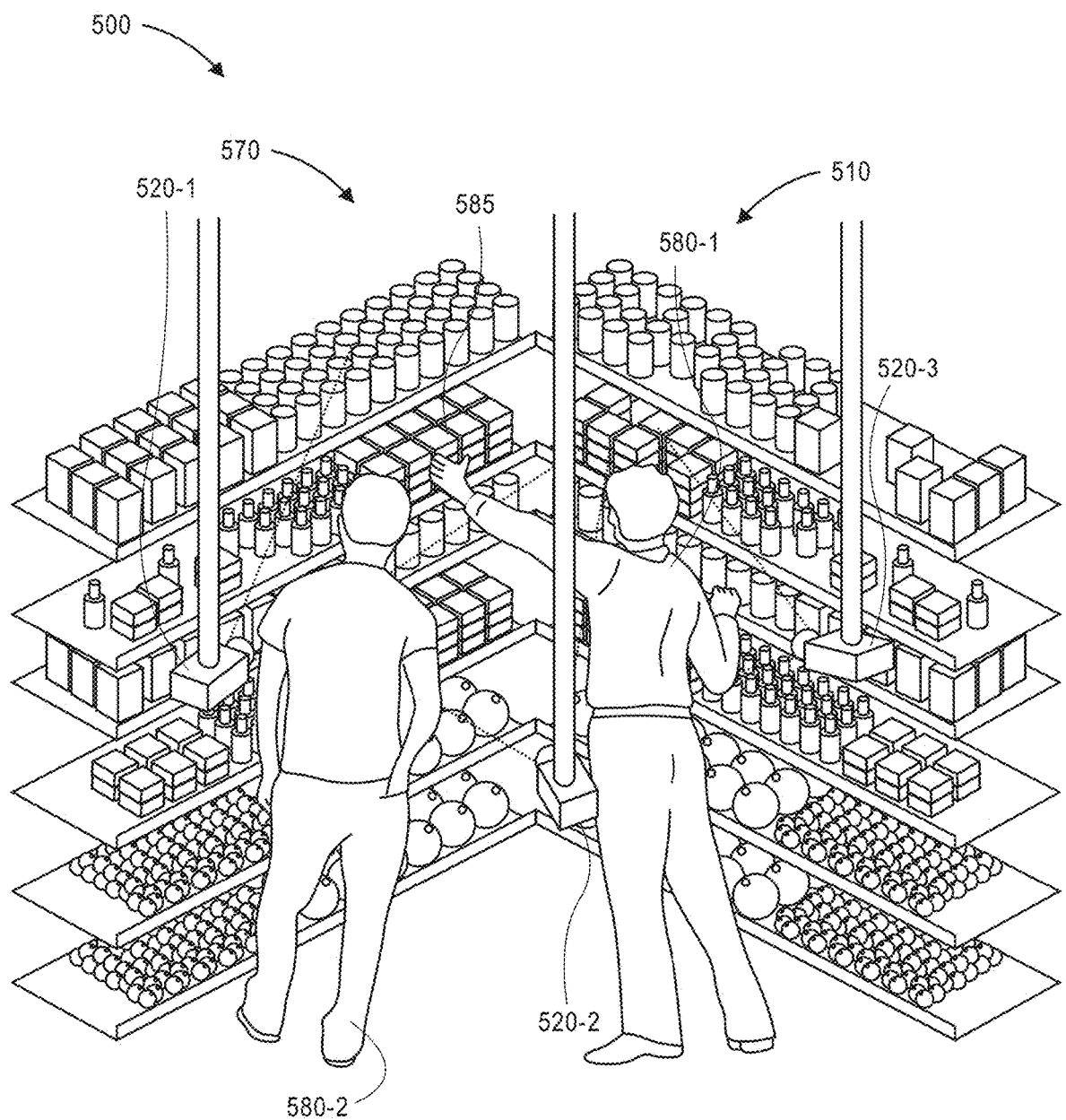
FIGS. 5A through 5E are views of aspects of one system for associating events with actors using digital imagery and machine learning in accordance with implementations of the present disclosure.

As is shown in FIG. 5A, a system 500 includes a materials handling facility 510 having a plurality of imaging devices 520-1, 520-2, 520-3 which include a storage unit 570 within their fields of view. The storage unit 570 includes a plurality of items on one or more shelves. As is shown in FIG. 5A, a pair of actors 580-1, 580-2 are located at the materials handling facility 510, within a vicinity of the storage unit 570, and the actor 580-1 reaches for an item 585 on the storage unit 570.

Figure 5B:
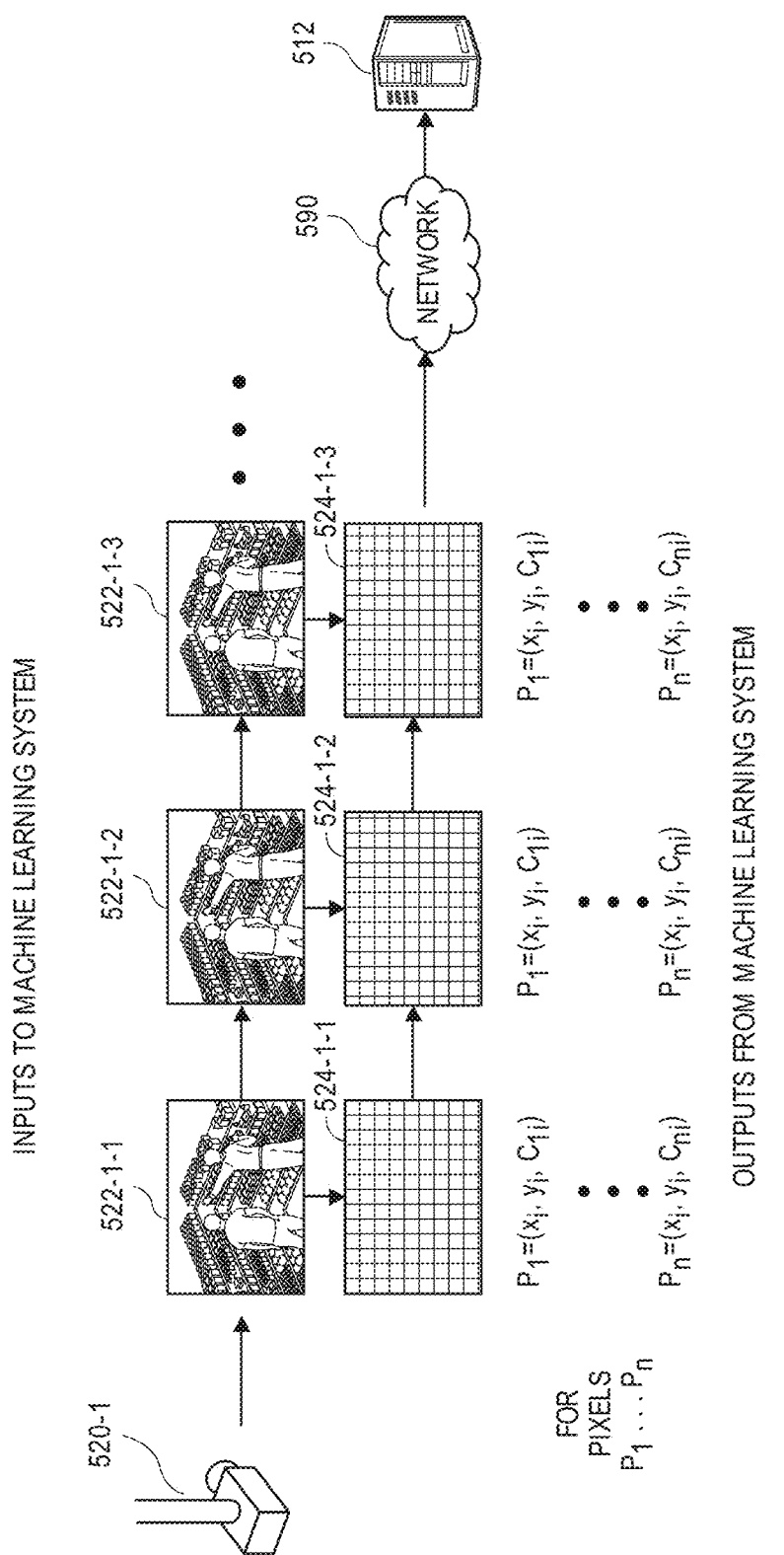
Figure 5C:
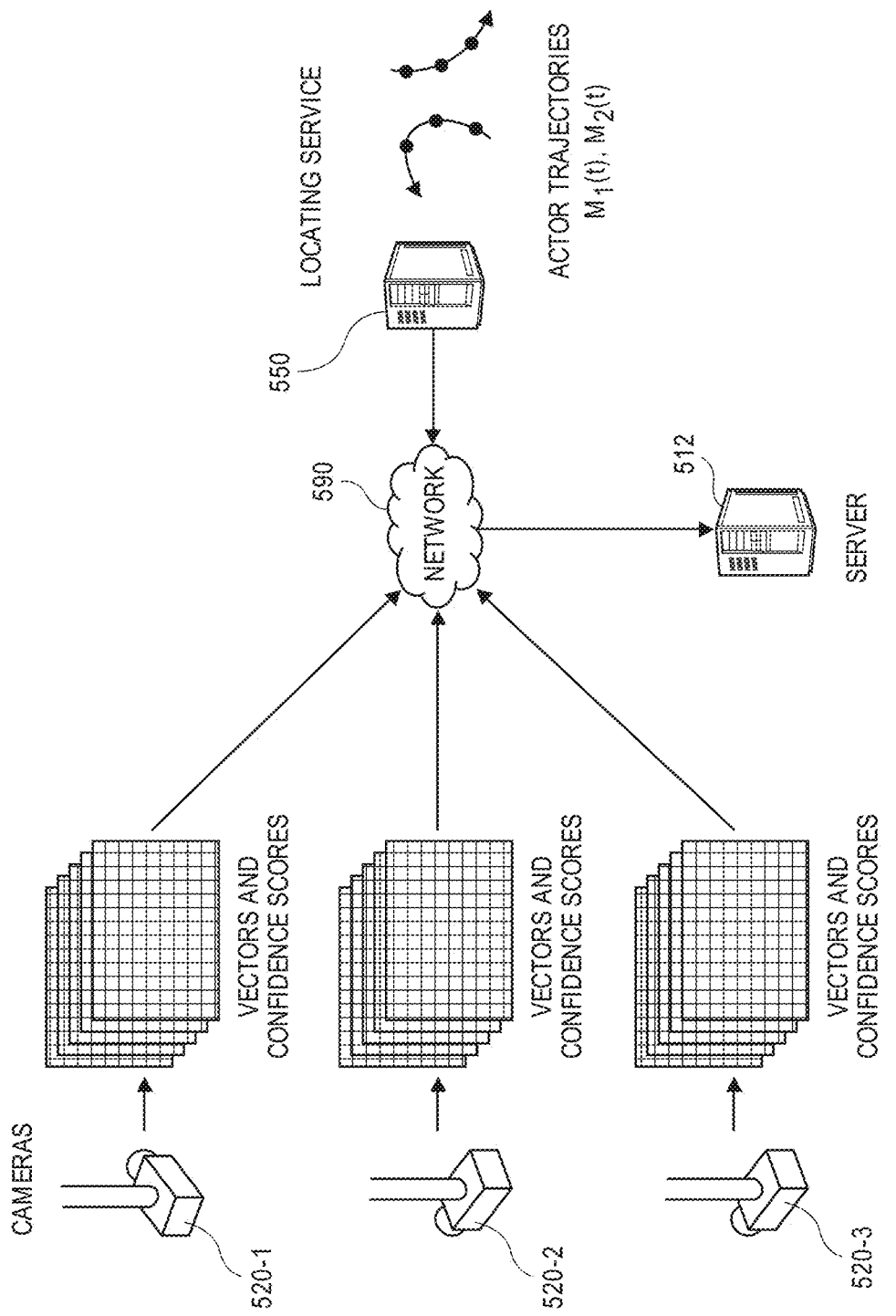

In accordance with some implementations of the present disclosure, the imaging devices 520-1, 520-2, 520-3 are programmed to execute a machine learning system or technique on images captured thereby. As is shown in FIG. 5B, the imaging device 520-1 captures a plurality of images 522-1-1, 522-1-2, 522-1-3 of the storage unit 570, and provides such images as inputs to a machine learning system or technique (e.g., a convolutional neural network) operating thereon. Vectors extending between pixels of the images 522-1-1, 522-1-2, 522-1-3 and body parts of the actors 580-1, 580-2 detected within such images 522-1-1, 522-1-2, 522-1-3, and confidence scores associated with such vectors, may be calculated based on outputs received from the machine learning system. For example, as is shown in FIG. 5B, segmentation records 524-1-1, 524-1-2, 524-1-3 calculated for each of the pixels $P_i \ldots P_n$ within the images 522-1-1, 522-1-2, 522-1-3 may include coordinates $(x_j, y_j)_1 \ldots (x_j, y_j)_n$ of a body part (e.g., a head) that is most likely associated with a hypothetical event occurring at the pixels $P_i \ldots P_n$, and a confidence score $C_{j1} \ldots C_{jn}$ or other metric indicative of confidence in a determination that the body part is associated with the hypothetical event occurring at a pixel $P_i$ of the pixels $P_i \ldots P_n$, or $P_i=(x_j, y_j, C_{ij})$ through $P_n=(x_j, y_j, C_{nj})$.

The imaging devices 520-2, 520-3 of FIG. 5A may be programmed to capture images of the storage unit 570, to calculate vectors and confidence scores, and generate and transmit records to the server 512 in a similar manner. Additionally, although the system 500 of FIG. 5A includes just three imaging devices 520-1, 520-2, 520-3, the system 500 may include any number of imaging devices, which may include all or a portion of the shelving unit 570, or other shelving units of the materials handling facility 510, within their respective fields of view. In some implementations, the vectors and confidence scores may be calculated, and the records may be generated and transmitted to the server 512 over the network 590, by one or more processors or processor units that are external to the imaging devices 520-1, 520-2, 520-3.

Records of vectors and confidence scores calculated by each of the imaging devices 520-1, 520-2, 520-3 may be transmitted over the network 590 to the server 512 in any manner and at any speed or rate, such as on a continuous basis, in real time or in near-real time, including synchronously as such records are generated, or asynchronously, e.g., in one or more batch processes. Additionally, a locating service 550 may further detect the actors 580-1, 580-2 within the materials handling facility 510 using one or more sensors (e.g., imaging devices, load sensors, RFID components, LIDAR components), and may generate one or more trajectories (or tracklets) $M_1(t)$, $M_2(t)$ representative of the motion, the locations and/or the orientations of each of the actors 580-1, 580-2 within the materials handling facility 510, e.g., one or more three-dimensional articulated models of partial or complete sets of body parts of the actors within the materials handling facility 510, based on information or data gathered by such sensors. In some implementations, the trajectories, tracklets and/or models may be generated as vectors or functions over time that represent motion of body parts embodied by nodes and edges between such nodes, or in any other manner.

Figure 5D:
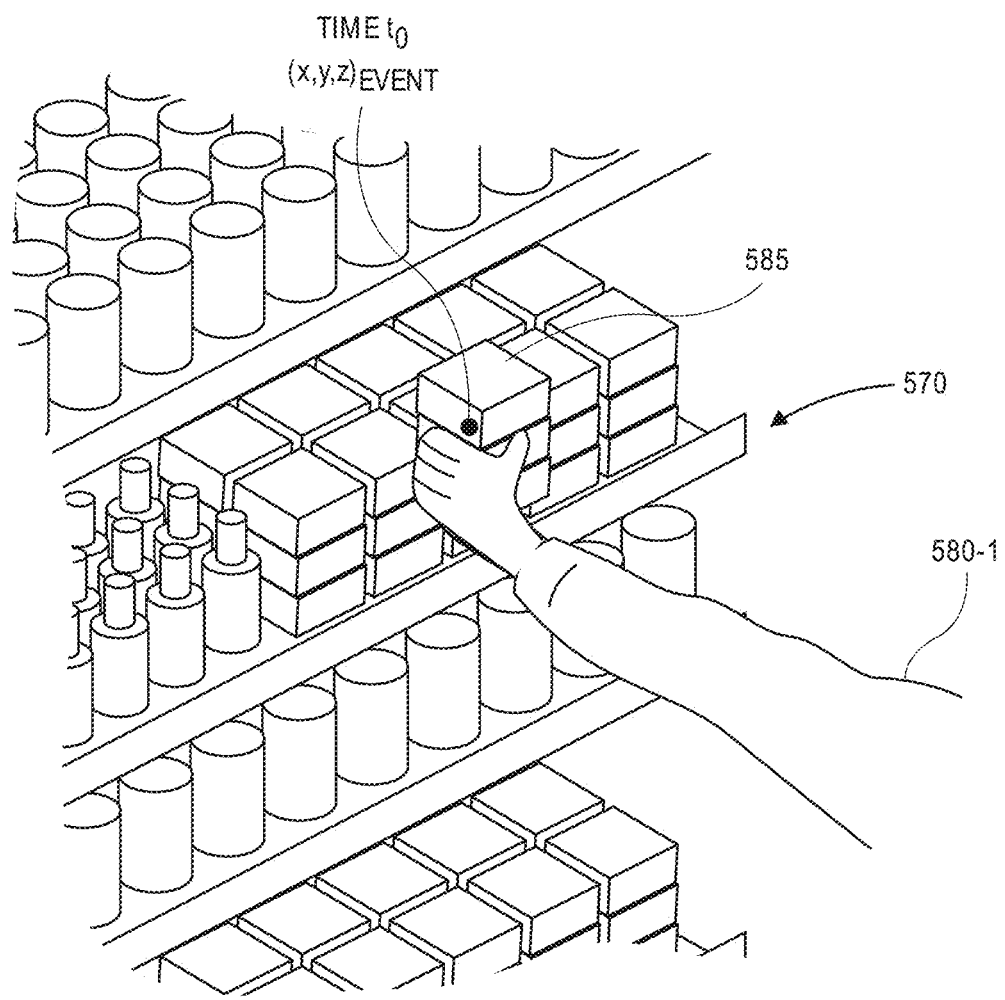
Figure 5E:
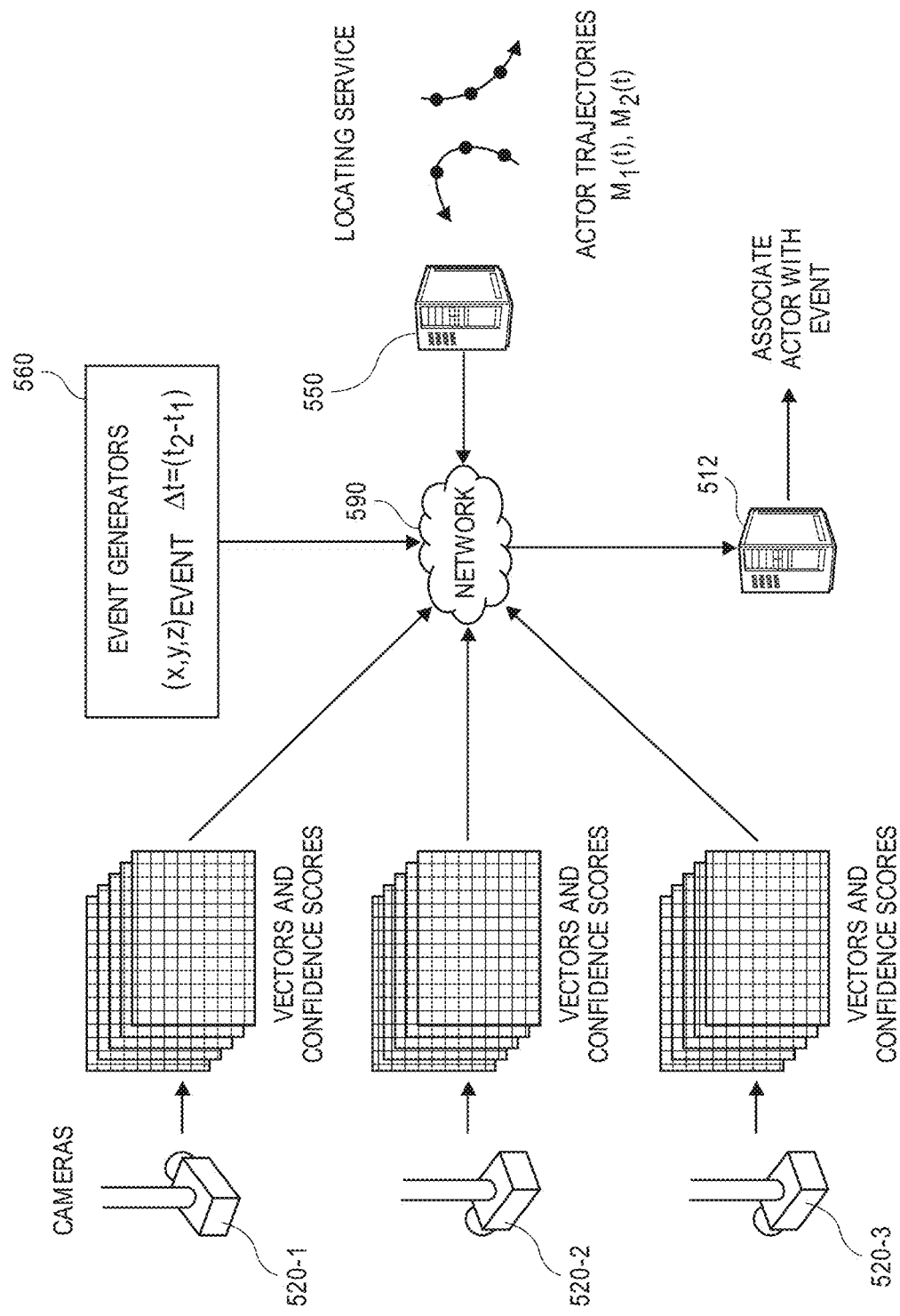

In some implementations, as is discussed above, the imaging devices 520-1, 520-2, 520-3 and the locating service 550 may continue to provide records of vectors and confidence scores and/or trajectories of actors to the server 512 over the network 590 and stored in one or more data stores, even when no events are determined to have occurred. When an event such as a retrieval of the item 585 from the shelving unit 570 is detected at a location $(x, y, z)_{EVENT}$ and at a time $t_0$, such as is shown in FIG. 5D, information regarding the event may be provided by an event generation system 560 to the server 512 over the network 590, such as is shown in FIG. 5E. For example, information or data regarding the event that is provided to the server 512 by the event generation system 560 may identify the location $(x, y, z)_{EVENT}$ of the event and the time to of the event (e.g., a single, discrete time, or times within one or more durations or windows, or intervals of time), as determined by any information or data obtained from any source, such as one or more images of the storage unit 570, a change in mass detected on the storage unit 570, one or more RFID signals received or lost at the storage unit 570, or any other information or data.

The server 512 may then determine which of the imaging devices 520-1, 520-2 included the location $(x, y, z)_{EVENT}$ within their respective fields of view at the time $t_0$, and identify the respective images captured by the imaging devices 520-1, 520-2 prior to the time $t_0$, at the time $t_0$ and/or after the time $t_0$, and the records generated based on the imaging devices 520-1, 520-2. The server 512 may further determine which of the images best depicts the location $(x, y, z)_{EVENT}$ at the time $t_0$, and whether any of the images are occluded or otherwise depict ineffective or suboptimal views of the location $(x, y, z)_{EVENT}$ at the time $t_0$. In some implementations, confidence scores may be weighted based on one or more measures of levels of quality of the respective images (e.g., quality scores). A predetermined number of the highest confidence scores may be identified for each of the actors depicted within the images captured prior to the time $t_0$, at the time $t_0$ and/or after the time $t_0$, and an actor may be associated with the event based on one or more of the highest confidence scores for that actor.

Figure 6:
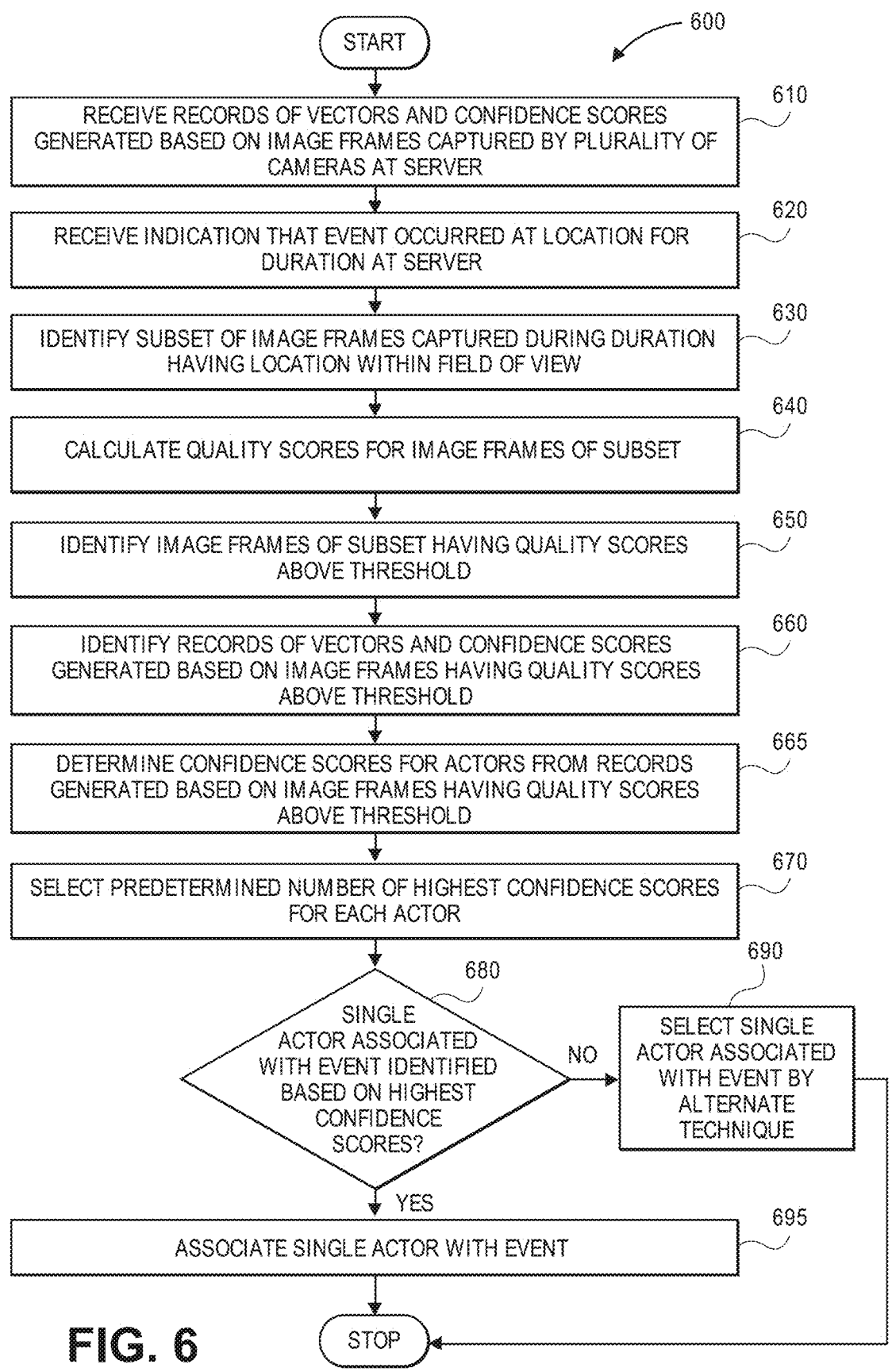
FIG. 6 is a flow chart of one process for associating events with actors using digital imagery and machine learning in accordance with implementations of the present disclosure.

Referring to FIG. 6, a flow chart 600 of one process for associating events with actors using digital imagery and machine learning in accordance with implementations of the present disclosure is shown. At box 610, a server receives a plurality of records of vectors and confidence scores generated based on images captured by a plurality of cameras. For example, referring again to the flow chart 300 of FIG. 3, each of the plurality of cameras may be programmed to execute one or more machine learning systems or techniques for segmenting bodies or body parts within images, and for identifying, for each of a plurality of selected pixels within such images, which of the segmented body parts is most likely associated with an event occurring at such pixels. In some implementations, each of the records may take the form of an array or grid of cells that mimicking the size or shape of an image from which each was generated, with each of the cells corresponding to a pixel of the image and having values of the coordinates of an image plane corresponding to a body part of a most likely actor, and a value of a confidence score for that body part. The records may include values for each of the pixels of the image or, alternatively, values for a select number of the pixels. In some implementations, however, the machine learning systems or techniques for segmenting the bodies or body parts within the images or for identifying each of the plurality of selected pixels within the images or the segmented body parts that are most likely associated with the event may be executed by one or more processors or processor units that are external to the imaging devices that captured the images.

At box 620, an indication that an event has occurred at a location within the fields of view of one or more of the cameras is received. For example, an event generator system having one or more sensors (e.g., load cells or other load sensors, RFID antennas or transmitters, LIDAR sensors, or imaging devices) or any other systems or components by which information regarding events may be gathered. One or more of such sensors may indicate that an event has occurred at the location, and at a specific time or during a specific interval of time.

In some implementations, an item associated with the event may be identified based at least in part on the indication, the location, or any other information or data. Where a location is associated with a specific item on an inventory shelf or other storage unit, and an event is determined to have occurred at that location, one of the specific item may be determined to be associated with the event. For example, when one or more load sensors detects a change in mass of approximately 3.08 pounds on one or more shelves or storage areas, an item having a mass of 3.08 pounds may be presumed to have been picked from or stowed on the one or more shelves or storage areas. Likewise, where an RFID signal associated with a specific item is detected, or is no longer detected, one of the specific item may be determined to be associated with the event. Where a change in mass associated with a specific item is detected, e.g., an increase in mass in a nominal number of the specific item, or a decrease in mass in a nominal number of the specific item, an event including the depositing or the removal of one or more of the specific item may be determined to have occurred.

An event may also be detected (or a location of the event may be determined) based on imaging data captured by one or more imaging devices, which may depict aspects of any number of events therein, and the imaging data may be continuously or regularly monitored in order to determine whether an event has occurred. For example, an event may be determined to have occurred where contents of the materials handling facility are determined to have changed in any pair of images (e.g., a before-and-after comparison of images depicting aspects of the materials handling facility, at different times). In some other implementations, an event may be determined to have occurred where one or more body parts (e.g., a hand of an actor) are detected within a predetermined range or distance of one or more storage units and/or items in one or more images. In some implementations, imaging data may be continuously or regularly evaluated to determine whether an event has occurred. In such implementations, imaging data may be processed according to one or more of the systems or methods disclosed herein if an event is determined to have occurred, to a predetermined level of confidence or accuracy, or discarded when it is determined that no event has occurred.

Similarly, imaging data may be captured in a vicinity of a specific location at a time when an actor is determined to have retrieved an item from an inventory area, and a color, a shape or other attribute of the item may be determined from the imaging data. The color, the shape or the other attribute may be correlated with one or more a plurality of items in the vicinity of the specific location at the time when the actor retrieved the item, and may be used to identify the item on that basis. Moreover, an event may be determined to have occurred based on information or data obtained by a combination of sensors, including load sensors, imaging devices, RFID sensors, LIDAR sensors, or any other type or form of sensors.

At box 630, a subset of images captured during the duration of the event by cameras holding the location of the event within their respective fields of view are identified. For example, where the location and the duration of the event are determined, and the orientations of the respective cameras are known, the cameras having the location of the event within their respective fields of view during the duration may be determined, and images captured by such cameras may be identified. Some or all of images may include visual images, depth images, or both, captured by the cameras of the location during the duration.

At box 640, a quality score is calculated for the images of the subset, e.g., by processors or processor units operating on imaging devices that captured the images, or by processors or processor units associated with a server that received the images from the imaging devices, or any other computer device or system. The quality score may be a qualitative or quantitative metric calculated according to an equation, a formula or an algorithm or in any other manner, e.g., a trained machine learning system or technique such as a convolutional neural network or another artificial neural network, and may be representative of the value of a given image in depicting an event that occurred at a given location and for a given duration. In some implementations, the quality score may consider one or more of the optical flow analyses, the differences between the ranges and the visibility of the actors to varying degrees or weights. Alternatively, in some implementations, an equation, a formula or an algorithm for determining a quality score may consider any other factors including but not limited to environmental conditions (e.g., lighting) within a vicinity of the location, or any other factors.

For example, in some implementations, the quality score may be calculated based on any information or data, or any combinations of information or data, relating to the quality or value of the images with respect to the location of the event at the time of the event. For example, in some implementations, the quality score may be calculated based on one or more optical flow analyses conducted on successive images of a subset that were captured by common cameras. In some implementations, the server may be programmed to execute an optical flow algorithm that receives the successive images as inputs and determines horizontal and/or vertical disparities between pixels appearing within each of the images as outputs. In some implementations, the outputs may include a disparity image indicating disparities between points appearing within each of the successively captured images or, alternatively, a displacement image indicating horizontal displacements (e.g., horizontal disparities) between points appearing within each of the successively captured images and/or a parallax image indicating vertical parallax (e.g., vertical disparities) between points appearing within each of the successively captured images. The optical flow analyses may be performed for each of the images captured during the duration of the event by each of the cameras that were determined to include the location within their fields of view. Outputs or products of an optical flow analysis performed on successively captured images may be used to determine whether the quality of the images is such that vectors or confidence scores generated based on the images are sufficiently reliable. For example, magnitudes and directions of optical flow determined for at least a pair of images may be compared to vectors extending between pixels and body parts of actors. In some implementations, for each image and for each actor depicted therein, if an angle between a direction of optical flow and a direction of a vector from a pixel to a body part of the given actor is sufficiently large, such as forty-five degrees (45°) or greater, a confidence score associated with that actor may be downgraded or reduced. Conversely, if the angle between the direction of the optical flow and the direction of the vector is sufficiently small, a confidence score associated with that actor may be upgraded or increased. Likewise, where the magnitude of optical flow is sufficiently small for a given actor, thereby implying limited movement of the actor from image to image, a confidence score associated with the actor may be downgraded or reduced. Any conclusion that may be drawn from an optical flow analysis may be utilized in determining a level of quality of a given image in accordance with the present disclosure.

Additionally, in some implementations, a quality score may be calculated based on differences between ranges to the location of the event and ranges to objects appearing within the images of the subset. Where a range from a lens or other optical element of an imaging device to a location within a field of view of the imaging device such as an inventory shelf or other storage area is known, e.g., based on a previously determined layout or construction of a facility in which the inventory shelf is provided, or based on planogram data or other information or data subsequently determined, differences between the range and a range detected from the images may indicate whether the location is occluded at the time of the event. For example, where the images include visual images, ranges to objects appearing within the images may be calculated based on monocular cues detected within the images, or on any other basis. Such monocular cues may relate to any background features or any other elements that are visible within the images. Where the images include depth images, ranges to such objects may be calculated directly from the depth images. Where the difference between the ranges is sufficiently small, e.g., less than a predetermined threshold, such as two hundred millimeters (200 mm), the images may be determined to have potentially depicted the event, or that a level of quality of the images may be sufficiently high. Where the difference between the ranges is substantial, however, the difference may indicate the presence of an obstruction between the lens of the imaging device and the location during the duration of the event, further indicating that the images may not have depicted the event, or that a level of quality of the images may be sufficiently low.

In some implementations, a quality score may also be calculated based on the visibility of one or more actors within the images of the subset. The extent to which one or more actors are present within images captured by an imaging device at a time of an event or during a duration of the event may indicate whether the images may be used to confirm that one actor was associated with the event, or to distinguish between two or more actors as being associated with the event. For example, where an image depicts fewer than all of the actors within a vicinity of a location of the event, e.g., a single actor, the image may have little value in determining which of the actors is associated with the event. Where an image depicts all of the actors within the vicinity of the location of the event, however, the image may have substantial value in determining which of the actors is associated with the event.

In some implementations, a quality score may be calculated based on trajectories and/or orientations (or poses) of actors on a scene. For example, where a locating service has identified locations, motion and/or orientations of actors over an interval of time that includes a time or duration of an event, trajectories or tracklets representative of the motion, the locations and/or the orientations of each of the actors generated as functions of time may be used to determine whether a field of view of a given imaging device is obscured by one or more of the actors at a time of an event.

At box 650, images of the subset having quality scores above a predetermined threshold are identified. Such images may be determined to have the highest level of quality out of all images that are determined to have likely depicted the event. Alternatively, in some embodiments, rather than calculating an express quality score threshold, images having a sufficiently high level of quality may be identified on any other basis, such as by identifying a predetermined percentage or a number of the images of the subset having the highest quality scores.

In some other embodiments, images having a sufficiently high level of quality may be identified based on outputs from a classifier. For example, a classifier may be trained to predict whether a specific field of view of an imaging device, or imaging data captured by the imaging device, is likely to result in an accurate prediction of an association between a body part or other portion of an actor and an event location. In some implementations, a level of confidence in a view may be determined by the same classifier or other machine learning system or technique (e.g., a convolutional neural network) that is used to segment bodies or body parts within images or to identify each of the plurality of selected pixels within the images or the segmented body parts that are most likely associated with an event. Alternatively, a level of confidence in a view may be determined by a different classifier, such as a linear support vector machine.

At box 660, records of vectors and confidence scores that were generated based on the images having the quality scores above the predetermined threshold are identified. As is discussed above, at box 610, records of vectors and confidence scores are received by the server from each of the plurality of cameras. From such records, the records that were generated based on the images identified at box 655 are identified, e.g., by a look-up function or in any other manner. At box 665, confidence scores for each of the actors are determined from the records identified at box 660, and at box 670, a predetermined number of the highest confidence scores for each actor are selected.

Alternatively, in some implementations, each of the quality scores of the images may be multiplied by each of the confidence scores for each of the actors appearing within such images, thereby modifying or weighting each of such confidence scores based on the quality of the image from which the confidence scores were determined. In such implementations, a predetermined number of the modified or weighted confidence scores may be selected for each of the actors.

At box 680, whether a single actor may be associated with the event based on the highest confidence scores identified at box 670 are determined. For example, in some implementations, for each of the actors, the highest confidence scores determined from the images having the highest levels of quality may be summed, averaged or otherwise aggregated to calculate an overall confidence score for the actors. To the extent that one of the actors appearing within such images may be identified with a sufficiently high degree of confidence, that actor may be determined to have been associated with the event. If a single actor may not be associated with the event based on the highest confidence scores, then the process advances to box 690, where a single actor may be selected as being associated with the event by one or more alternate (e.g., manual or automatic) techniques, and the process ends. For example, one or more human operators may visually evaluate the images captured by the various cameras that included the event within their respective fields of view, and determine which of the actors depicted within such images is associated with the event.

If a single actor may be identified based on the highest confidence scores, then the process advances to box 695, where the single actor is associated with the event, e.g., by storing an indication that the actor is associated with the event in one or more data stores, and the process ends.

As is discussed above, images that are captured by a plurality of imaging devices and provided to a machine learning system or technique as inputs in order to calculate vectors from pixels of the images to body parts depicted within such images, and confidence scores associated with such vectors. The images may be further processed to determine their levels of quality, e.g., a quality score, which may be used to modify or weight confidence scores that are determined from such images for actors depicted therein. Where a quality score for a given image is sufficiently high, one or more actors depicted within the image may be identified as associated with pixels of the image to a high level of confidence. Where a quality score for a given image is not sufficiently high, however, a single actor depicted within the image may be identified as associated with a given pixel with a low level of confidence or, alternatively, no single actor may be identified as associated with the given pixel.

Figure 7A:
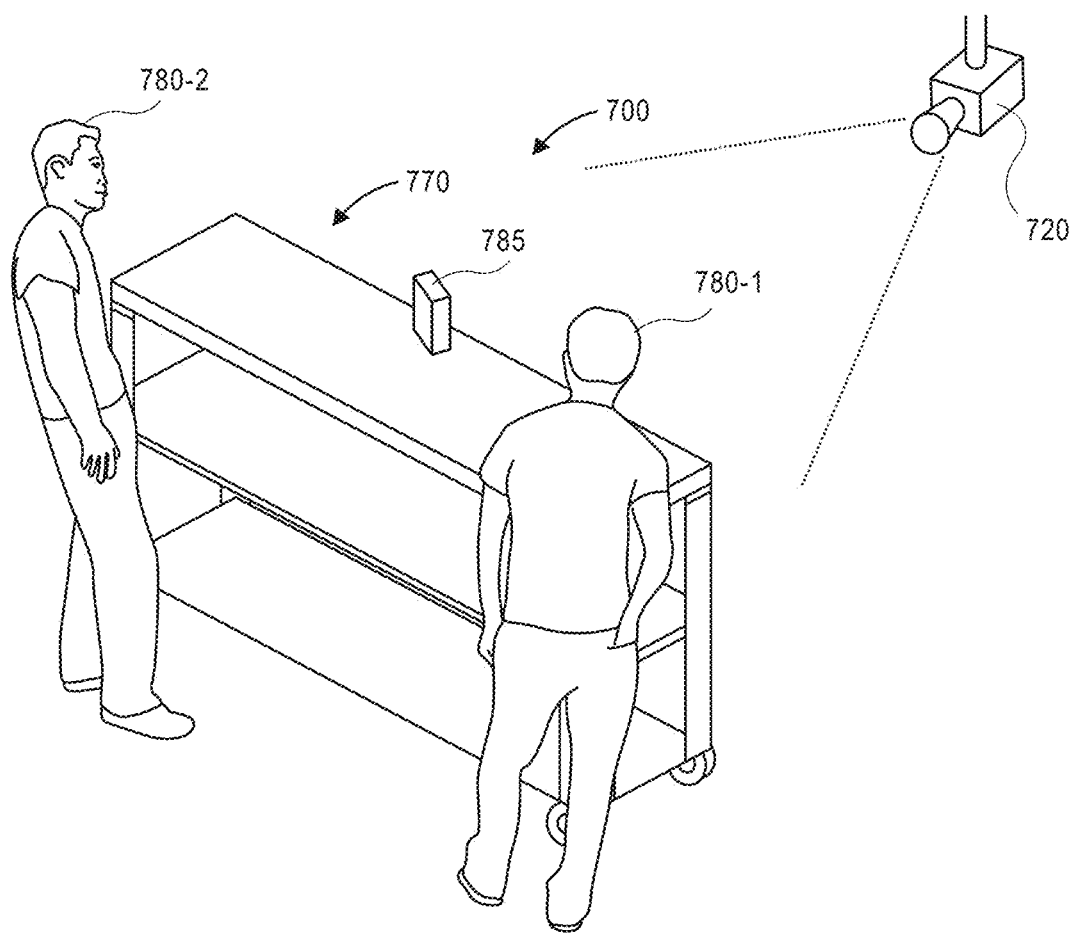
FIGS. 7A through 7C are views of aspects of one system for associating events with actors using digital imagery and machine learning in accordance with implementations of the present disclosure.
Figure 7B:
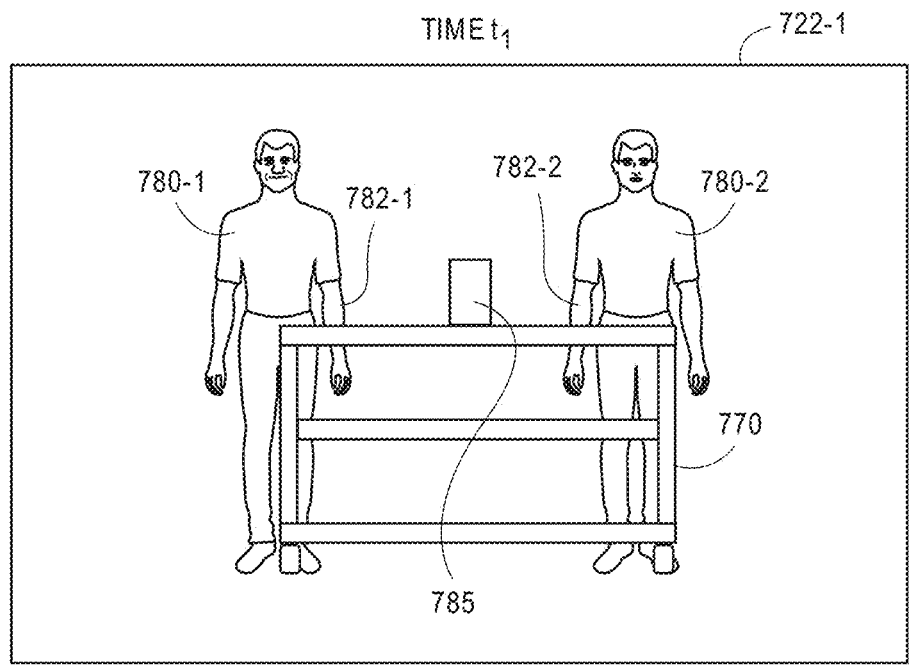
Figure 7B:
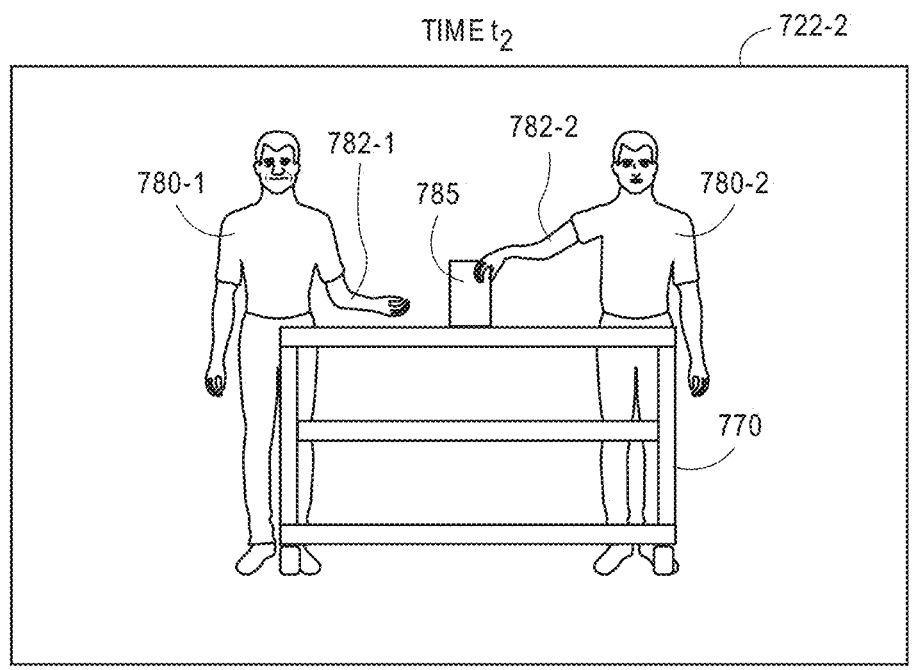
Figure 7C:
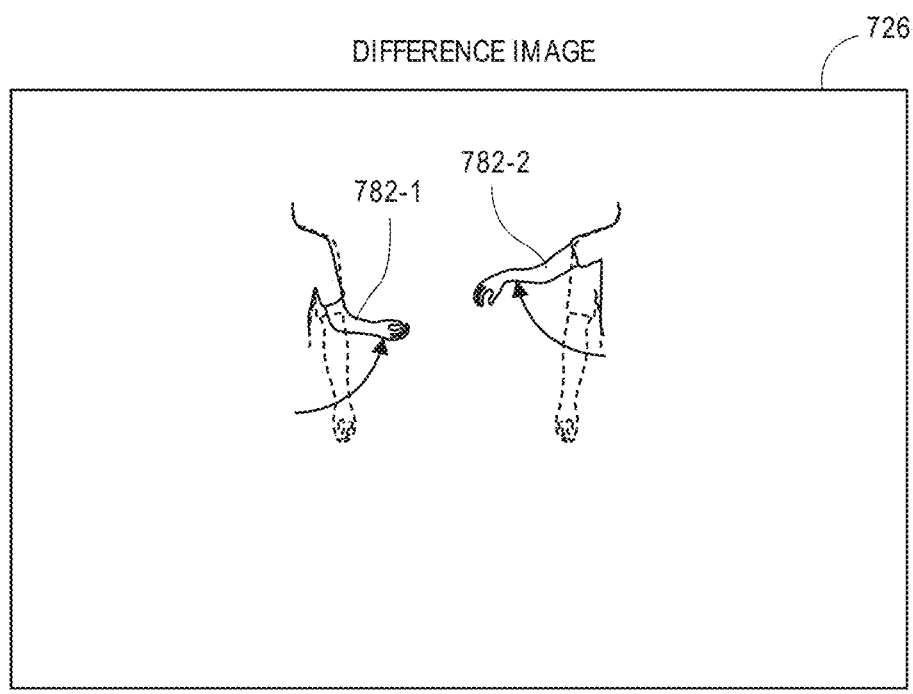

In some implementations, an optimal flow analysis may be performed on a pair of successive images, and the optical flow analysis may be used to determine a quality score for one or both of the images, which may be used to modify or weight confidence scores determined from such images accordingly. Referring to FIGS. 7A through 7C, views of aspects of one system for associating events with actors using digital imagery and machine learning in accordance with implementations of the present disclosure are shown. Except where otherwise noted, reference numerals preceded by the number "7" shown in FIGS. 7A through 7C indicate components or features that are similar to components or features having reference numerals preceded by the number "5" shown in FIGS. 5A through 5E, by the number "4" shown in FIGS. 4A through 4E, by the number "2" shown in FIG. 2A or 2B, by the number "1" shown in FIGS. 1A through 1J.

As is shown in FIG. 7A, a system 700 includes an imaging device 720 and a storage unit 770 within a field of view of the imaging device 720. An item 785 is provided on the storage unit 770, and a pair of actors 780-1, 780-2 are shown as within a vicinity of the storage unit 770.

An optical flow analysis performed on successive images captured by the imaging device 720 may be used to determine a level of quality of the images frames for determining which of the actors 780-1, 780-2 is associated with an event involving the item 785 or the shelving unit 770. As is shown in FIG. 7B, images 722-1, 722-2 captured by the imaging device 720 at times $t_1$, $t_2$ are shown. The images 722-1, 722-2 depict the storage unit 770 and the actors 780-1, 780-2. In particular, the images 722-1, 722-2 show that the actor 780-1 has extended a hand 782-1 toward the item from time $t_1$ to time $t_2$, and that the actor 780-2 has extended a hand 782-2 toward the item 785 from time $t_1$ to time $t_2$, e.g., to initiate an event.

As is shown in FIG. 7C, an optical flow analysis performed on the images 722-1, 722-2 results in a difference image (or disparity image) 726 indicating disparities between points appearing within each of the successively captured images 722-1, 722-2 such as horizontal displacements (e.g., horizontal disparities) between points appearing within each of the successively captured images 722-1, 722-2 or vertical displacements (e.g., vertical parallax, or vertical disparities) between points appearing within each of the successively captured images 722-1, 722-2. In particular, the difference image 726 indicates that pixels associated with the hand 782-1 of the actor 780-1 have moved laterally from an original position toward the item 785, and that pixels associated with the hand 782-2 of the actor 780-2 have moved laterally from an original position toward the item 785. Although FIG. 7B shows only a pair of images 722-1, 722-2, optical flow analyses may be performed for each of the images captured prior to the time $t_1$, or after the time $t_2$, by the imaging device 720 during a duration of an event. As is discussed above, the optical flow analyses may indicate a level of quality of the images 722-1, 722-2 for determining which of the actors 780-1, 780-2 is associated with an event, and may be used to calculate quality scores for such images 722-1, 722-2. Optical flow analyses may be further performed on images captured by other imaging devices (not shown) that include an event within their respective fields of view, and such analyses may be used to calculate quality scores for such images. The optical flow analyses may be executed by processors or processor units operating on the imaging device 720, or by one or more processors or processor units that are external to the imaging device 720.

Figure 8A:
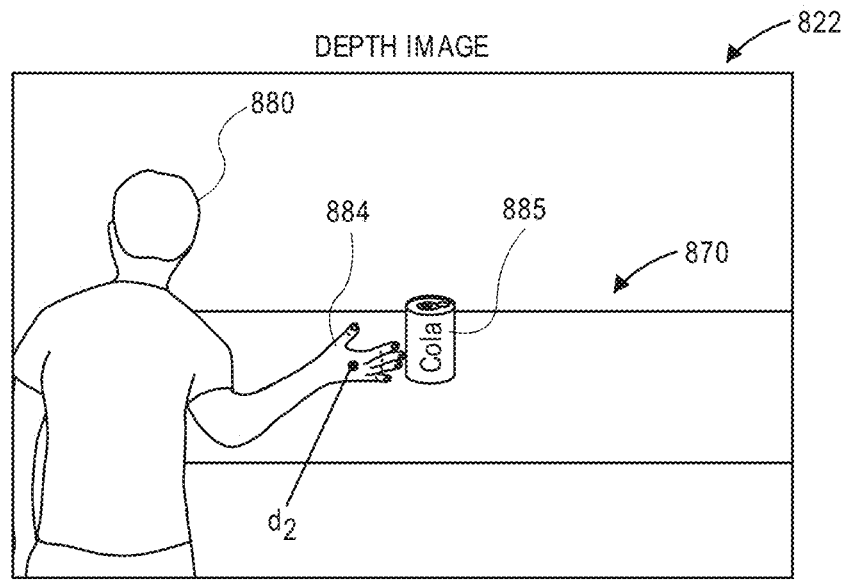
FIGS. 8A and 8B are views of aspects of one system for associating events with actors using digital imagery and machine learning in accordance with implementations of the present disclosure.
Figure 8B:
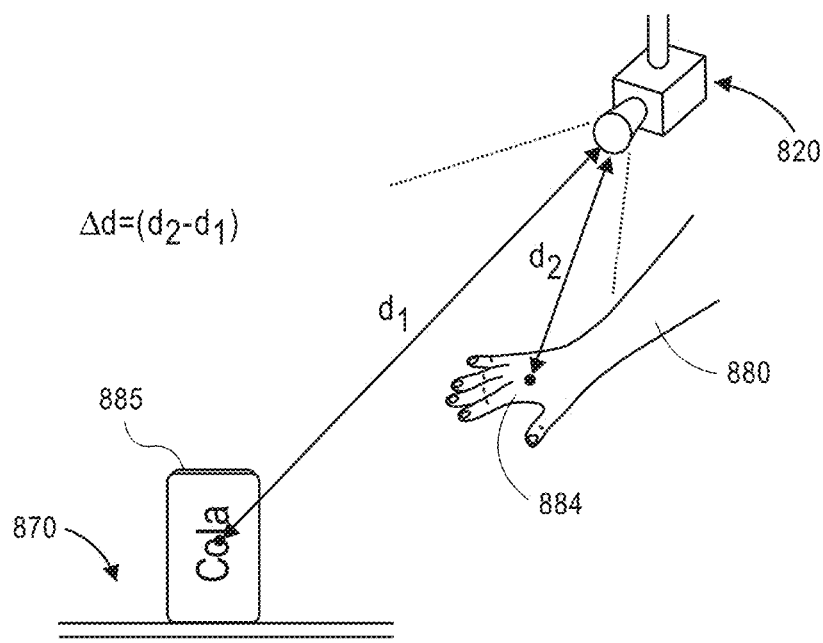

Images may also be processed to determine a range from an imaging device to a nearest object within a vicinity of a location at a time of an event, or during an interval of time that includes the time of the event, and to compare that range to a range from the imaging device to the location. Where a difference between the ranges is significant, visual images captured using the imaging device may be determined to be of low quality, and a low quality score may be assigned to such images accordingly. Where the difference between the ranges is small, however, visual images captured using the imaging device may be determined to be of high quality, and a high-quality score may be assigned to such images accordingly. Referring to FIGS. 8A and 8B, views of aspects of one system for associating events with actors using digital imagery and machine learning in accordance with implementations of the present disclosure are shown. Except where otherwise noted, reference numerals preceded by the number "8" shown in FIGS. 8A and 8B indicate components or features that are similar to components or features having reference numerals preceded by the number "7" shown in FIGS. 7A through 7C, by the number "5" shown in FIGS. 5A through 5E, by the number "4" shown in FIGS. 4A through 4E, by the number "2" shown in FIG. 2A or 2B, by the number "1" shown in FIGS. 1A through 1J.

As is shown in FIGS. 8A and 8B, a depth image 822 captured using an imaging device 820 is shown. The depth image 822 depicts range information regarding a storage unit 870 having an item 885 thereon within a background of the depth image 822, as well as an actor 880 in a foreground of the depth image 822. As is shown in FIG. 8A, the actor 880 is depicted as extending a hand 884 toward the item 885.

As is shown in FIG. 8B, a range $d_2$ to the hand 884 of the actor 880 is determined based on the depth image 822. A range $d_1$ from the imaging device 820 to the item 885 may be known, e.g., prior to the capture of the depth image 822, or, alternatively, determined from the depth image 822 or any other source. Where the difference $\Delta d$ between the range $d_1$ and the range $d_2$ is small, such as two hundred millimeters (200 mm) or less, imaging data captured using the imaging device 820 may be deemed to have sufficiently high quality in determining which actor depicted therein is associated with an event. A small difference $\Delta d$ between the range $d_1$ and the range $d_2$ implies that a view of the item 885 by the imaging device 820 is occluded, or is obstructed only by the hand 884 or another insignificant obstruction, and a high quality score may be assigned to imaging data captured using the imaging device 820 accordingly. Where the difference $\Delta d$ is large, however, imaging data captured using the imaging device 820 may be deemed to have a low quality for determining which actor depicted therein is associated with an event. For example, a large difference $\Delta d$ between the range $d_1$ and the range $d_2$ may imply that a view of the imaging device 820 is occluded, and any vectors or confidence scores determined based on images captured by the imaging device 820 may be deemed unreliable.

Figure 9A:
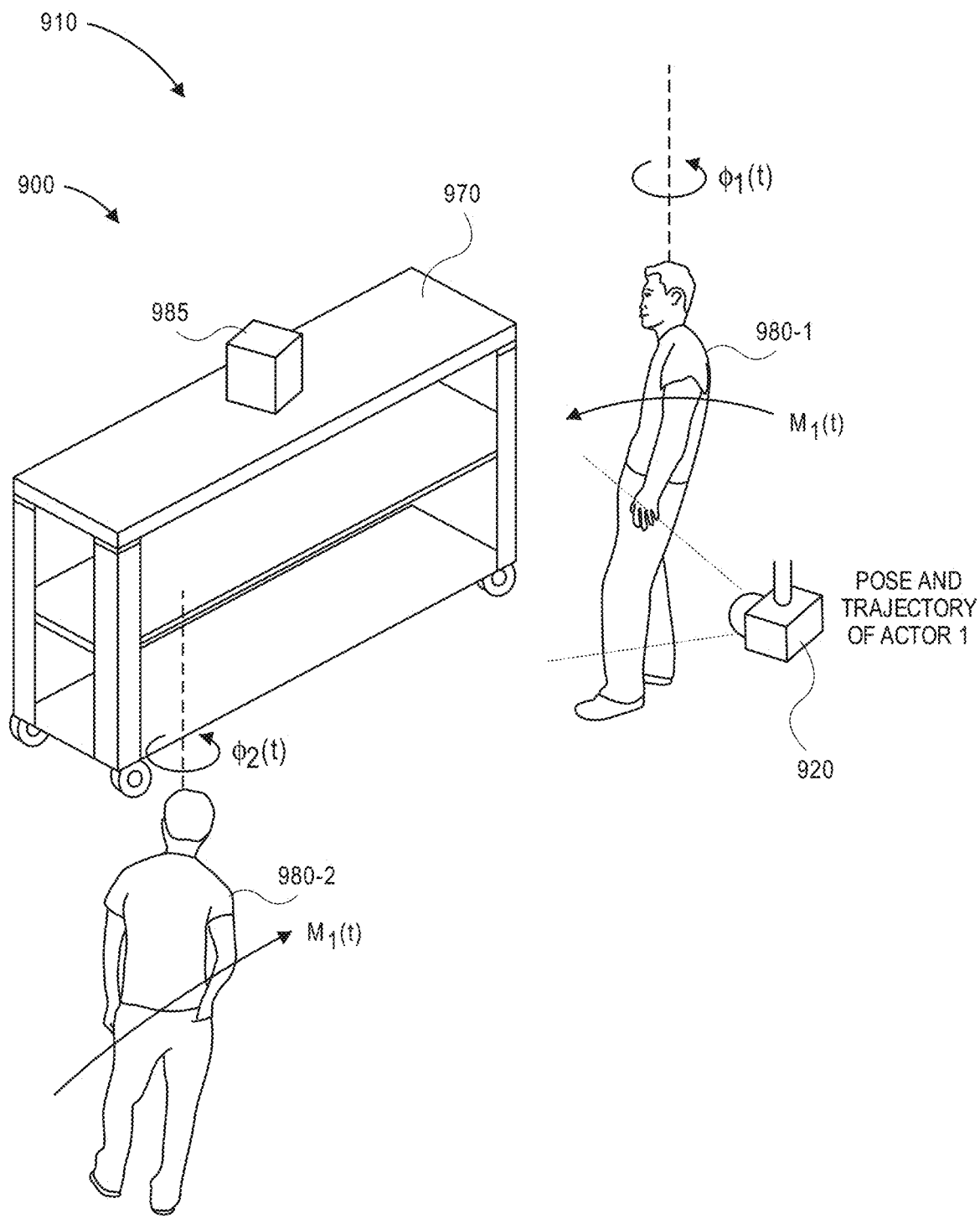
FIGS. 9A through 9C are views of aspects of one system for associating events with actors using digital imagery and machine learning in accordance with implementations of the present disclosure.
Figure 9B:
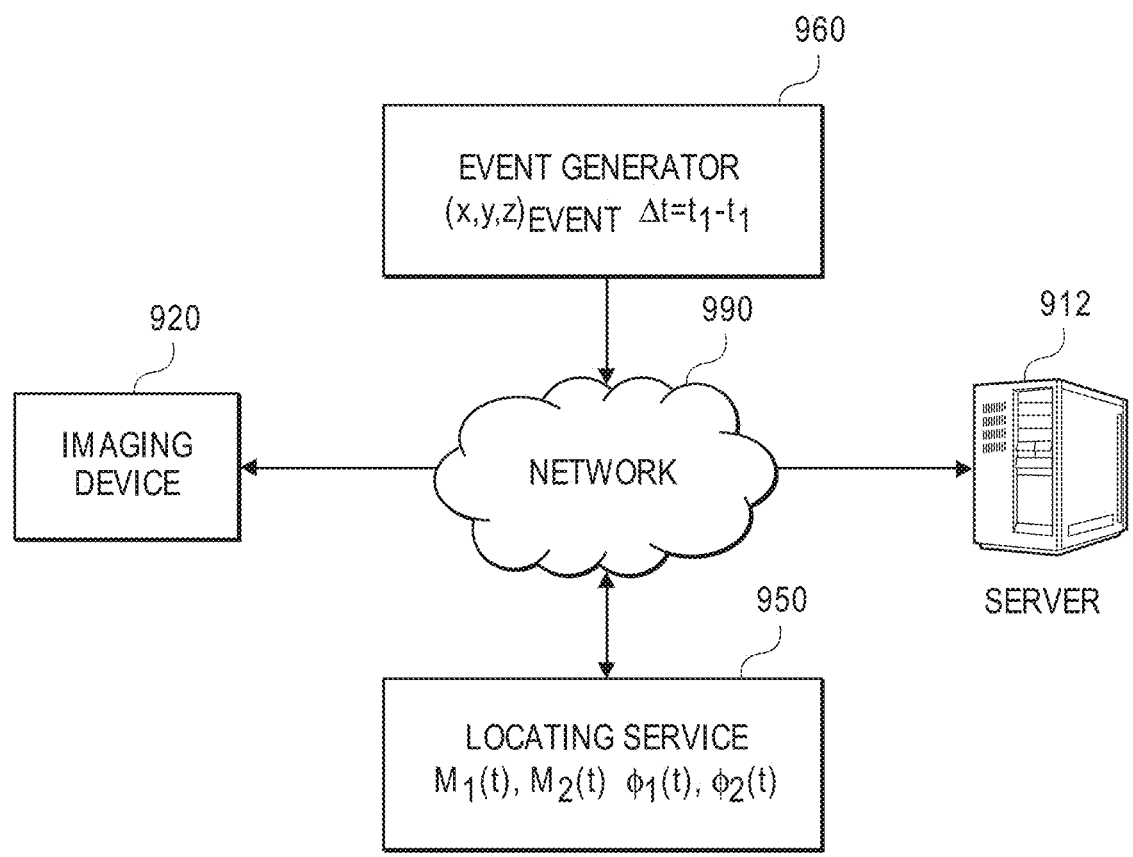
Figure 9C:
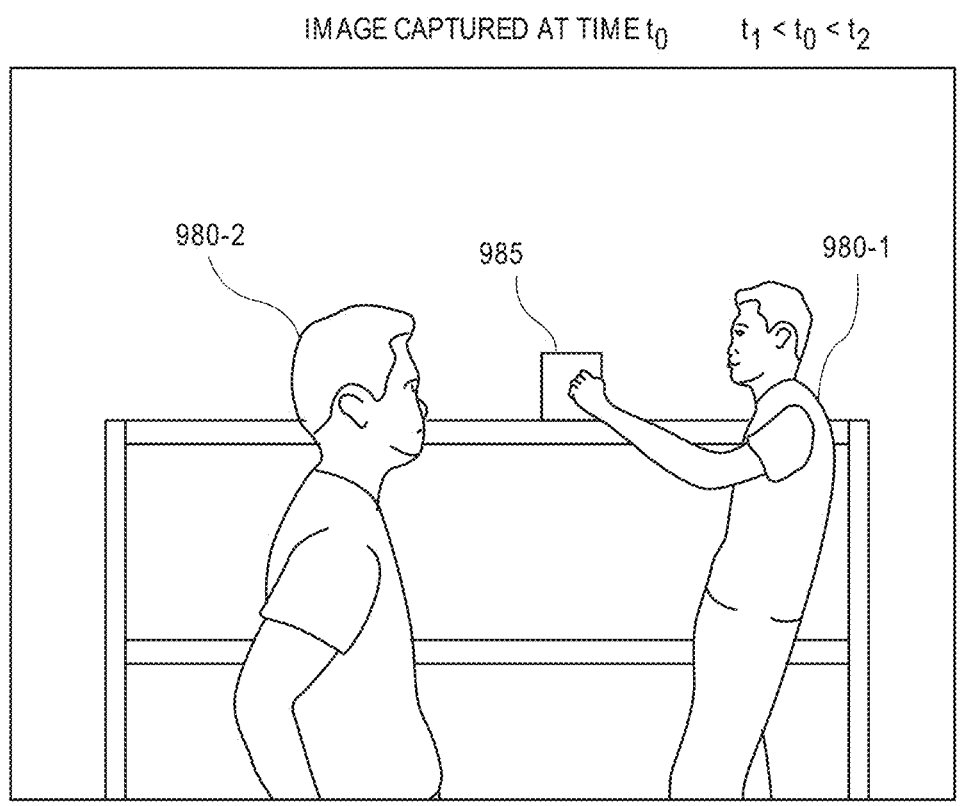

Although FIG. 8B shows a determination of the range $d_2$ to the hand 884 based on the depth image 822, the range $d_1$ and/or the range $d_2$ may alternatively or additionally be determined on any other basis. For example, the range $d_1$ and the range $d_2$ may be determined from one or more visual images, e.g., based on monocular cues depicted within a single visual image, or based on stereo triangulation from two or more visual images. Any information or data, obtained from any source, may be used to determine whether a view of an imaging device at a time of an event is occluded or not occluded, or to assign a quality score to imaging data captured using the imaging device accordingly.

Where trajectories of motion and/or poses of actors are known, such trajectories and/or poses may be utilized to determine a level of quality of an image captured by an imaging device having such actors within its field of view. Referring to FIGS. 9A through 9C, views of aspects of one system 900 for associating events with actors using digital imagery and machine learning in accordance with implementations of the present disclosure are shown. Except where otherwise noted, reference numerals preceded by the number "9" shown in FIGS. 9A through 9C indicate components or features that are similar to components or features having reference numerals preceded by the number "8" shown in FIGS. 8A and 8B, by the number "7" shown in FIGS. 7A through 7C, by the number "5" shown in FIGS. 5A through 5E, by the number "4" shown in FIGS. 4A through 4E, by the number "2" shown in FIG. 2A or 2B, by the number "1" shown in FIGS. 1A through 1J.

As is shown in FIG. 9A, the system 900 includes a scene 910 having an imaging device 920 (e.g., a digital camera) and a storage unit 970 with an item 985 on the storage unit 970. Additionally, actors 980-1, 980-2 are in motion within a vicinity of the shelving unit 970, and each is partially or entirely within the field of view of the imaging device 920.

As is shown in FIGS. 9A and 9B, the imaging device 920, a locating service 950 and an event generator system 960 may be connected to a server 912 over a network 990 by one or more wired or wireless means. The imaging device 920 may be configured to process one or more images captured thereby using a processor unit or other system provided thereon, e.g., by providing the images or portions thereof to a machine learning system or technique as inputs. Vectors extending between pixels of the images and a most likely body or portion thereof depicted therein, and confidence scores associated with such vectors, may be generated based on outputs received from the machine learning system or technique. Subsequently, the imaging device 920 may transfer records of the vectors and confidence scores generated for each of the images to the server 912 over the network 990. In some implementations, the machine learning system or technique may be operated by processors or processor units operating on the imaging device 920, or by one or more processors or processor units that are external to the imaging device 920.

Additionally, the locating service 950 may recognize and detect locations and/or motion of the actors 980-1, 980-2 in three-dimensional space as functions of time, e.g., trajectories $M_1(t)$, $M_2(t)$, while the orientations of the actors 980-1, 980-2 may be recognized and detected by the locating service 950 using functions of time, e.g., poses $\Phi_1(t)$, $\Phi_2(t)$. The trajectories $M_1(t)$, $M_2(t)$ and/or the poses $\Phi_1(t)$, $\Phi_2(t)$ may be derived using information or data captured by the imaging device 920 or any other systems (not shown) having one or more sensors, e.g., one or more RFID components (e.g., antennas or tags) for transmitting and/or receiving RFID signals associated with actors, one or more LIDAR sensors or receivers for detecting actors, or any other systems or components by which information regarding actors and their motion, locations and/or orientations may be gathered. Additionally, an event generator system 960 may provide information or data regarding a location (x, y, $z)_{EVENT}$ of an event, and a duration $\Delta t$ of the event (e.g., that the event occurred between a time $t_2$ and a time $t_1$), to the server 912 over the network 990.

The server 912 may interpret the trajectories $M_1(t)$, $M_2(t)$ and/or the poses $\Phi_1(t)$, $\Phi_2(t)$ to determine a level of quality of images captured using the imaging device 920. As is shown in FIG. 9C, where an image 920 is captured at a time $t_0$ within the duration $\Delta t$ of the event, a quality score may be calculated based on the locations of the actors 980-1, 980-2 at the time $t_0$ using the trajectory functions $M_1(t_0)$, $M_2(t_0)$, as well as the orientations of the actors 980-1 at the time $t_0$ using the pose functions $\Phi_1(t_0)$, $\Phi_2(t_0)$. For example, the trajectory functions $M_1(t_0)$, $M_2(t_0)$ may be used to predict locations of the actors 980-1, 980-2 at the time $t_0$, and to determine whether one or more of the actors 980-1, 980-2 will appear within the field of view of the imaging device 920 at the time $t_0$. Likewise, the pose functions may be used to predict orientations of the actors 980-1, 980-2 at the time $t_0$, and to determine an extent to which the one of the actors 980-1, 980-2 is within the field of view at the time $t_0$. A quality score may be calculated, at least in part, based on values of the trajectory functions $M_1(t_0)$, $M_2(t_0)$ and values of the pose functions $\Phi_1(t_0)$, $\Phi_2(t_0)$ at the time $t_0$.

Figure 10:
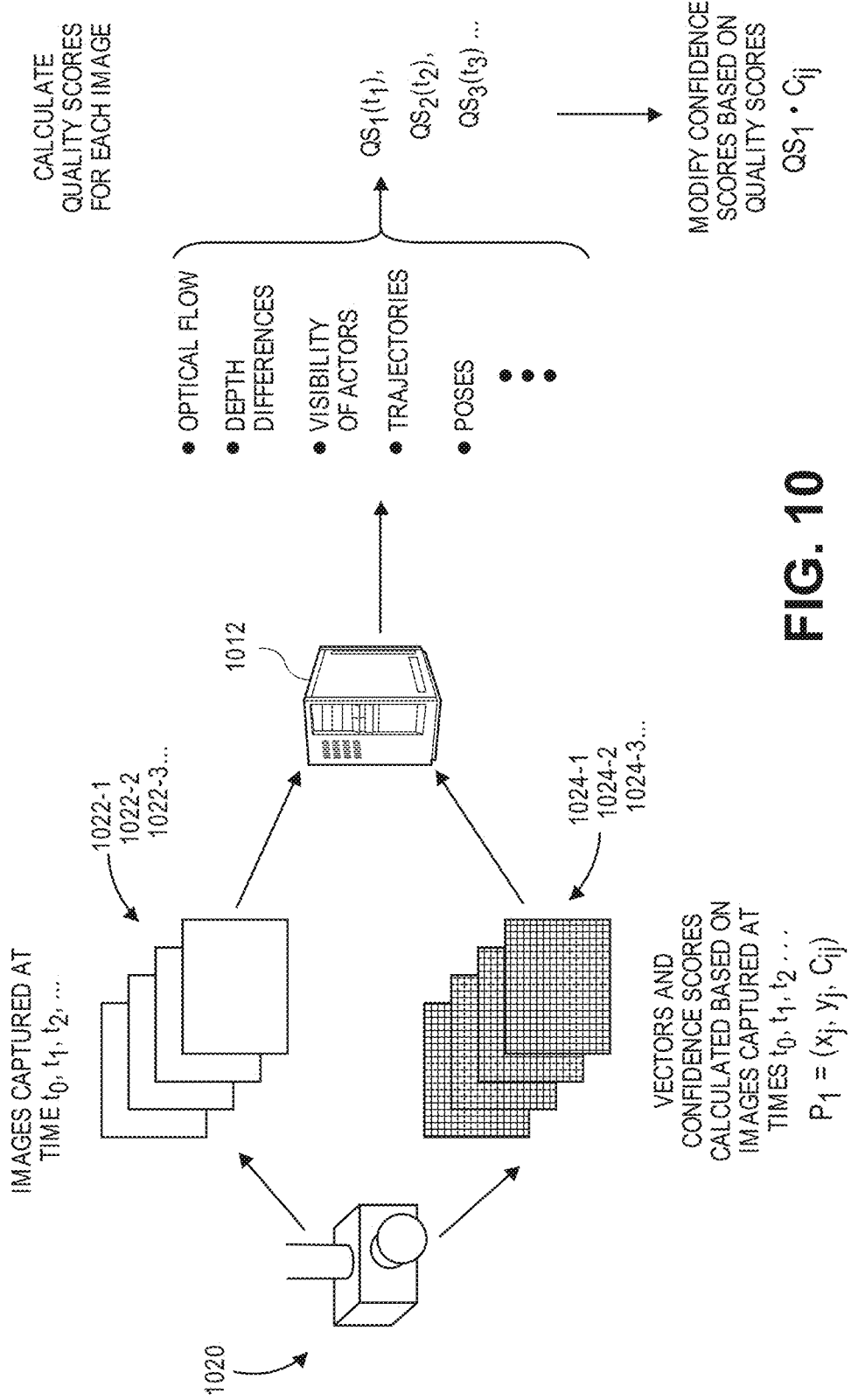
FIG. 10 is a view of aspects of one system for associating events with actors using digital imagery and machine learning in accordance with implementations of the present disclosure.

Quality scores may be calculated based on any factors regarding an image or a scene. Referring to FIG. 10, a view of aspects of one system for associating events with actors using digital imagery and machine learning in accordance with implementations of the present disclosure are shown. Except where otherwise noted, reference numerals preceded by the number "10" shown in FIG. 10 indicate components or features that are similar to components or features having reference numerals preceded by the number "9" shown in FIGS. 9A through 9C, by the number "8" shown in FIGS. 8A and 8B, by the number "7" shown in FIGS. 7A through 7C, by the number "5" shown in FIGS. 5A through 5E, by the number "4" shown in FIGS. 4A through 4E, by the number "2" shown in FIG. 2A or 2B, by the number "1" shown in FIGS. 1A through 1J.

As is shown in FIG. 10, a server 1012 may receive a plurality of images 1022-1, 1022-2, 1022-3 captured at times $t_0$, $t_1$, $t_2$ by an imaging device 1020, and records 1024-1, 1024-2, 1024-3 of vectors and confidence scores calculated based on the images 1022-1, 1022-2, 1022-3 captured at times $t_0$, $t_1$, $t_2$ from the imaging device 1020. For example, for each of the pixels $P_i$ of the images 1022-1, 1022-2, 1022-3, the records 1024-1, 1024-2, 1024-3 may include a plurality of pairs of coordinates $x_j$, $y_j$ of a centroid or other aspect of a body of an actor that is most likely associated with a hypothetical event occurring at pixel $P_i$, and a confidence score $C_{ij}$ or other metric indicative of confidence in a determination that the actor is associated with the hypothetical event occurring at the pixel $P_i$. Alternatively, the records 1024-1, 1024-2, 1024-3 of vectors and confidence scores may be generated based on the images 1022-1, 1022-2, 1022-3 by one or more processors or processor units that are external to the imaging device 1020, e.g., by the server 1012, or by another computer device or system.

As is also shown in FIG. 10, the server 1012 may calculate a plurality of quality scores $QS_1(t_1)$, $QS_2(t_2)$, $QS_3(t_3)$ for each of the images 1022-1, 1022-2, 1022-3. The quality scores $QS_1(t_1)$, $QS_2(t_2)$, $QS_3(t_3)$ may be calculated based on a variety of factors, including but not limited to an optical flow analysis conducted on a pair of successively captured images, differences in depth between locations of events and foreground objects appearing within the images 1022-1, 1022-2, 1022-3, visibility of the actors within the images 1022-1, 1022-2, 1022-3, trajectories and/or poses of such actors, or any other relevant factors. Each of the confidence scores $C_{ij}$ generated from the images 1022-1, 1022-2, 1022-3 may be multiplied or otherwise modified or weighted based on the quality scores $QS_1(t_1)$, $QS_2(t_2)$, $QS_3(t_3)$ of such images 1022-1, 1022-2, 1022-3.

A predetermined number (e.g., five) of the highest modified confidence scores associated with each of the actors depicted within the images 1022-1, 1022-2, 1022-3 may be summed, averaged or otherwise combined to generate an overall confidence score for each actor. If an overall confidence score for one actor is sufficiently greater than the overall confidence scores for each of the other actors, then that actor is determined to have been associated with the event with a sufficiently high degree of confidence. If the overall confidence scores calculated for two or more people are too close to one another, however, then the actor having the highest confidence score may be identified with a low degree confidence, or the event may not be associated with any of the actors based on the imaging data, and an alternate determination may be made, e.g., by the server 1012, or in response to one or more interactions by human operators.

In some implementations, images captured by each of a plurality of cameras that includes an event within a field of view, or records of data generated based on such images, e.g., locations of heads or other body parts, regression vectors between such heads or other body parts and locations of events, or measures of confidence in the regression vectors, may be treated or considered in an equal or similar manner. For example, as is discussed above, for each of a plurality of actors, confidence scores determined from images captured by the respective cameras may be calculated and summed, averaged or otherwise aggregated to calculate an overall confidence score for each of the actors based on the plurality of cameras as a whole. Where one of the actors appearing within such images may be identified with a sufficiently high degree of confidence, e.g., where an overall confidence score calculated for that actor exceeds a threshold by a predetermined amount, or is sufficiently greater than confidence scores calculated for other actors, that actor may be determined to have been associated with the event. In some other implementations, however, a per-camera confidence score may also be calculated. The per-camera confidence score may indicate a level of confidence in images captured by a given camera, or in records of data generated by a given camera based on such images, based on an extent to which views of an event are occluded within such images. For example, confidence scores or other measures of confidence in each actor may be calculated based on event-to-actor (e.g., event-to-head) regression vectors and confidence scores therein, as well as any other relevant features, e.g., by providing such vectors and confidence scores in such vectors to a machine learning system or technique as inputs, and determining the confidence scores in such actors based on outputs received from the machine learning technique, for each of a plurality of cameras that included an event within their respective fields of view. The confidence scores in each actor, calculated by each camera, or based on data captured by each camera, may be aggregated and compared to one another.

Where a single actor may not be identified as associated with an event based on his or her respective confidence scores, as aggregated across all cameras, or across cameras that included a location of the event within their respective fields of view, a per-camera confidence score may be calculated.

For example, a camera confidence score or weighting factor may be calculated for each camera that holds a location of an event within a field of view, based on regression vectors generated for images captured by that camera at a time of an event or during a duration of an event, or based on confidence scores in such regression vectors. Confidence scores in actors generated based on regression vectors, confidence scores or other relevant features may be weighted by their respective per-camera confidence scores or weighting factors. For example, where regression vectors or confidence scores therein that are calculated by or for a given camera are comparatively high, confidence scores in actors that are generated from images captured by that camera may be preferentially weighted more highly than confidence scores that are generated from images captured by other cameras. Conversely, where regression vectors or confidence scores therein that are calculated by or for a given camera are comparatively low, records generated from images captured by that camera may be downgraded or disadvantageously weighted as compared to records generated from images captured by other cameras, or even disregarded. In this regard, cameras having preferable or more optimal views of an event may be considered more strongly or reliably than cameras having undesirable or suboptimal views of the event when attempting to associate the event with one of a plurality of actors.

Figure 11A:
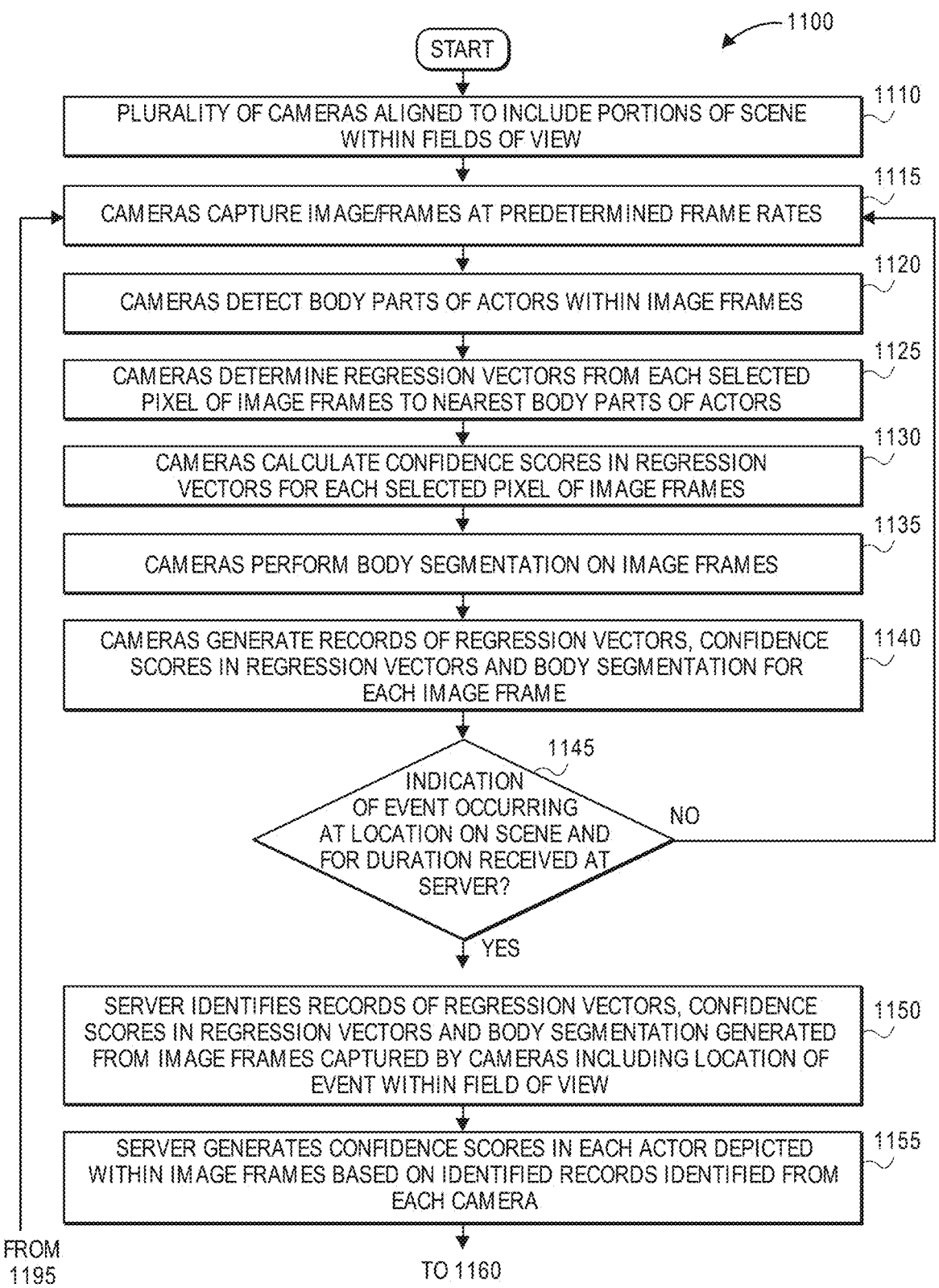
FIGS. 11A and 11B are a flow chart of one process for associating events with actors using digital imagery and machine learning in accordance with implementations of the present disclosure.
Figure 11B:
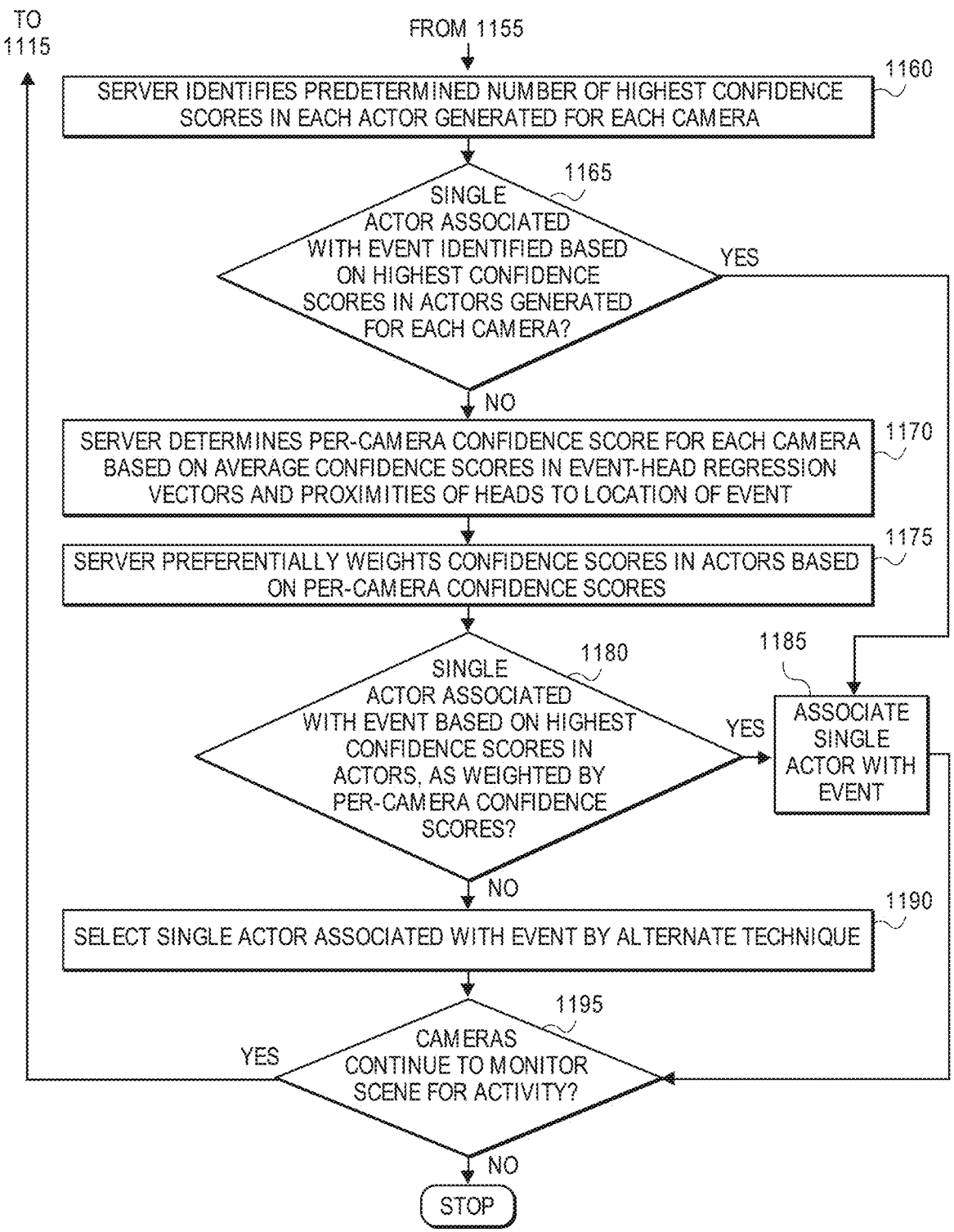

Referring to FIGS. 11A and 11B, a flow chart 1100 of one process for associating events with actors using digital imagery and machine learning in accordance with implementations of the present disclosure is shown. At box 1110, a plurality of cameras are aligned to include portions of a scene within their respective fields of view. For example, the cameras may be installed or otherwise operated independently or as components of a camera network, and may be in communication with one or more computer devices or systems over one or more computer networks. The cameras may be configured to capture imaging data, e.g., still or moving images, from the scene, which may include any relevant structures or components of a facility, or any type or form of environment or space within which any number of actors may execute one or more poses, gestures or other actions. At least some of the cameras may be aligned with fields of view that overlap at least in part over a portion of the scene, which may include but need not be limited to one or more storage units or other like systems at a materials handling facility, a fulfillment center, a warehouse or any other facility (e.g., indoor or outdoor). In some implementations, the cameras may include processor units that are programmed to operate one or more machine learning systems or techniques that are trained to detect body parts, such as heads, hands, shoulders, torsos, waists, feet or others, or regions or portions of actors, within the images. In some implementations, the processor units may be further configured to segment image frames into regions corresponding to one or more of such body parts, regions or portions.

At box 1115, each of the cameras captures image frames at one or more predetermined frame rates, e.g., such as fifteen, twenty, thirty or sixty frames per second. The images may have any level of resolution or number of pixels, including but not limited to at least 860×480 pixels.

At box 1120, the cameras determine locations of any number of body parts of actors depicted within the image frames. For example, in some implementations, the cameras may be programmed to execute one or more machine learning systems or techniques that are trained to detect body parts (viz., heads) of actors depicted within images captured by such cameras. The machine learning systems or techniques may be any type or form of tool that is trained to detect heads or other body parts of actors within images, e.g., a fully convolutional network or residual network, such as a deep residual learning network, based on inputs including images captured thereby. In some implementations, outputs received from such machine learning systems or techniques may include, but are not limited to, coordinates of the respectively detected body parts and confidence scores associated with each detection.

At box 1125, the cameras generate regression vectors, or values regarding a most likely body part of an actor to have been associated with each of the selected pixels of an image frame, if an event were to occur at such pixels at a given time. The vectors or other values may include, for a selected pixel of a given image frame, coordinates of one or more other pixels of the image frame corresponding to a centroid of a body part (e.g., a head) of an actor that would be most likely associated with a hypothetical event that may have occurred at a selected pixel. The vectors or other values may be calculated for each of the pixels within a given image frame, or for a subset of the pixels within the image frame, e.g., pixels corresponding to regions of inventory shelves or storage units where events are likely to occur, pixels that are determined to depict background features, or pixels that are determined to not depict one or more of the actors.

In some implementations, regression vectors may be generated for heads or other body parts using machine learning systems or techniques based on the image frames captured at box 1115 as inputs. For example, the regression vectors may be determined based on outputs received from the same machine learning system or technique that produced the locations of the body parts at box 1120, or outputs received from any other machine learning systems or techniques. Alternatively, the regression vectors may be determined in any other manner, such as by one or more processors or processor units that are external to the respective cameras.

At box 1130, the cameras calculate confidence scores in the regression vectors for each of the selected pixels of the image frames. The confidence scores may be one or more metrics indicative of a level of confidence in a given regression vector, e.g., that a head or other body part of an actor located at one pixel is associated with a hypothetical event occurring at another pixel.

At box 1135, the cameras perform body segmentation on such image frames. For example, in some implementations, the cameras may also be programmed to execute one or more machine learning systems or techniques that are trained to classify pixels of the image frames as corresponding to a particular body part, e.g., a head, a hand, an arm, a torso, or the like, as well as any other non-body part objects or features, such as shelving units, items, or others. For example, one or more machine learning systems or techniques operated by processor units on such cameras may receive an image captured by the cameras, and generate segmentation maps or other records identifying regions of common pixels within image frames as being associated with a given body part. Labels such as "head," "hand," "arm," "torso," or the like may be assigned to regions of the corresponding body parts. The machine learning systems or techniques that are trained to generate a segmentation map or record may be any type or form of tool that is trained to detect one or more body parts of actors within images. In some implementations, the body segmentation may be formed concurrent with the detection of the body parts at box 1120, e.g., by the same machine learning system or technique that detected the body parts, or by a different machine learning system or technique. Alternatively, the one or more machine learning systems or techniques that are trained to detect body parts (including but not limited to heads) of actors within images or segment such images may be executed by one or more computer devices or machines in other locations, e.g., alternate or virtual locations, such as in a "cloud"-based environment. The detections of the heads or other body parts, and the locations thereof, may be determined based at least in part on outputs received from one or more machine learning systems or techniques in response to inputs that include or consist of the image frames, or in any other manner or according to any other technique.

At box 1140, the cameras generate records of the regression vectors and the confidence scores for each image frame captured thereby. For example, in some implementations, for each pixel of each image, regression vectors may take the form of a coordinate pair, e.g., an (x, y) pair identifying a pixel of the image associated with a body part of an actor within an image plane of the image, and the confidence scores may range between zero and one, or have any other value.

At box 1145, whether an indication of an event occurring at a location on the scene and for a duration has been received is determined. For example, in some implementations, an event may be detected when an item is lifted from a location on or in association with a storage unit or other component, such as a shelf, at a given time or over a duration. In some implementations, the event may be detected based on changes in loading on the storage unit, e.g., due to picking or stowing events, or placing one or more items on the storage unit or removing one or more items therefrom, as detected by a load sensor or other system. In still other implementations, the event may be detected by one or more RFID sensors, LIDAR sensors, or one of the cameras themselves, e.g., based on an analysis of imaging data captured by such cameras. For example, imaging data may be processed to determine whether contents of the scene have changed, or where one or more body parts of an actor are detected within a predetermined range or distance of a storage unit or other system. In some implementations, a position of a hand determined by one or more machine learning systems or techniques, e.g., the body segmentation, may be used as a proxy for a location of the event, given that most events are initiated by actors using their respective hands. Alternatively, an event may be determined to have occurred based on information or data obtained by a combination of sensors. Likewise, a location or time of an event may be determined by any of such sensors or components, or according to any algorithm or technique, and represented in space by a set of Cartesian coordinates or coordinates according to any other system.

If no indication of an event has been received at the server, then the process returns to box 1115, where the cameras continue to capture image frames at their respective frame rates. If an indication of an event is received at the server, however, then the process advances to box 1150, where the server identifies records of regression vectors, confidence scores in the regression vectors, and body segmentations generated from image frames at box 1140 that were captured by the cameras that included the location of the event within their respective fields of view. In some implementations, the cameras may transmit the records respectively generated thereby to the server, e.g., in real time or in near-real time upon their generation. For example, one or more processor units or transceivers within each of the cameras may transmit a record of such vectors, such scores and such segmentation to a server in any form, wirelessly or via a wired connection, in a synchronous or asynchronous manner, separately or in one or more records of a batch, or in any other manner. In some implementations, each of the records may take the form of an array or grid of cells that mimics the size or shape of an image (or a subset of the image) from which each was generated, with each of the cells corresponding to a pixel of the image and having values of coordinates of an image plane. Additionally, in some implementations, the cameras may transmit the records to the server, along with one or more of the body part locations, the map or record of the body segmentation, or the images from which each of the records was respectively generated. Alternatively, in some implementations, the records may be generated and transmitted by one or more processors or processor units that are external to the digital camera.

Upon determining that an event has occurred, e.g., at box 1145, the server may identify all of the cameras that included the location of the event within their respective fields of view for the duration, and identify all of the records generated by such cameras over the duration. For example, where each of the records or images is time-stamped or otherwise annotated as having been generated based on an image captured at a specific time, the records or images that were generated or captured within the event duration may be readily identified and retrieved, e.g., from one or more data stores or other memory components. In some other embodiments, however, the server may, upon determining that an event has occurred, e.g., at box 1145, identify all of the cameras that included the location of the event within their respective fields of view for the duration and request that such cameras transmit their respectively generated cameras to the server. Alternatively, the server may identify the records that were generated by such cameras during the duration in any other manner.

At box 1155, the server generates confidence scores in each actor depicted within the image frames based on the records identified at box 1150 that were generated by each of the cameras that held the location of the event within their respective fields of view during the event duration. For example, the confidence score may consider values of the respective regression vectors and/or their corresponding confidence scores, or any other features, in calculating a confidence score for each actor depicted within each image frame captured by each camera. In some implementations, the server may consider or exclude any of the actors or body parts (e.g., heads) thereof depicted within a given image frame on any basis. In some implementations, the records identified at box 1150 may be provided to a machine learning system or technique as inputs, and the confidence scores in each actor may be generated based on outputs received from the machine learning system or technique. The server may generate confidence scores in actors having body parts that are detected within a predetermined distance of the location of the event, and exclude actors having body parts that are detected beyond the predetermined distance of the event, or any other basis. Alternatively, in some implementations, the confidence scores in each actor may be generated for each image frame by one or more processor units of the cameras that captured the respective image frames, and the confidence scores may be transmitted to the server in lieu of, or together with, the respective records from which the confidence scores in the actors depicted therein were generated.

At box 1160, the server identifies a predetermined number of the highest confidence scores in each actor depicted within the image frames based on the records identified at box 1150. For example, where an actor is depicted within image frames captured by a number of digital cameras having fields of view overlapping at a scene, confidence scores in each of the actors depicted in each of such image frames may be calculated, e.g., by the server or, alternatively, by the respective digital cameras. A predetermined number of the highest values of such confidence scores calculated for each of the actors depicted within the image frames captured by each of such cameras may be selected to determine the most accurate or likely actor to have been associated with an event. Alternatively, in some implementations, the server may identify all of the confidence scores in each of the actors depicted in any of the image frames captured by such cameras.

At box 1165, whether a single actor may be associated with the event based on the highest confidence scores selected at box 1160 is determined. For example, the highest confidence scores identified at box 1160 and calculated based on records generated by each of the cameras may be summed, averaged or otherwise aggregated to determine an overall confidence score representing a probability or likelihood that one of the actors depicted within such image frames may be associated with the event. The overall confidence score for an actor may be compared to a predetermined threshold or a predetermined standard and, upon satisfying the threshold or standard, the actor may be associated with the event. In some implementations, the threshold or standard may relate to a value of the overall confidence score, such that where the overall confidence score in a given actor exceeds the threshold or standard, the actor may be associated with the event. In some implementations, however, the threshold or standard may relate to a difference between a highest overall confidence score in one actor and a next-highest overall confidence score in another actor (or other overall confidence scores in other actors), such that where a difference between the highest overall confidence score and the next-highest overall confidence score exceeds the threshold or standard, the actor having the highest overall confidence score may be associated with the event. Whether a single actor may be associated with an event may be determined based on confidence scores in any manner in accordance with the present disclosure.

If a single actor may be associated with the event based on the highest confidence scores, such that where one of the actors appearing within such images may be identified with a sufficiently high degree of confidence, then the process advances to box 1185, where the single actor is associated with the event. For example, where the event involves the removal of an item from a storage unit or the placement of an item on the storage unit, one of the item may be added to or removed from a virtual shopping cart or other record of items associated with the actor.

If no single actor may be associated with the event based on the highest confidence scores identified at box 1160, however, the process advances to box 1170, where the server determines, for each of the cameras, a per-camera confidence score (or weighting factor) based on the average confidence scores in the respective event-to-head regression vectors determined from image frames captured by such cameras and the proximities of the heads depicted within such image frames to the location of the event. For example, high levels of confidence in event-to-head regression vectors generated from an image captured by a camera during an event may indicate that the camera held a relatively clear and unobstructed view of the location of the event, and the body parts of actors, during the event, and that the image or data generated therefrom may be relied upon in identifying an actor associated with the event. Conversely, low levels of confidence in event-to-head regression vectors may indicate that the camera held an unclear or obstructed view of the location of the event, or the body parts of actors, during the event. Moreover, locations of heads detected within such image frames, or proximities of such heads to the location of the event, may serve to increase or decrease a likelihood that a given actor was associated, or was not associated, with the event. In some implementations, an event-to-head regression vector, or a confidence score in the event-to-head regression vector, may be divided by or multiplied by an inverse of a distance between a head and the location of the event, or otherwise modified, to determine the per-camera confidence score. In some implementations, where a head of an actor is beyond a predetermined distance or range of the location of the event, such as in three-dimensional space or within an image plane in two-dimensional space, the actor may be ruled out from consideration in identifying which of the actors depicted within one or more image frames is associated with an event. For example, in some implementations, actors having heads that are located more than a predetermined distance or range of one-and-one-half to two meters (or 1.5 m to 2 m) from the location of the event may be ruled out from consideration. Alternatively, in some implementations, a per-camera confidence score may be calculated without regard to distances between locations of heads and locations of events. In still other implementations, a per-camera confidence score may be calculated based on locations of any other body parts (e.g., hands), or distances between a location of the event and locations of such other body parts.

At box 1175, the server preferentially weights each of the confidence scores in actors calculated based on records generated from images captured by each of the cameras based on the per-camera confidence scores calculated for such cameras at box 1170. For example, the confidence scores in such actors that are generated at box 1155 may be multiplied or otherwise modified by the per-camera confidence scores for each of the cameras that generated the records from which the confidence scores in the actors were generated. Where a per-camera confidence score is high for a given camera, a confidence score in a given actor derived from a record generated by that camera may be deemed reliable or helpful in identifying an actor associated with an event. Conversely, where a per-camera confidence score is low for a given camera, a confidence score in a given actor derived from a record generated by that camera may be deemed unreliable or unhelpful in identifying the actor associated with the event.

The server may generate a per-camera confidence score based on confidence scores calculated for event-to-head regression vectors and/or confidence scores in such regression vectors for image frames captured using a given camera over a period of time, e.g., the duration of the event. Alternatively, a per-camera confidence score or other measure in confidence in image frames captured using a camera may be calculated in any other manner. In some implementations, per-camera confidence scores may be calculated for each of the plurality of cameras. Alternatively, in some implementations, per-camera confidence scores may be calculated only for a subset of the cameras, which may be selected from cameras that included the location of the event within their respective fields of view, from cameras that have sufficiently high levels of image quality, or in any other manner. Furthermore, in some embodiments, any other aspect of records received from a given camera may be weighted or otherwise modified based on a per-camera confidence score calculated for that camera.

At box 1180, whether a single actor may be associated with the event based on the highest confidence scores selected at box 1160, as weighted by the per-camera confidence scores is determined. For example, the as-weighted confidence scores may be aggregated in the same manner as the selected highest confidence scores in box 1165 (e.g., summed, averaged or otherwise), or in any other manner, to determine an overall confidence score representing a probability or likelihood that one of the actors depicted within such image frames may be associated with the event, taking into account a level of confidence in imaging data captured by the respective cameras. In some implementations, where a per-camera confidence score is low or below a given threshold or standard, confidence scores in actors generated based on images captured by that camera may be disregarded. The overall confidence score for an actor may be compared to a predetermined threshold or a predetermined standard, which may be the same threshold or standard to which the highest confidence scores were subjected at box 1165, or another threshold or standard.

To the extent that one of the actors appearing within such images may be identified with a sufficiently high degree of confidence, as weighted based on the per-camera confidence scores, the process advances to box 1185, where that actor may be determined to have been associated with the event. If a single actor may not be associated with the event based on the weighted confidence scores, however, then the process advances to box 1190, where a single actor may be selected as being associated with the event by one or more alternate (e.g., manual or automatic) techniques. For example, one or more human operators may visually evaluate the images captured by the various cameras that included the event within their respective fields of view, and determine which of the actors depicted within such images is associated with the event. Alternatively, an actor associated with an event may be identified in any manner.

At box 1195, whether the cameras are to be used to continue monitoring the scene for activity is determined. If the continued use of the cameras is desired, then the process returns to box 1115, where the cameras continue to capture image frames at their respectively predetermined frame rates. If the continued use of the cameras is no longer desired, however, then the process ends.

Referring to FIGS. 12A through 12I, views of aspects of one system for associating events with actors using digital imagery and machine learning in accordance with implementations of the present disclosure are shown. Except where otherwise noted, reference numerals preceded by the number "12" shown in FIGS. 12A through 12I indicate components or features that are similar to components or features having reference numerals preceded by the number "10" shown in FIG. 10, by the number "9" shown in FIGS. 9A through 9C, by the number "8" shown in FIGS. 8A and 8B, by the number "7" shown in FIGS. 7A through 7C, by the number "5" shown in FIGS. 5A through 5E, by the number "4" shown in FIGS. 4A through 4E, by the number "2" shown in FIG. 2A or 2B, by the number "1" shown in FIGS. 1A through 1J.

Figure 12A:
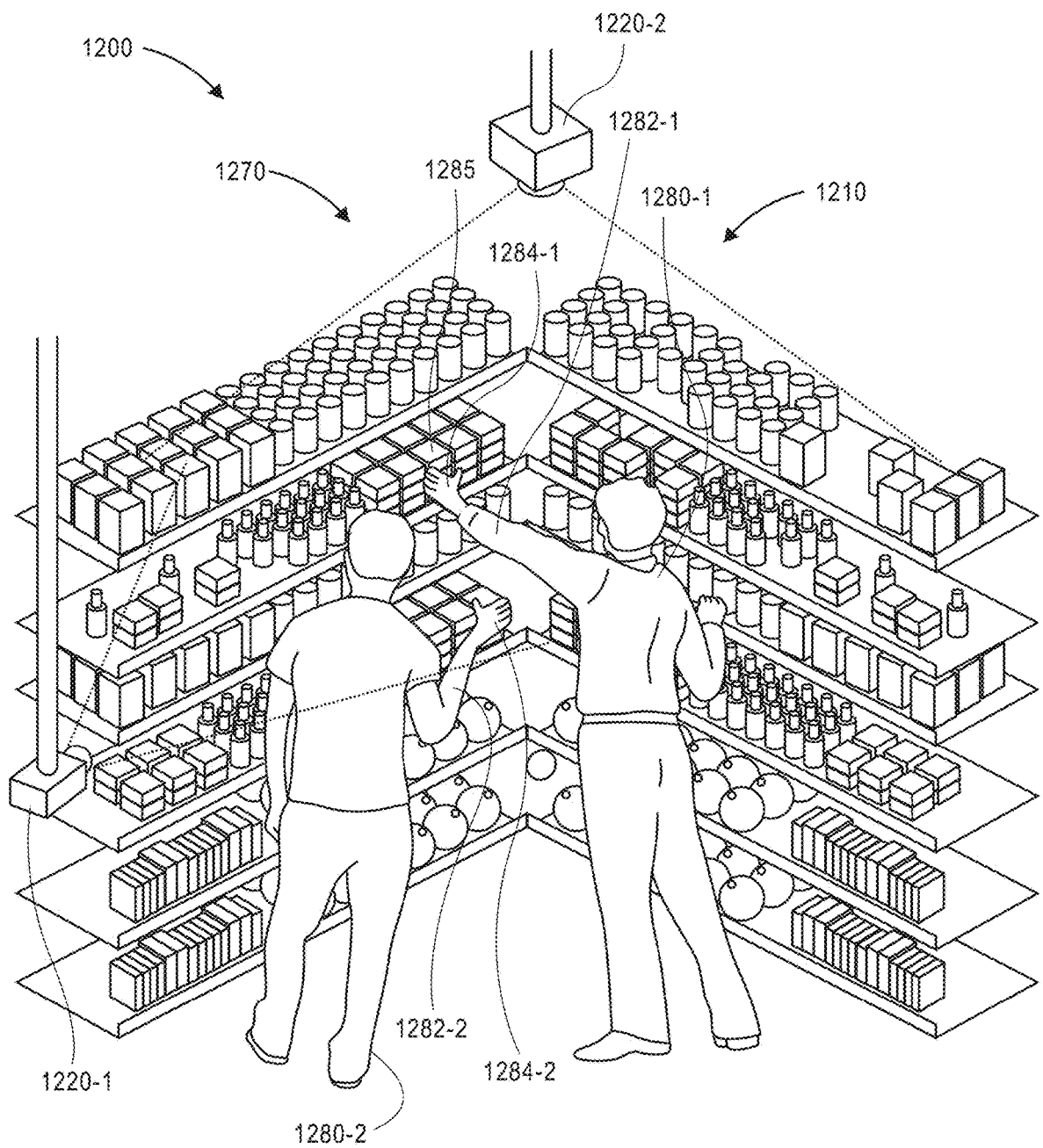
FIGS. 12A through 12I are views of aspects of one system for associating events with actors using digital imagery and machine learning in accordance with implementations of the present disclosure.

As is shown in FIG. 12A, a system 1200 includes a materials handling facility 1210 having a pair of digital cameras (or other imaging devices) 1220-1, 1220-2 that include a storage unit 1270 within their fields of view. The storage unit 1270 includes a plurality of items on one or more shelves. As is shown in FIG. 12A, a pair of actors 1280-1, 1280-2 are located at the materials handling facility 1210, within a vicinity of the storage unit 1270. As is further shown in FIG. 12A, the actor 1280-1 extends an arm 1282-1 and a hand 1284-1 toward one or more items on an upper shelf of the shelving unit 1270, while the actor 1280-2 extends an arm 1282-2 and a hand 1284-2 toward one or more items on a lower shelf of the shelving unit 1270.

Figure 12B:
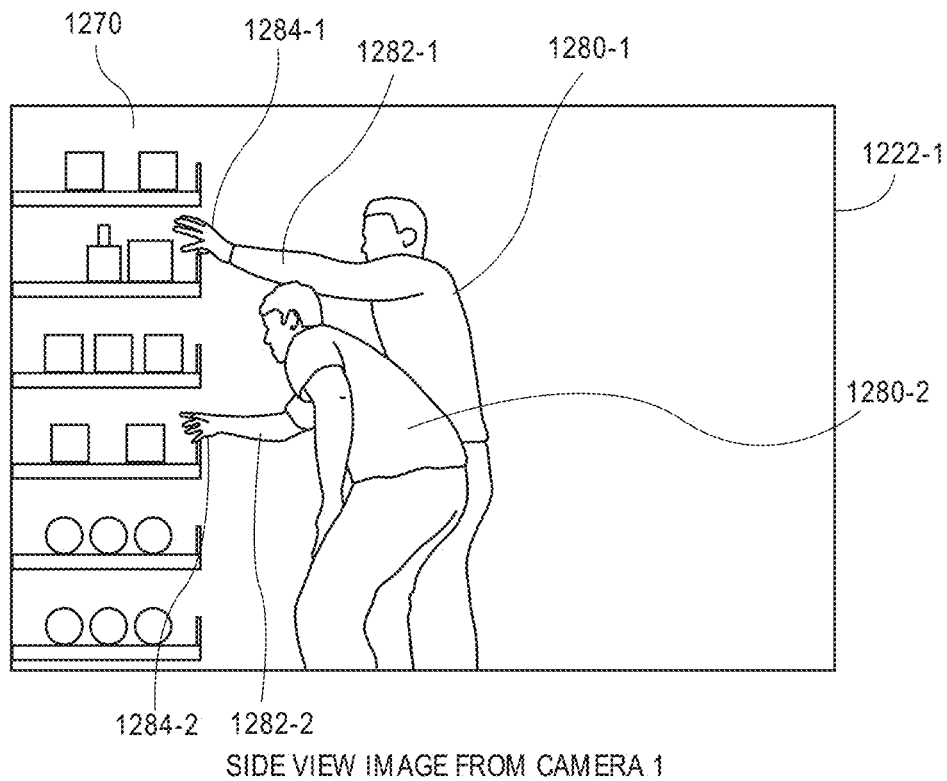
Figure 12B:
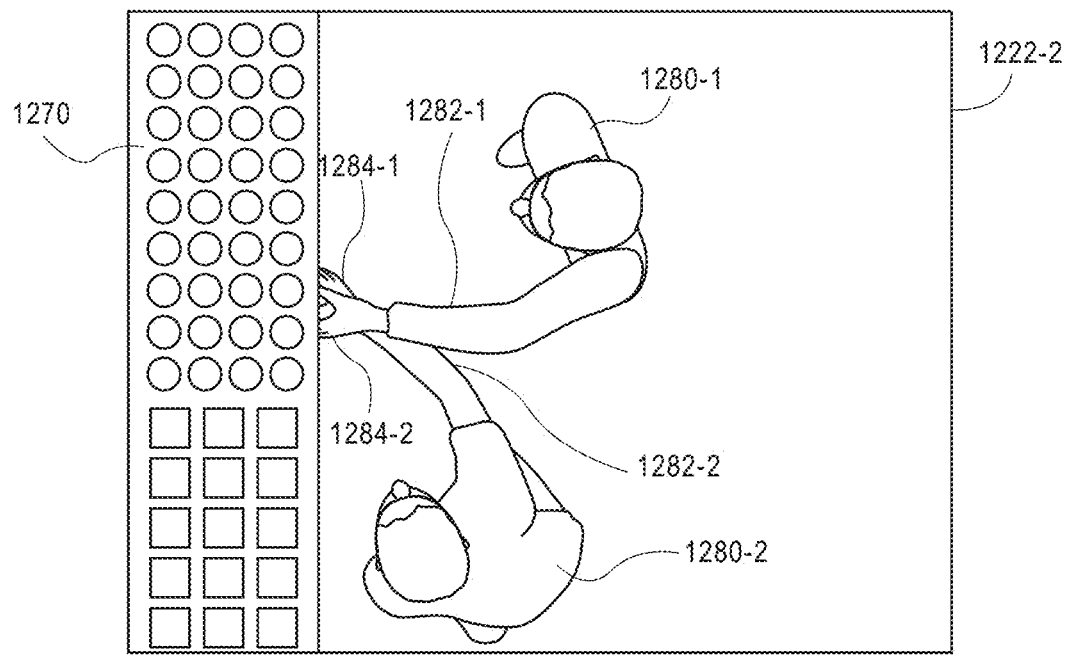

As is discussed above, the systems and methods of the present disclosure may be utilized to distinguish between multiple actors, and to select one of such actors as being associated with a given event, by preferentially weighting information or data captured or generated by cameras with high levels of confidence in event-to-head regression vectors generated from images captured by such cameras over a duration of an event, or locations of nearby heads within such images, and downgrading or disregarding information or data captured or generated by cameras with low levels of confidence in such regression vectors generated from images captured by such cameras over the duration of the event, or locations of nearby heads within such images. As is shown in FIG. 12B, a pair of images 1222-1, 1222-2 captured by the cameras 1220-1, 1220-2, respectively, are shown. The image 1222-1 captured by the camera 1220-1, which has a side view with respect to the shelving unit 1270, shows the arm 1282-1 and the hand 1284-1 of the actor 1280-1 reaching over the arm 1282-2 and the hand 1284-2 of the actor 1280-2, with both of the hands 1284-1, 1284-2 extended into different shelves of the shelving unit 1270. As is shown in FIG. 12B, the arm 1282-1 and the arm 1282-2 are visibly and discernably separated within the image 1222-1.

As is also shown in FIG. 12B, the image 1222-2 captured by the camera 1220-2, which has a top (or overhead) view with respect to the shelving unit 1270, shows the arm 1282-1 and the hand 1284-1 of the actor 1280-1, and also the arm 1282-2 and the hand 1284-2 of the actor 1280-2, extended into the shelving unit 1270. As is shown in FIG. 12B, and as is depicted within the image 1222-2, the arm 1282-1 and the hand 1284-1 of the actor 1280-1 cross over the arm 1282-2 or the hand 1284-2 of the actor 1280-2. The arms 1282-1, 1282-2 and the hands 1284-1, 1284-2 may not be readily distinguished from one another based on the image 1222-2. Moreover, the arm 1282-1 and the hand 1284-1 are depicted within the image 1222-2 as being near a head of the actor 1280-2, and the arm 1282-2 and the hand 1284-2 are depicted within the image 1222-2 as being near a head of the actor 1280-1.

Figure 12C:
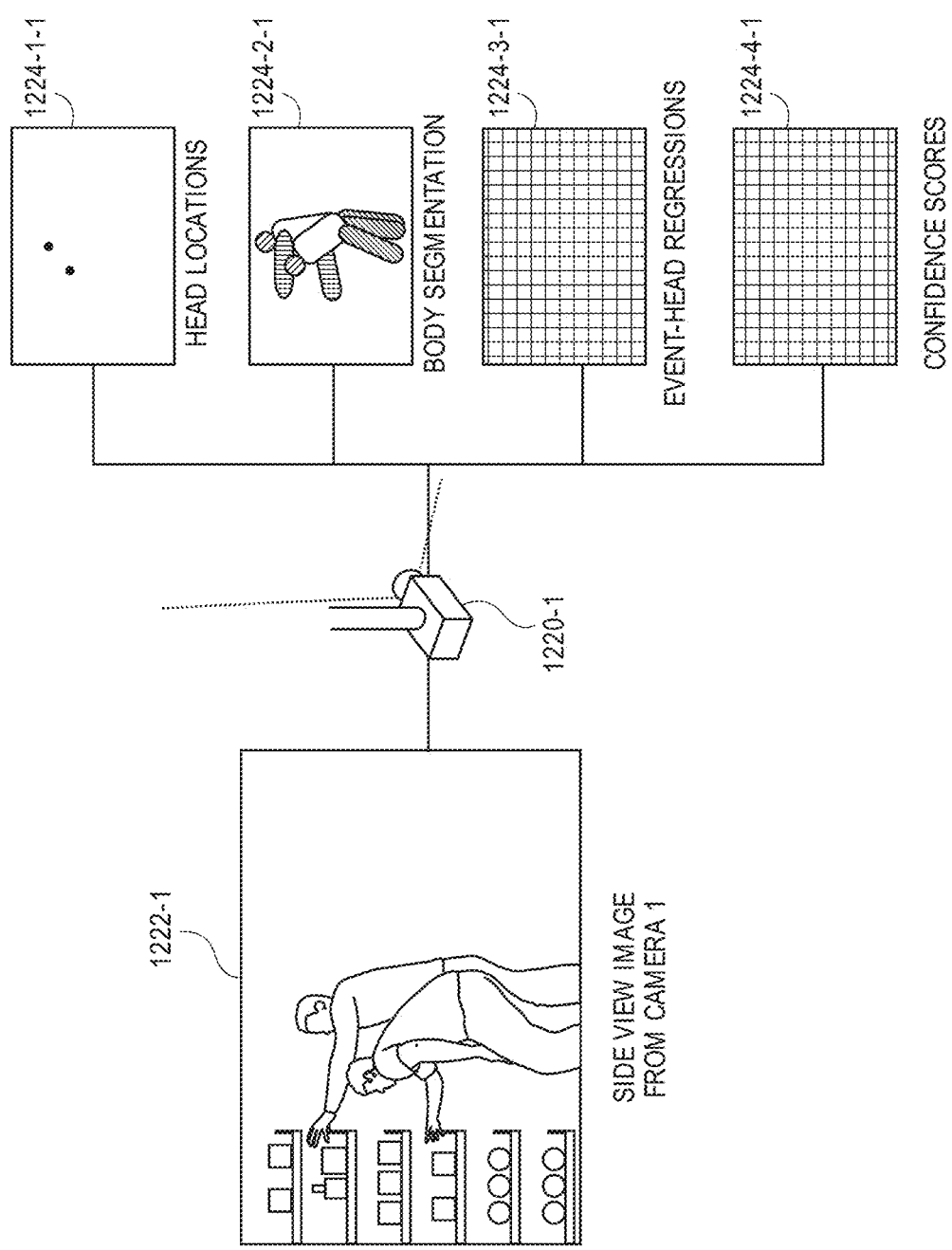

In accordance with some implementations of the present disclosure, the cameras 1220-1, 1220-2 may be programmed to execute one or more machine learning systems or techniques on images captured thereby, such as the images 1222-1, 1222-2 shown in FIG. 12B. For example, as is shown in FIG. 12C, the camera 1220-1 may provide the image 1222-1 as an input to one or more machine learning systems or techniques (e.g., a convolutional neural network, or another multi-level neural network) operating thereon. One or more processors or processor units on the camera 1220-1 may identify a set of locations of heads 1224-1-1 depicted within the image 1222-1, generate segmentation records 1224-2-1 of bodies depicted within the image, generate event-to-head regression vectors 1224-3-1 for the heads depicted within the image 1222-1, or generate confidence scores 1224-4-1 for each of the regression vectors 1224-3-1 based on one or more outputs received from the machine learning systems or techniques.

Figure 12D:
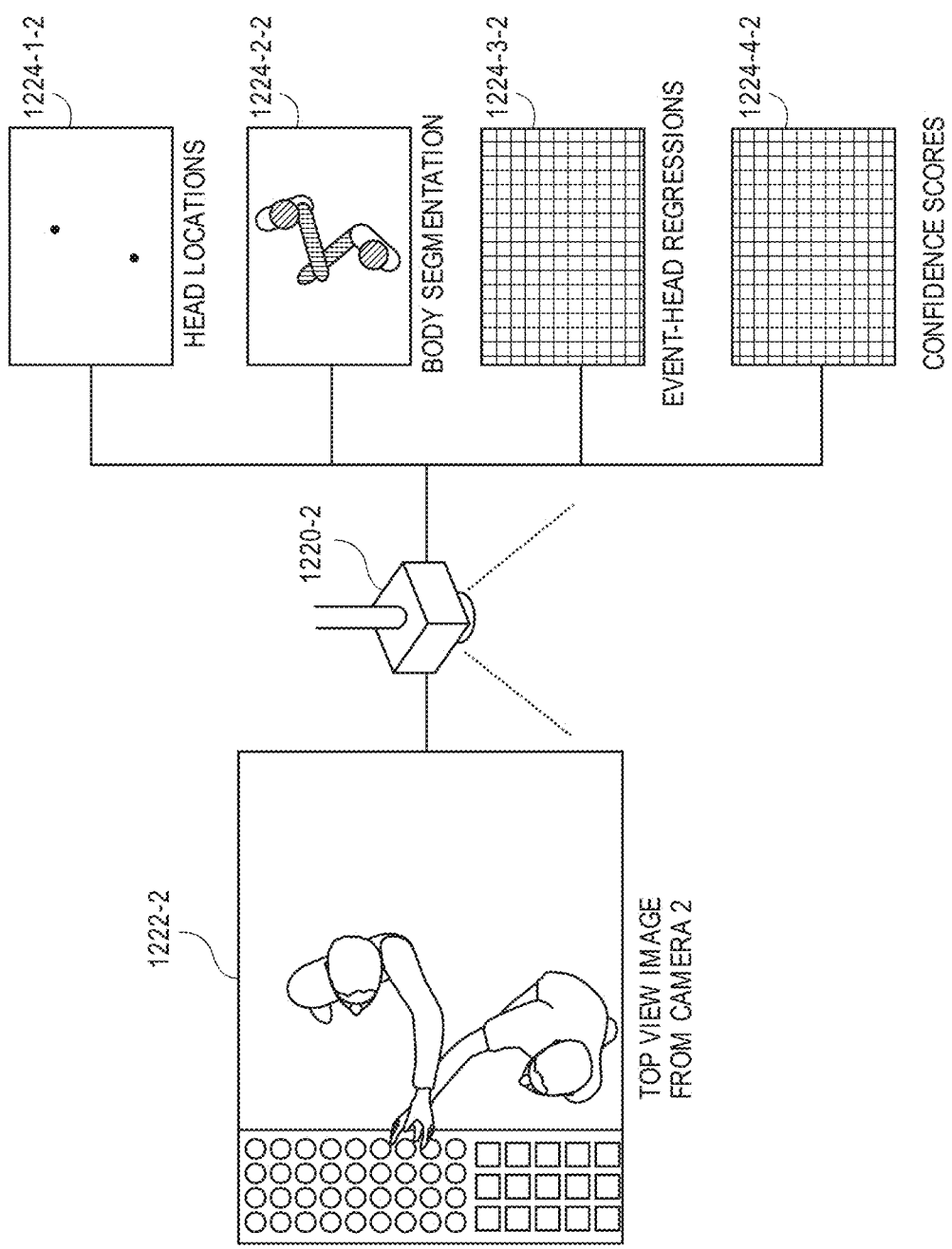

Similarly, as is shown in FIG. 12D, the camera 1220-2 may provide the image 1222-2 as an input to machine learning systems or techniques operating thereon. One or more processors or processor units on the camera 1220-2 may identify a set of locations of heads 1224-1-2 depicted within the image 1222-2, generate segmentation records 1224-2-2 of bodies depicted within the image, generate event-to-head regression vectors 1224-3-2 for the heads depicted within the image 1222-2, or generate confidence scores 1224-4-2 for each of the regression vectors 1224-3-2 based on one or more outputs received from the machine learning systems or techniques.

Figure 12E:
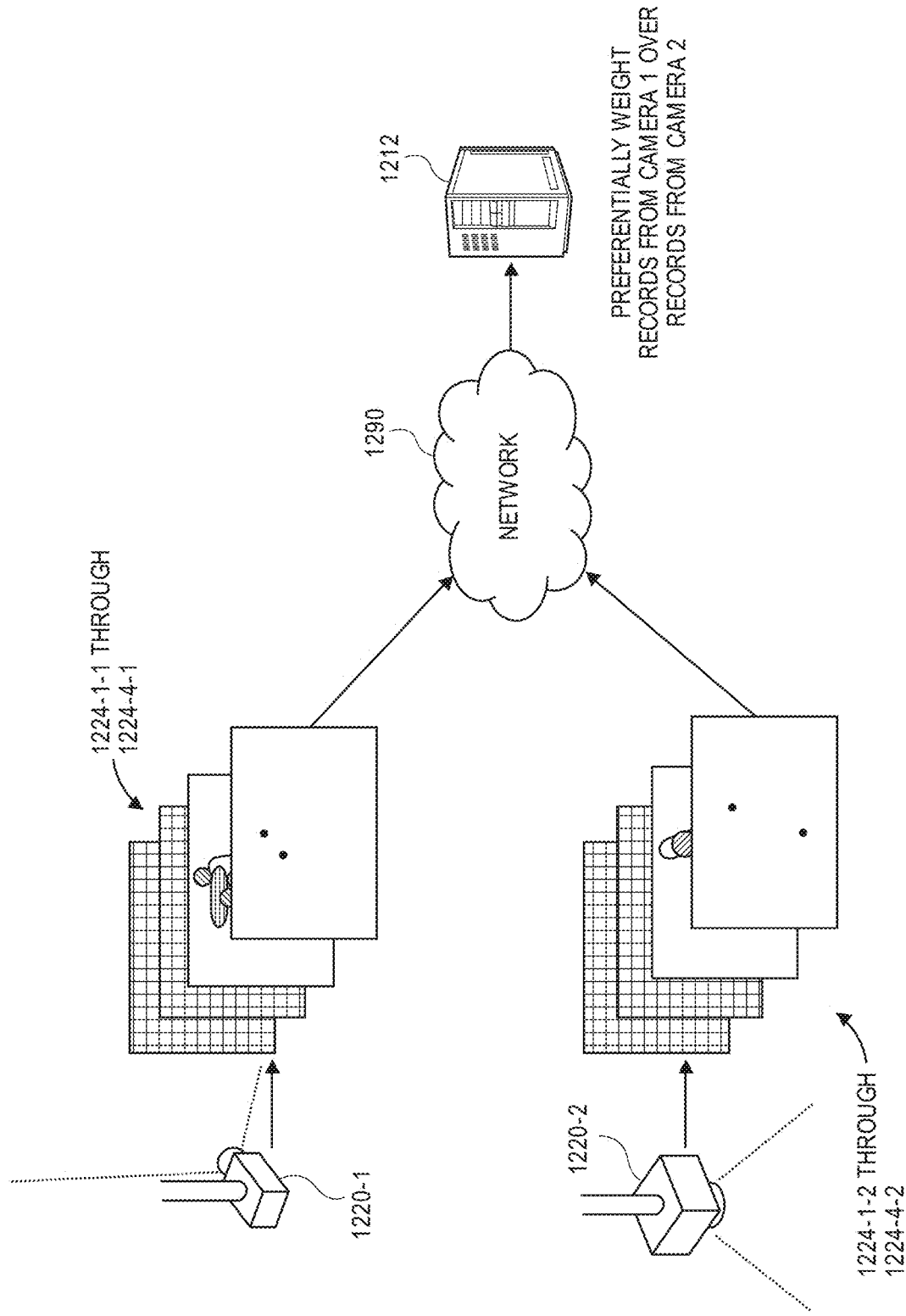

As is shown in FIG. 12E, records 1224-1-1 through 1224-4-1 and records 1224-1-2 through 1224-4-2 of head locations, body segmentation, vectors or confidence scores calculated by each of the cameras 1220-1, 1220-2 based on the images 1222-1, 1222-2 may be transmitted to a server 1212 over a network 1290 in any manner and at any speed or rate, e.g., continuously, in real time or in near-real time, or synchronously or asynchronously, e.g., in one or more batch processes.

When an event such as a retrieval of one of the items, e.g., an item 1285, from the shelving unit 1270 is detected at a given location and time, or for a given duration, information regarding the event may be provided to the server 1212, e.g., by an event generation system. The server 1212 may then determine whether the cameras 1220-1, 1220-2 included the location of the event within their respective fields of view at the time of the event and identify the respective images captured by the cameras 1220-1, 1220-2 during the event duration. The server 1212 may further determine which of the cameras 1220-1, 1220-2 best depicts the location of the event at all relevant times, based on confidence scores in the respective regression vectors (e.g., event-to-head regression vectors) calculated based on images captured using the cameras 1220-1, 1220-2. The server 1212 may process the records 1224-1-1 through 1224-4-1 and the records 1224-1-2 through 1224-4-2 to generate confidence scores in actors depicted within the images 1222-1, 1222-2, e.g., the actors 1280-1, 1280-2, or any others (not shown). The confidence scores in the actors generated based on the records 1224-1-1 through 1224-4-1 and the records 1224-1-2 through 1224-4-2 and/or the image 1222-1 or the image 1222-2 may be summed, averaged or otherwise aggregated in order to determine an overall confidence score in each of such actors 1280-1, 1280-2.

In some implementations, such as where neither of the confidence scores in the respective actors 1280-1, 1280-2 is sufficiently high or otherwise fails to meet or satisfy a threshold or standard for identifying one of the actors 1280-1, 1280-2 as associated with the event, per-camera confidence scores may be calculated based on the confidence scores in one or more regression vectors, and a per-camera confidence score or weighting variable may be generated for each of the cameras 1220-1, 1220-2 based on the respective per-camera confidence scores.

For example, as is shown in FIG. 12E, because the camera 1220-1 held a clear view of the separation of the heads 1280-1, 1280-2, the arms 1282-1, 1282-2, and the hands 1284-1, 1284-2 of the respective actors 1280-1, 1280-2, and because the camera 1220-2 held a less clear view, as is shown in FIG. 12B, the records 1224-1-1 through 1224-4-1 generated based on images captured using the camera 1220-1 may be preferentially weighted over the records 1224-1-2 through 1224-4-2 generated based on images captured using the camera 1220-2. A substantially high per-camera confidence score or weighting factor may be calculated for the camera 1220-1 over the duration of the event, and the per-camera confidence score or weighting factor may be applied to confidence scores in actors generated based on images captured using the camera 1220-1. Conversely, a substantially low per-camera confidence score or weighting factor may be calculated for the camera 1220-2 over the duration of the event, and the per-camera confidence score or weighting factor may be applied to confidence scores in actors generated based on images captured using the camera 1220-2.

Using such confidence scores, images captured by the respective cameras 1220-1, 1220-2, or records generated based on such images, may be preferentially considered or otherwise treated in any manner based on the values of their respective per-camera confidence scores or weighting variables. In some implementations, such as embodiments in which large numbers of cameras (e.g., greater than two) include a location of an event within their respective fields of view, images captured by one or more of the cameras or records generated therefrom may be disregarded.

For example, referring again to FIGS. 12B through 12E, the records 1224-1-1 through 1224-4-1 generated by the camera 1220-1, which held an unoccluded view of the event, as shown in FIG. 12B, may be preferentially weighted over the records 1224-1-2 through 1224-4-2 generated by the camera 1220-2, which held an occluded view of the event, as also shown in FIG. 12B. In some implementations, such as where the per-camera confidence score calculated for the camera 1220-2 is sufficiently low, the records 1224-1-2 through 1224-4-2 generated by the camera 1220-2 may be disregarded.

Figure 12F:
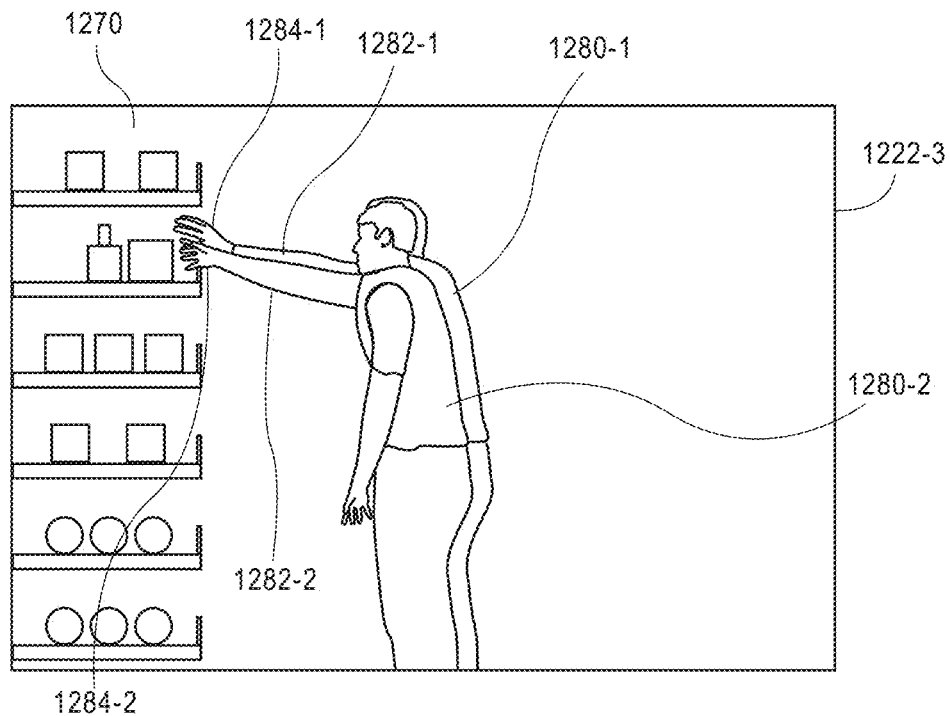
Figure 12F:
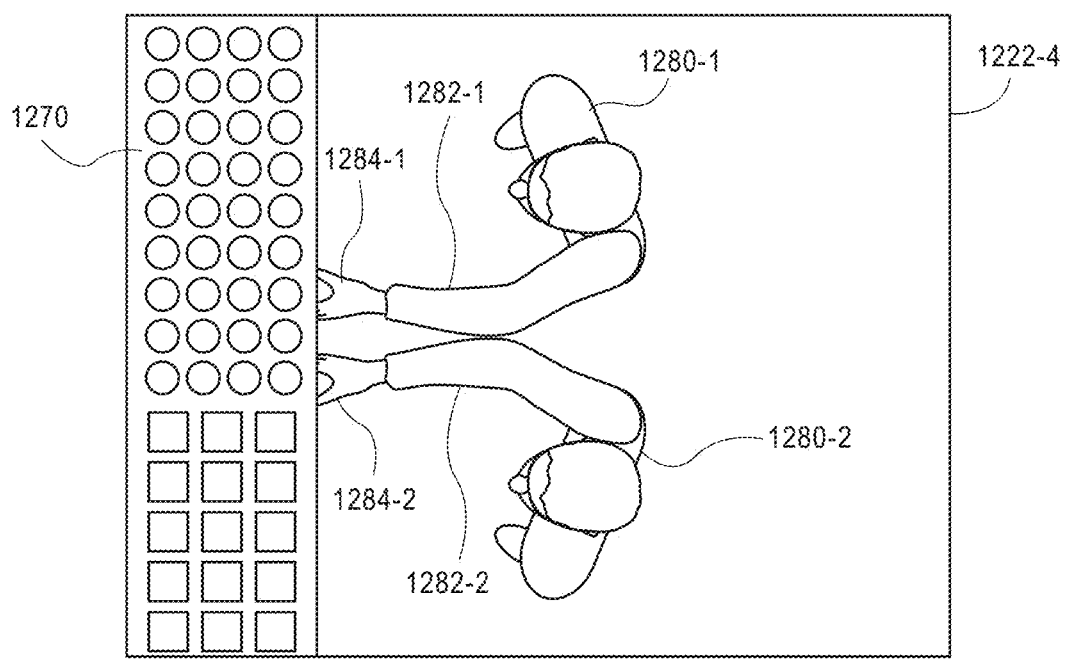

Those of ordinary skill in the pertinent arts will recognize that the process shown in FIG. 1IA or 11B, or aspects of the system shown in FIGS. 12A through 12I, may be utilized in connection with any type of event, and any number of actors, regardless of the orientations or alignments of the respective cameras. For example, as is shown in FIG. 12F, an image 1222-3 captured by the camera 1220-1, which has a side view with respect to the shelving unit 1270, shows the arms 1282-1, 1282-2 of the actors 1280-1, 1280-2 extending into a common shelf of the shelving unit 1270 alongside one another, without any visible or discernible separation between one another. Similarly, an image 1222-4 captured by the camera 1220-2, which has a top (or overhead) view with respect to the shelving unit 1270, shows a separation between the respective arms 1282-1, 1282-2 from above the shelving unit 1270.

Figure 12G:
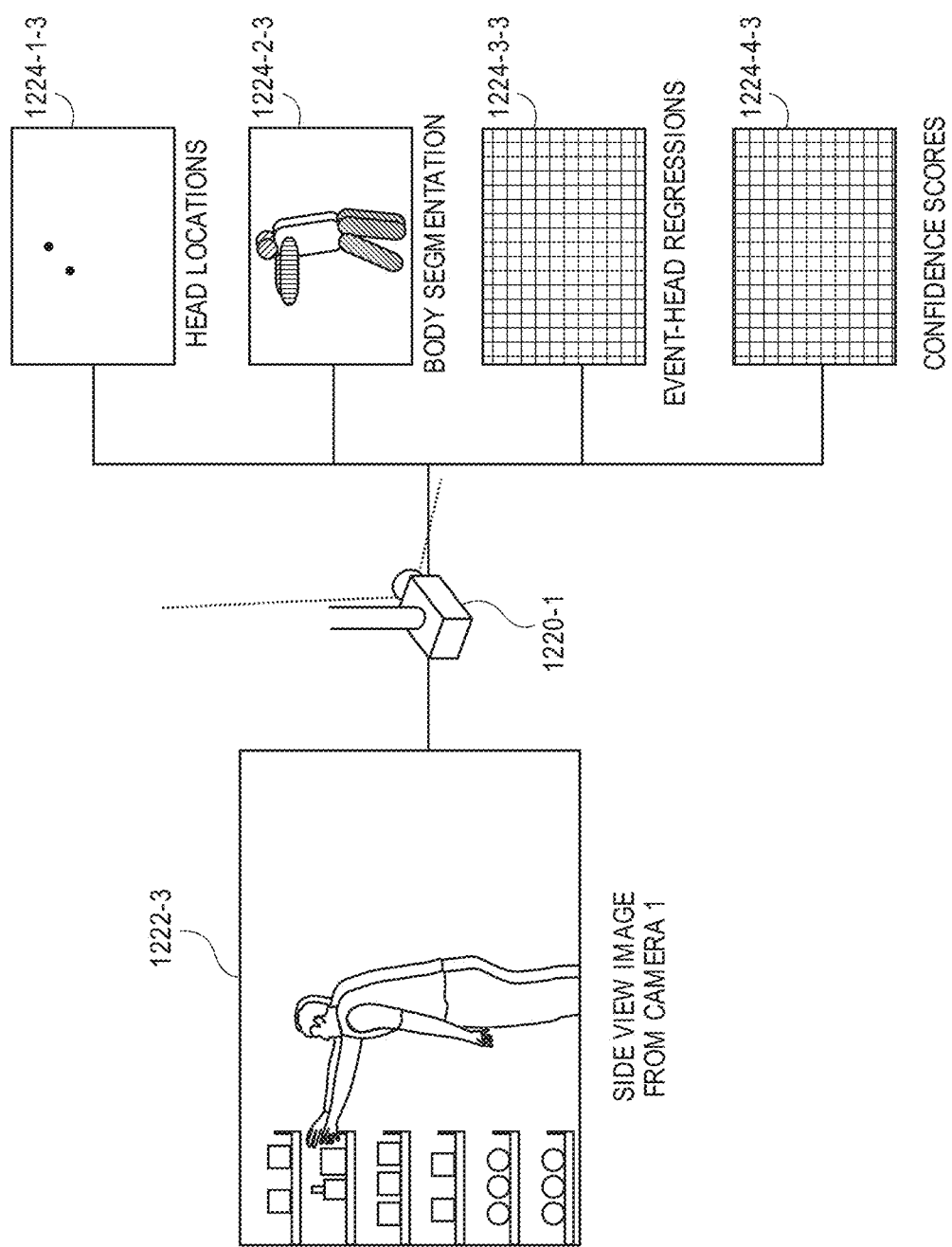

As is shown in FIG. 12G, the camera 1220-1 may provide the image 1222-3 as an input to one or more machine learning systems or techniques operating thereon, and one or more processors or processor units on the camera 1220-1 may identify a set of locations of heads 1224-1-3 depicted within the image 1222-3, generate segmentation records 1224-2-3 of bodies depicted within the image, generate event-to-head regression vectors 1224-3-3 for the heads depicted within the image 1222-3, or generate confidence scores 1224-4-3 for each of the regression vectors 1224-3-3 based on one or more outputs received from the machine learning systems or techniques.

Figure 12H:
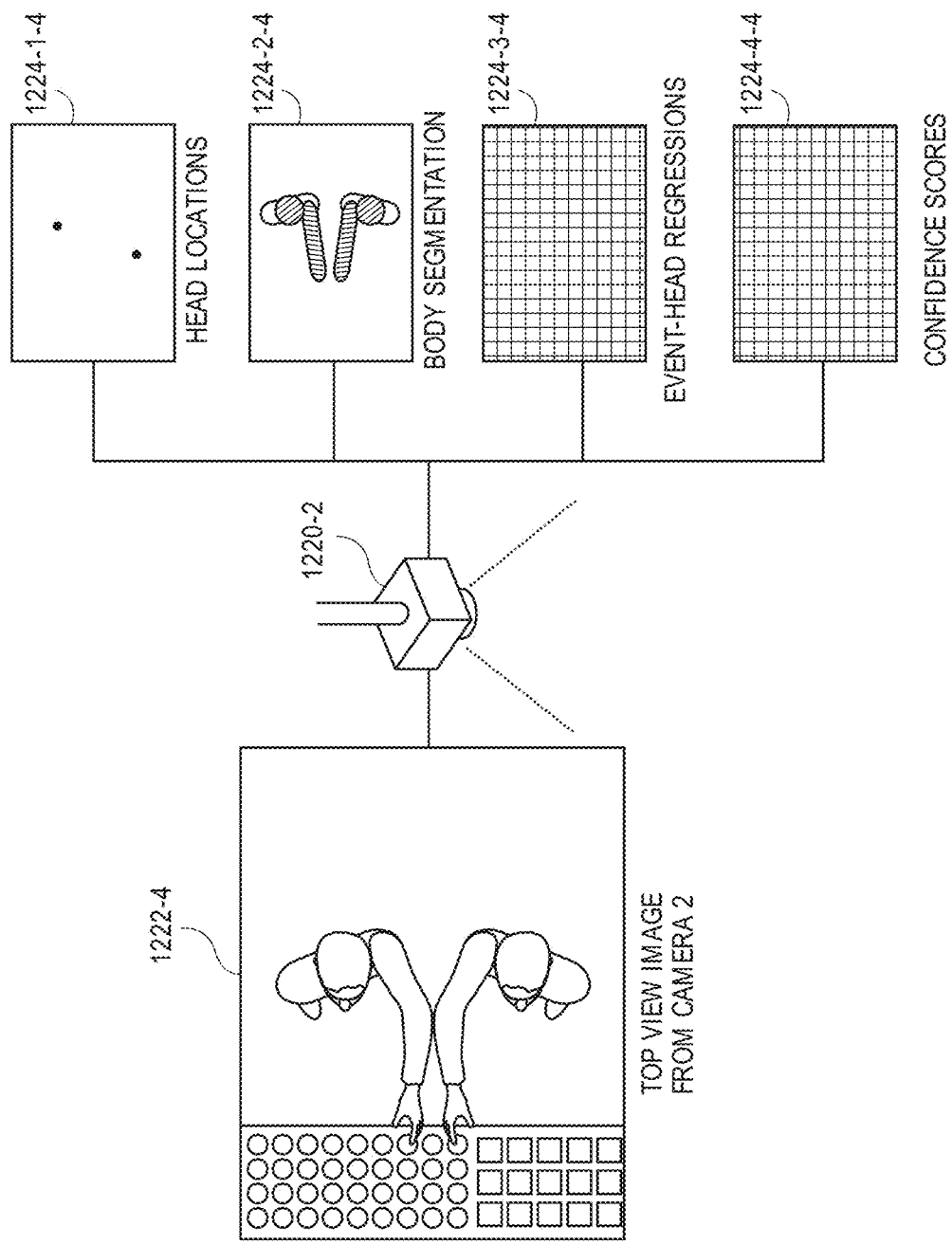
Figure 12I:
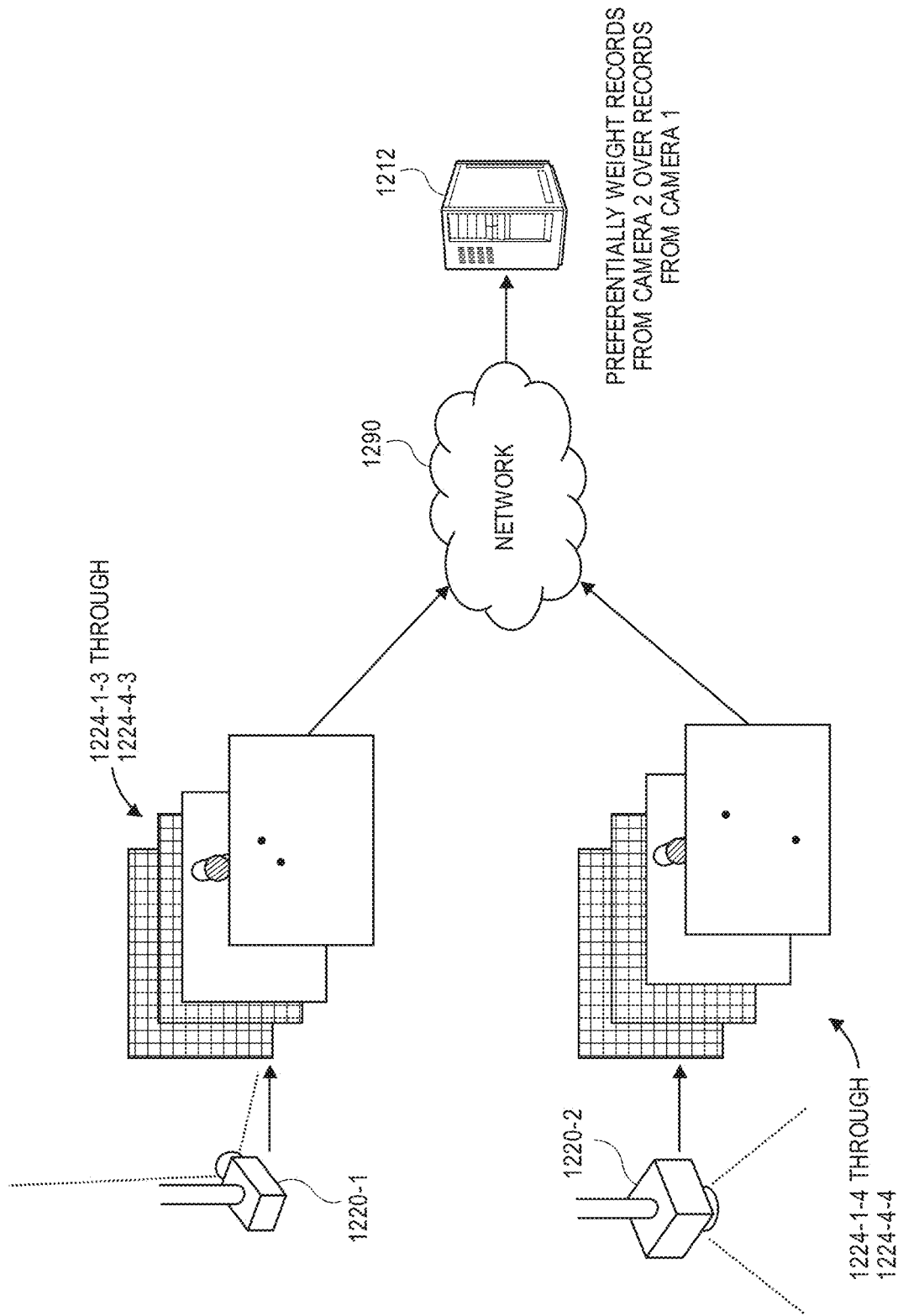

Similarly, as is shown in FIG. 12H, the camera 1220-2 may provide the image 1222-4 as an input to machine learning systems or techniques operating thereon. One or more processors or processor units on the camera 1220-2 may identify a set of locations of heads 1224-1-4 depicted within the image 1222-4, generate segmentation records 1224-2-4 of bodies depicted within the image, generate event-to-head regression vectors 1224-3-4 for the heads depicted within the image 1222-4, or generate confidence scores 1224-4-4 for each of the regression vectors 1224-3-4 based on one or more outputs received from the machine learning systems or techniques.

As is shown in FIG. 12, records 1224-1-3 through 1224-4-3 and records 1224-1-4 through 1224-4-4 of head locations, body segmentation, vectors or confidence scores calculated by each of the cameras 1220-1, 1220-2 based on the images 1222-3, 1222-4 may be transmitted to the server 1212 over the network 1290 in any manner and at any speed or rate. As is discussed above, where an event such as a retrieval of one of the items, e.g., the item 1285, from the shelving unit 1270 is detected at a given location and time, or for a given duration, information regarding the event may be provided to the server 1212, e.g., by an event generation system. The server 1212 may then make one or more determinations as to which of the cameras 1220-1, 1220-2, depicted the event most clearly, e.g., based on confidence scores determined for regression vectors generated from images captured during the duration of the event.

Therefore, referring again to FIGS. 12F through 12I, the records 1224-1-4 through 1224-4-4 generated by the camera 1220-2, which held an unoccluded view of the event, as shown in FIG. 12F, may be preferentially weighted over the records 1224-1-3 through 1224-4-3 generated by the camera 1220-1, which held an occluded view of the event, as also shown in FIG. 12F.

In most instances, where an actor executes an event involving an item at a materials handling facility using one hand, the actor is typically not executing another event with any other item using another hand. Therefore, in some implementations, where hands of actors are detected within images captured by a plurality of cameras, and an actor is identified being associated with an event based on such images, regression vectors extending between locations of detected hands and locations of detected heads may be generated. To the extent that a hand-to-head regression vector calculated based on a detected hand that is beyond a minimum distance from an event location points to the same head as an event-to-head regression vector, thus signifying that the actor deemed most likely to be associated with an event is also deemed to most likely have another hand within the inventory area, e.g., executing another event with another item in the inventory area during a duration of the original event, then a level of confidence that the actor is associated with the event may be downgraded, or a determination that the actor is associated with the event may be disregarded. Conversely, where hand-to-head regression vectors calculated based on detected hands beyond the minimum distance from the event location do not point to an actor deemed most likely associated with an event, or point to other actors, then a level of confidence that the actor is associated with the event may be upgraded, or a determination that the actor is associated with the event may be confirmed. Detections of hands may be determined in any manner, such as by processing one or more images using machine learning systems or techniques, and hand-to-head regression vectors may be used to quantitatively or qualitatively determine whether an actor is most likely associated with an event, or to modify a confidence score that the actor is associated with the event.

Figure 13:
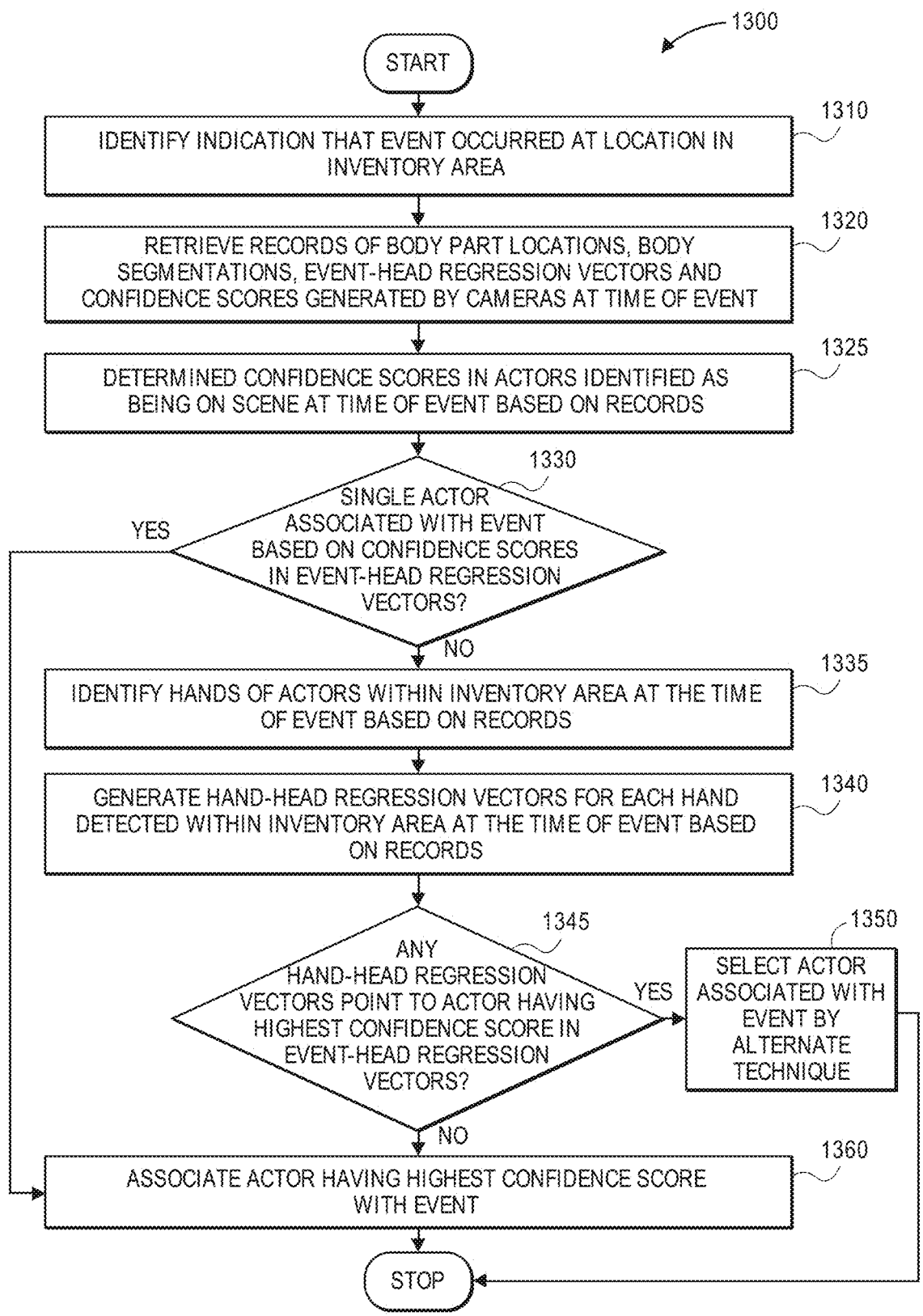
FIG. 13 is a flow chart of one process for associating events with actors using digital imagery and machine learning in accordance with implementations of the present disclosure.

Referring to FIG. 13, a flow chart 1300 of one process for associating events with actors using digital imagery and machine learning in accordance with implementations of the present disclosure. At box 1310, an indication that an event has occurred at a location within an inventory area and at a time or for a duration is identified. The indication may be generated by any number of sensors or other components and received by a server, a computer device or any other system, or identified in any other manner, e.g., in real time or near-real time, or at any later time. In some implementations, the event may be detected based on changes in loading, as detected by a load sensor or other system, at a time or for a duration. In some other implementations, the event may be detected based on signals received by one or more RFID sensors or LIDAR sensors at a time or for a duration, or images captured using one or more cameras at the time or for the duration, or in any other manner, e.g., based on information or data obtained by a combination of sensors at the time or for the duration.

At box 1320, records of body part locations of actors, body segmentations, event-to-head regression vectors and confidence scores in such vectors that were generated based on images captured by the cameras of the subset at a time of the event, or during a duration of the event, are retrieved or otherwise accessed by a server, a computer device or any other system, e.g., from one or more data stores. For example, one or more cameras including all or portions of a scene, e.g., a materials handling facility, a fulfillment center, a warehouse or any other facility (e.g., indoor or outdoor) within which actors may execute one or more poses, gestures or other actions, within their respective fields of view may be outfitted or equipped with one or more processor units that are configured to receive inputs comprising images captured by such cameras and generate outputs in the form of one or more locations of heads or other body parts, regression vectors between pixels corresponding to heads or other body parts of actors and pixels at which a hypothetical event may occur. The records may have been generated by the cameras, e.g., according to one or more machine learning systems or techniques, and transmitted to a server, a computer device or any other system over one or more networks in real time, in near-real time, or in any other manner. Additionally, the machine learning systems or techniques by which such body part locations, body segmentation, event-to-head regression vectors and confidence scores are generated may be multi-level in nature and are not limited.

At box 1325, confidence scores in actors identified as being on the scene at a time of the event are determined. For example, where one or more of the records retrieved at box 1320 indicates that actors were present on the scene at a time of an event, or during a duration of the event, confidence scores in regression vectors in each of the actors (e.g., event-to-head regression vectors or others) may be identified, and a predetermined number of the highest confidence scores for each actor may be identified and selected.

At box 1330, whether a single actor, e.g., the single actor having the highest confidence score of the actors identified as being depicted within images based on the records exceeds a threshold associated with the event, may be identified as being associated with the event based on the confidence scores determined at box 1325 is determined. If a confidence score in an actor having a highest confidence score in an event-to-head regression vector pointing to a head of that actor, exceeds one or more thresholds, thereby enabling the single actor to be associated with the event based on the confidence score alone, then the process advances to box 1360, where the single actor having the highest confidence score is associated with the event.

If no confidence score in any single actor exceeds the threshold, however, then the process advances to box 1335, where hands of actors within the inventory area at a time of the event or during a duration of the event are identified based on the records retrieved at box 1320. For example, pairs of coordinates of hands of actors appearing within images (e.g., a head, a shoulder, a torso, a waist or a foot) of actors appearing within the images and, alternatively or additionally, a level or metric of confidence in such hands, may be determined based on such records. In some implementations, each of the hands that are depicted within images captured at a time of the event, or during a duration of the event, as indicated in the records, may be identified. Alternatively, hands that are depicted within images captured at a time of the event, or during a duration of the event, may be identified subject to any geographic or physiological constraints. For example, hands that are within or beyond a predetermined range (e.g., distance) of the location of the event in three-dimensional space, or within or beyond a predetermined range (e.g., number of pixels) of the location of the event within an image, may be identified based on such records, or in any other manner.

At box 1340, hand-to-head regression vectors are generated for each of the hands detected within the inventory area at a time of the event, or during a duration of the event, as identified from the records at box 1335. For example, each of the regression vectors may identify, for each pixel of an image or of a portion of the image corresponding to the inventory area, which of the heads depicted within the image may be most likely associated with a hand detected at that pixel. Once the hands are identified at box 1335, regression vectors extending from the locations of the hands to the locations of corresponding heads may be determined. In some implementations, hand-to-head regression vectors may be generated for each of the hands depicted within the inventory area at a time of the event or during a duration of the event. In some other implementations, however, hand-to-head regression vectors may be generated for hands that are within or beyond a predetermined range (e.g., distance) of the location of the event in three-dimensional space, or within or beyond a predetermined range (e.g., number of pixels) of the location of the event within an image.

At box 1345, whether any of the hand-to-head regression vectors generated at box 1340 points to the actor having the highest confidence score is determined. Where a hand-to-head regression vector points to the same head as an event-to-head regression vector associated with the event, e.g., a head of an actor having a highest confidence score, then the event-to-head regression vector generated for the actor or the confidence score in the actor may be determined to be erroneous or unreliable. In many instances, it is unlikely that an actor having one hand at a location of an event, e.g., executing the event by engaging with one or more items at that location, would have another hand detected in a location remote from the location of an event, particularly where a range, a distance or a number of pixels between the location at which the hand is detected and the location of the event is substantially lengthy, e.g., beyond a predetermined threshold. Therefore, where an event-to-head regression vector having a highest confidence score and a hand-to-head regression vector point to the same actor, the event-to-head regression vector may likely have been determined in error. Where a hand-to-head regression vector points generated for a hand detected beyond the predetermined threshold range, distance or number of pixels points to an actor other than the actor associated with the event-to-head regression vector having the highest confidence score, however, the event-to-head regression vector and/or the confidence score in the actor may be upgraded accordingly.

If any of the hand-to-head regression vectors points to the actor, thereby signifying that a detected hand within an image is most likely associated with a head of an actor that is also most likely associated with the event, then the process advances to box 1350, where a single actor may be identified as associated with the event by one or more alternate (e.g., manual or automatic) techniques, such as a visual evaluation of one or more images by a human operator, or in any other manner, and the process ends. If none of the hand-to-head regression vectors generated or determined for each of the hands depicted within the inventory area points to an actor other than the actor having the highest confidence score, however, then the process advances to box 1360, where the actor having the highest confidence score is associated with the event, and the process ends.

Referring to FIGS. 14A through 14F, views of aspects of one system for associating events with actors using digital imagery and machine learning in accordance with implementations of the present disclosure are shown. Except where otherwise noted, reference numerals preceded by the number "14" shown in FIGS. 14A through 14F indicate components or features that are similar to components or features having reference numerals preceded by the number "12" shown in FIGS. 12A through 12, by the number "10" shown in FIG. 10, by the number "9" shown in FIGS. 9A through 9C, by the number "8" shown in FIGS. 8A and 8B, by the number "7" shown in FIGS. 7A through 7C, by the number "5" shown in FIGS. 5A through 5E, by the number "4" shown in FIGS. 4A through 4E, by the number "2" shown in FIG. 2A or 2B, by the number "1" shown in FIGS. 1A through 1J.

Figure 14A:
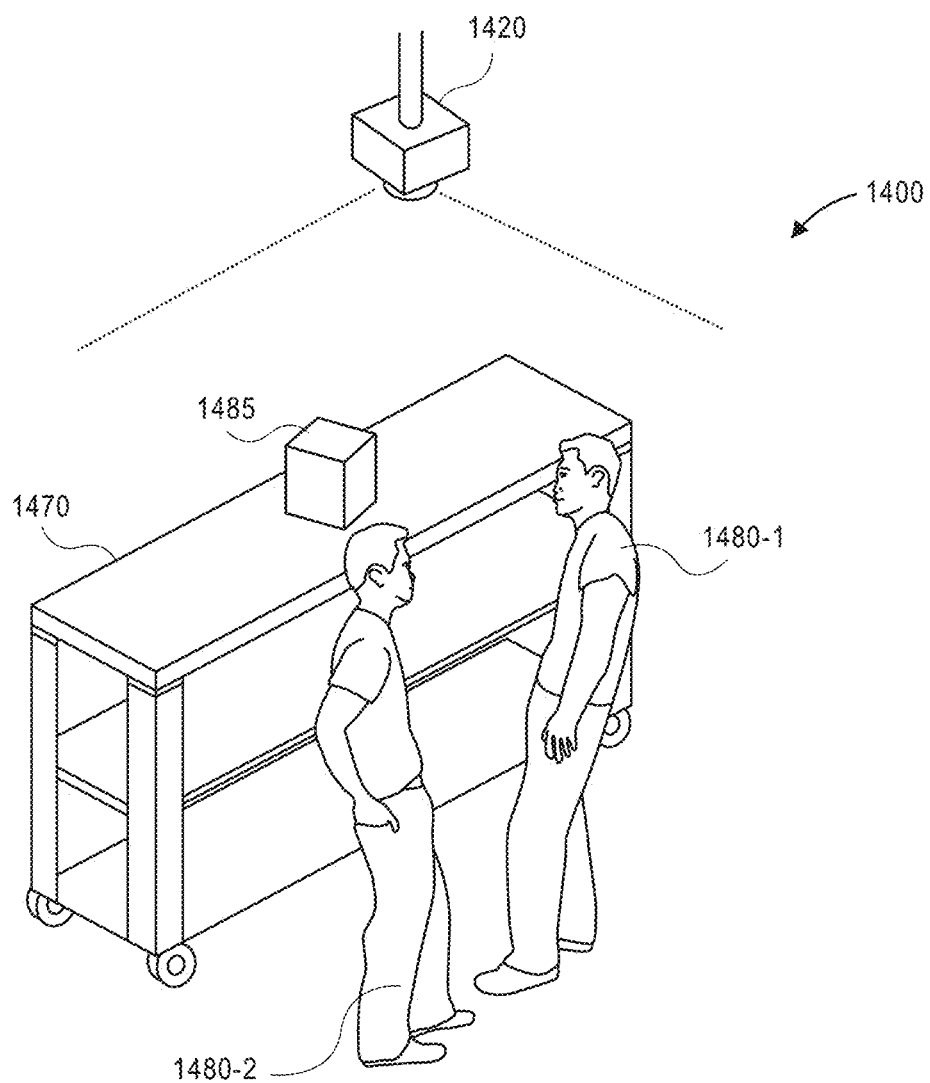
FIGS. 14A through 14F are views of aspects of one system for associating events with actors using digital imagery and machine learning in accordance with implementations of the present disclosure.

As is shown in FIG. 14A, the system 1400 includes a scene 1410 (e.g., a materials handling facility) having an imaging device 1420 (e.g., a digital camera) and a storage unit 1470 with an item 1485 on the storage unit 1470. Additionally, actors 1480-1, 1480-2 are within a vicinity of the shelving unit 1470, and each is partially or entirely within the field of view of the imaging device 1420, which has a top view of the shelving unit 1470. Alternatively, the system 1400 may include any number of other imaging devices, in addition to the imaging device 1420, and such imaging devices may include all or portions of the storage unit 1470 or surrounding areas within their respective fields of view.

Figure 14B:
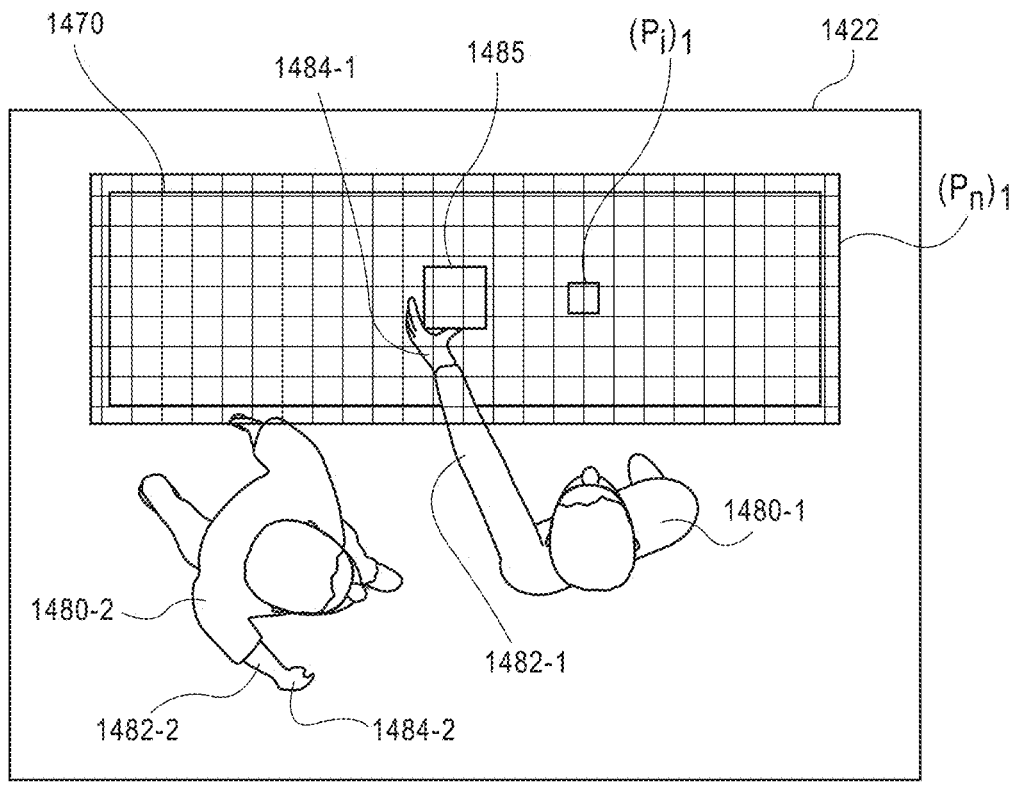

As is shown in FIG. 14B, an arm 1482-1 and a hand 1484-1 of the actor 1480-1, and an arm 1482-2 and a hand 1484-2 of the actor 1480-2 are visible within the image 1422. The actor 1480-1 extends the arm 1482-1 and the hand 1484-1 toward the item 1485, while the actor 1480-2 is in motion with the arm 1482-2 and a head 1484-2 that do not extend toward the storage unit 1470.

As is also shown in FIG. 14B, a plurality of event-to-head regression vectors or other values may be calculated based on an image 1422 captured using the imaging device 1420. The image 1422 depicts the actors 1480-1, 1480-2, the storage unit 1470 and the item 1485 thereon. As is further shown in FIG. 14B, for each pixel $(P_i)_1$ of a set of pixels $(P_n)_1$, a regression vector identifies a location of a head depicted within the image 1422 that would be most likely associated with an event that occurred at the pixel $(P_i)_1$ at a time that the image 1422 was captured. For example, the regression vectors generated for each pixel $(P_i)_1$ may include values $(P_i)_1 = (x_j, y_j, C_{ij})_1$, where $x_j, y_j$ are coordinates of a centroid or other aspect of a head j of an actor within the image 1422 that is most likely associated with a hypothetical event occurring at pixel $(P_i)_1$, and where $C_{ij}$ is a confidence score or other metric indicative of confidence in a determination that the head j of the actor is associated with the hypothetical event occurring at the pixel $(P_i)_1$. The regression vectors may be determined in any manner, such as by providing the image 1422 as an input to one or more machine learning systems or techniques, which may be operated on the imaging device 1420 or in any other location, such as in a "cloud"-based environment.

As is shown in FIG. 14B, the values $x_j, y_j, C_{ij}$ are calculated for each of the pixels in the set of pixels $(P_n)_1$, which corresponds to regions of the storage unit 1470 where events are likely to occur. Alternatively, the values $x_j, y_j, C$ may be calculated for all of the pixels depicted in the image 1422, or for any other set of such pixels.

Figure 14C:
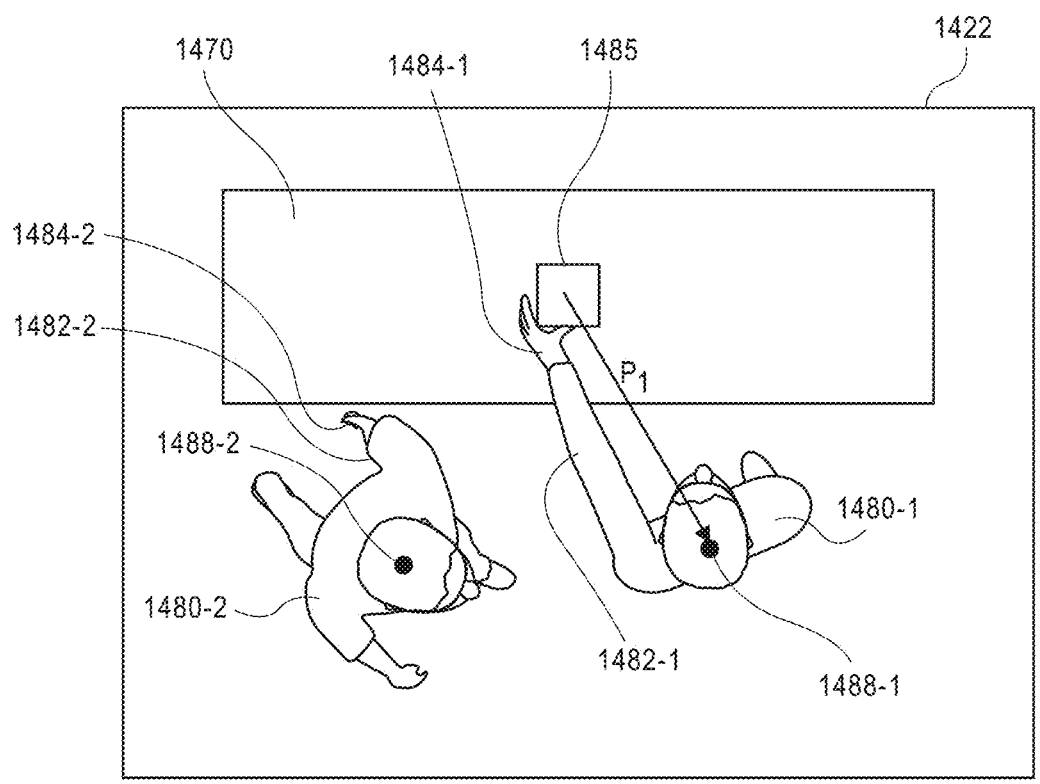

As is shown in FIG. 14C, in response to detecting an event involving the item 1485, a regression vector $P_i$ is identified based on the location of the item 1485. The regression vector $P_i$ extends from a location of a pixel corresponding to the item 1485 to a location of a pixel corresponding to the head 1488-1 of the actor 1480-1, and has a highest confidence score among other regression vectors, e.g., regression vectors (not shown in FIG. 14C) extending from locations of pixels corresponding to the item 1485 to locations of pixels corresponding to heads or other body parts of other actors.

Figure 14D:
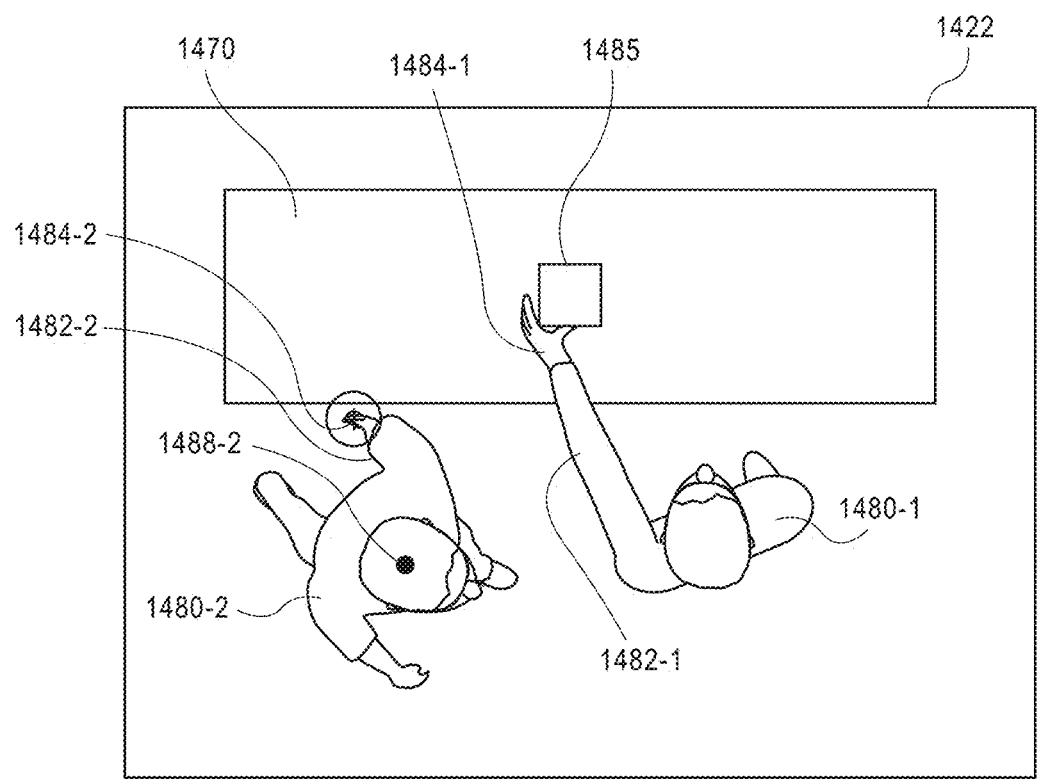

In accordance with implementations of the present disclosure, where confidence scores in event-to-head (or other event-to-body part) regression vectors identify an actor as associated with an event, such as where a given event-to-head regression vector has a highest confidence score among other event-to-head regression vectors, one or more other regression vectors, e.g., a hand-to-head regression vector, may be generated and used to confirm or reject an identification of the actor as associated with an event, or to upgrade or downgrade a level of confidence in the actor. As is shown in FIG. 14D, the hand 1484-1 of the actor 1480-1 is detected as within a vicinity of the storage unit 1470 during a duration of the event involving the item 1485.

Figure 14E:
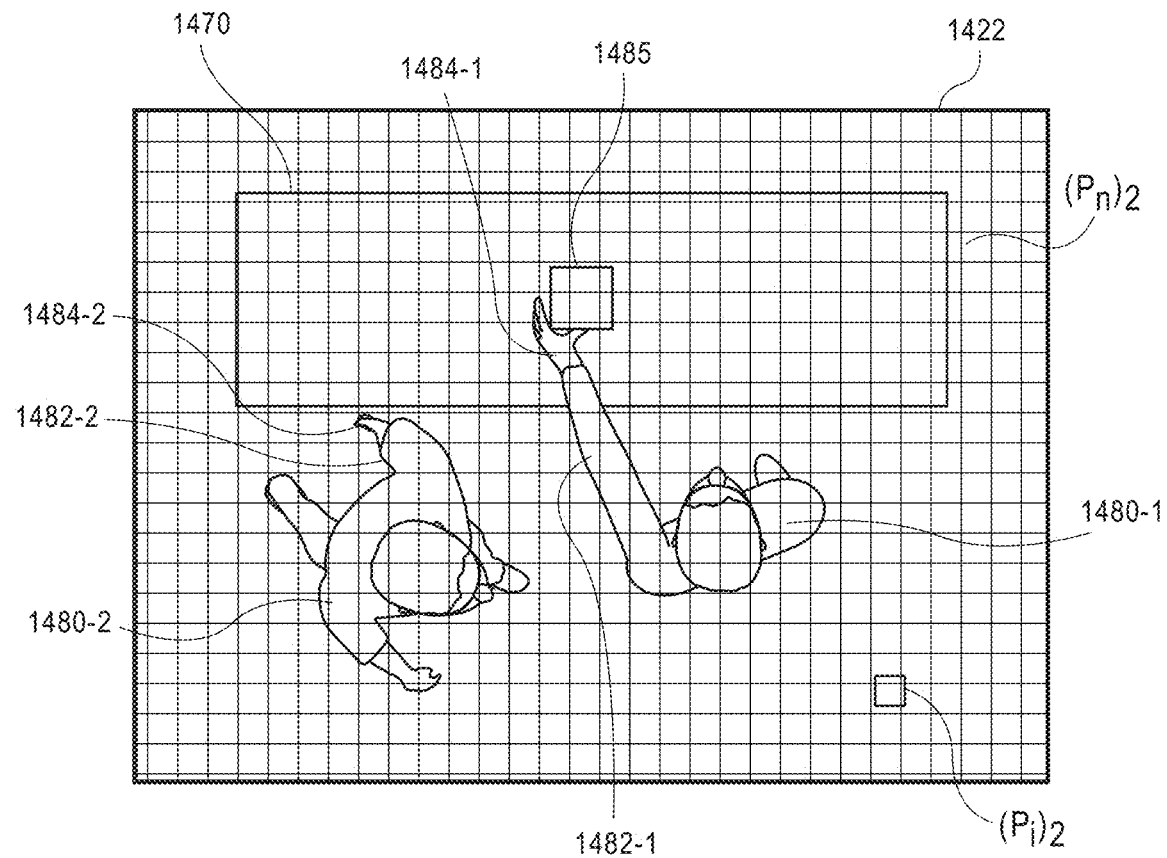

As is shown in FIG. 14E, for each pixel $(P_i)_2$ of a set of pixels $(P_n)_2$, regression vectors identify locations within the image 1422 that would be most likely represent a head associated with a hand detected at the pixel $(P_i)_2$ at a time that the image 1422 was captured. For example, the regression vectors generated for each pixel $(P_i)_2$ may include values $(P_i)_2=(x_j, y_j, C_{ij})_2$, where $x_j$, $y_j$ are coordinates of a centroid or other aspect of a head j of an actor within the image 1422 that is most likely associated with a hypothetical hand detected at pixel $(P_i)_2$, and where C is a confidence score or other metric indicative of confidence in a determination that the head j of the actor is associated with the hypothetical hand detected at the pixel $(P_i)_2$. The regression vectors may be determined in any manner, e.g., by processor units provided on the imaging device 1420 or in any other location, such as in a "cloud"-based environment.

As is shown in FIG. 14E, the values $x_j$, $y_j$, $C_{ij}$ are calculated for each of the pixels in the set of pixels $(P_n)_2$, which substantially covers the image 1422 in its entirety. Alternatively, the values $x_j$, $y_j$, $C_{ij}$ may be calculated for a set of pixels including fewer than all of the pixels depicted in the image 1422, or for any other set of such pixels.

Figure 14F:
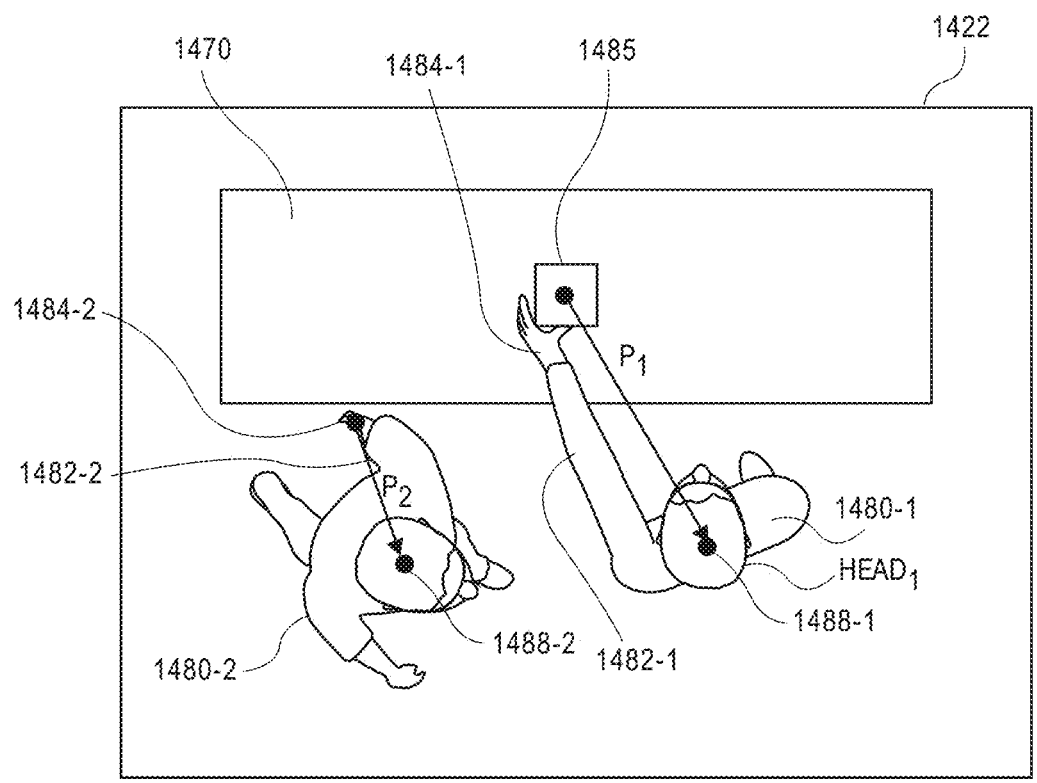

As is shown in FIG. 14F, a hand-to-head regression vector $P_i$ is determined to extend from the location of the detected hand 1484-2 of the actor 1480-2 to the location of the head 1488-2 of the actor 1480-2 within the vicinity of the storage unit 1470. In some implementations, hand-to-head regression vectors may be determined for each hand detected within the image 1422, including but not limited to hands of the actors 1480-1, 1480-2 other than the hand 1484-1, 1484-2. Alternatively, hand-to-head regression vectors may be determined only for hands that are detected within a predetermined range, distance or number of pixels of a location of pixels corresponding to an event, e.g., the item 1485, or for hands that are detected beyond a predetermined range, distance or number of pixels of a location of pixels corresponding to the event.

As is further shown in FIG. 14F, the hand-to-head regression vector $P_2$ diverges sufficiently from the event-to-head regression vector $P_i$, and points to the actor 1480-2. Therefore, the actor 1480-1, and not the actor 1480-2, may be confirmed as being associated with the event involving the item 1485. Alternatively, a level of confidence in a determination that the actor 1480-1, and not the actor 1480-2, is associated with the event may be upgraded or increased accordingly upon determining that the regression vector $P_2$ points to the head 1488-2 of the actor 1480-2, and not to the head 1488-1 of the actor 1480-1. Because the hand-to-head regression vector $P_2$ points to the head 1488-2 of the actor 1480-2, and not the head 1488-1 of the actor 1480-1, the hand-to-head regression vector $P_2$ thus acts as a confirmation of the event-to-head regression vector $P_i$, or the level of confidence in the determination that the actor 1480-1 is associated with the event.

Had the hand-to-head regression vector $P_2$ pointed toward the head 1488-1 of the actor 1480-1, and not the head 1488-2 of the actor 1480-2, thereby increasing a likelihood that the actor 1480-1 was doing something other than executing the event involving the item 1485. The divergent conclusions associated with the event-to-head regression vector $P_i$ and the hand-to-head regression vector $P_2$ suggests that at least one of the event-to-head regression vector $P_i$ or the hand-to-head regression vector $P_2$ is in error, for it is unlikely that a detected hand that is remote from the location of the item 1485 is associated with the actor 1480-1 if the event involving the item 1485 is also associated with the actor 1480-1, particularly where the detected hand not associated with the event, viz., the hand 1484-2, is located at a sufficiently great distance from the item 1485. Therefore, a determination that the actor 1480-1 executed the event involving the item 1485 based on the event-to-head regression vector $P_i$ may be rejected, or a level of confidence in the determination that the actor 1480-1 is associated with the event may be downgraded or decreased accordingly.

Although some of the implementations disclosed herein reference the association of human actors with respect to locations of events or items associated with such events, the systems and methods of the present disclosure are not so limited. For example, the systems and methods disclosed herein may be used to associate any non-human animals, as well as any number of machines or robots, with events or items of one or more types. The systems and methods disclosed herein are not limited to recognizing and detecting humans, or to associating humans with events or items of one or more types. Furthermore, although some of the implementations disclosed herein reference associating actors with interactions with specific items or items of a specific type in a commercial setting, e.g., within a materials handling facility such as a fulfillment center, the systems and methods of the present disclosure are likewise not so limited. Rather, the systems and methods disclosed herein may be utilized to associate actors with events occurring within any type of commercial or non-commercial settings, such as the live filming of performances in a stadium or theater, where one or more of the implementations disclosed herein may be used to determine whether an athlete's poses or gestures are associated with a foul ball, a slam dunk, a completed pass, or any other event associated with one or more sports or other activities.

Furthermore, although some of the implementations disclosed herein describe events involving the retrieval (e.g., picking) of items of one or more types from a storage unit or other location at a materials handling facility, the systems and methods disclosed herein are not so limited, and may be utilized to associate events involving the depositing (e.g., stowing) of items of one or more types at a storage unit or other location in accordance with the present disclosure. For example, where an event is identified as having occurred at a location, imaging data captured by one or more cameras prior to, during and after the event may be identified and processed to associate pixels of such imaging data with body parts of actors at or near the location at a time of the event based on such imaging data. Trajectories or tracklets of such actors may be generated and used to determine which of such actors may have deposited an item of a given type at the location, in a manner that is similar but reciprocal to one or more of the processes discussed above.

Additionally, although some of the implementations described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIGS. 3, 6, 11A and 11B, or 13, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount. Although the invention has been described and illustrated with respect to illustrative implementations thereof, the foregoing and various other additions and omissions may be made therein and thereto without departing from the spirit and scope of the present disclosure.

What is claimed is:

1. A system comprising:
   a first digital camera comprising a first processor unit and a first optical sensor, wherein the first digital camera has a first field of view;
   a second digital camera comprising a second processor unit and a second optical sensor, wherein the second digital camera has a second field of view;
   a storage unit comprising a shelf, wherein at least a portion of the shelf is within the first field of view and the second field of view;
   at least one event sensor associated with the shelf; and
   a server in communication with at least the first digital camera, the second digital camera and the at least one event sensor, wherein the server is programmed with one or more sets of instructions that, when executed by the server, cause the server to at least:
   receive, from the at least one event sensor, an indication that an event involving at least one item has occurred at a location on the shelf for a duration;
   determine that the location on the shelf is within the first field of view and the second field of view;
   in response to determining that the location of the first inventory area is within the first field of view and the second field of view,
   receive at least a first record from the first digital camera, wherein the first record comprises:
   locations of a plurality of heads depicted within a first image captured using the first digital camera;
   information associating portions of the first image with one of the locations of one of the plurality of heads; and
   confidence scores associated with the information associating the portions of the first image with the locations of the one of the plurality of heads depicted within the first image;
   receive a second record from the second digital camera, wherein the second record comprises:
   locations of a plurality of heads depicted within a second image captured using the second digital camera;
   information associating portions of the second image with the one of locations of one of the plurality of heads; and
   confidence scores associated with the information associating the portions of the second image with the locations of the one of the plurality of heads depicted within the second image;

determine a first regression vector from a location of a first head of a first actor depicted within the first image to a portion of the first image corresponding to the location on the shelf based at least in part on the first record;

determine a second regression vector from a location of a second head of a second actor depicted within the second image to a portion of the second image corresponding to the location on the shelf based at least in part on the second record;

determine a first confidence score in the first actor based at least in part on the first regression vector;

determine a second confidence score in the second actor based at least in part on the second regression vector;

determine that the first confidence score is greater than the second confidence score;

determine a third regression vector from a location of a first hand depicted within the first image to the location of the second head of the second actor within the second image;

in response to determining the third regression vector, determine that the first actor is associated with the event; and add one of the at least one item to a virtual shopping cart of the first actor.

2. The system of claim 1, wherein the first image is provided to an artificial neural network operating on the first processor unit as an input, wherein the artificial neural network is trained to detect at least a head depicted within an image, and wherein the first record is generated based at least in part on an output received from the artificial neural network in response to the input.

3. The system of claim 1, wherein the information associating the portions of the first image with one of the locations of one of the plurality of heads comprises:

information associating a first pixel of the first image corresponding to a portion on the shelf with a second pixel of the one of the first plurality of images corresponding to the one of the plurality of heads.

4. The system of claim 1, wherein the one or more sets of instructions, when executed by the server, further cause the server to at least:

determine that the location of the first hand depicted within the first image is beyond a predetermined threshold distance from the location on the shelf.

5. A method comprising:

receiving, from at least one sensor, an indication that an event has occurred at an event location of an inventory area at a first time;

in response to receiving the indication that the event has occurred at the event location of the inventory area, determining a first vector based at least in part on a first image of the event location captured at the first time, wherein the first vector extends from a first portion of the first image corresponding to the event location to a second portion of the first image corresponding to a first head of a first actor;

determining a first confidence score that the first actor is associated with the event based at least in part on the first vector;

detecting at least a first hand depicted within at least the first image;

determining a second vector based at least in part on the first image, wherein the second vector extends from a third portion of the first image corresponding to the first hand to one of:
the second portion of the first image; or
a fourth portion of the first image corresponding to a second head of a second actor; and determining that one of the first actor or the second actor is associated with the event based at least in part on the first confidence score and the second vector.

6. The method of claim 5, further comprising:

determining that the second vector extends from the third portion of the first image to the fourth portion of the first image, wherein determining that the one of the first actor or the second actor is associated with the event based at least in part on the first confidence score and the second vector comprises:
in response to determining that the second vector extends from the third portion of the first image to the fourth portion of the first image,
determining that the first actor is associated with the event.

7. The method of claim 5, further comprising:

determining that the second vector extends from the third portion of the first image to the fourth portion of the first image, wherein determining that the one of the first actor or the second actor is associated with the event based at least in part on the first confidence score and the second vector comprises:
in response to determining that the second vector extends from the third portion of the first image to the fourth portion of the first image,
generating a second confidence score, wherein generating the second confidence score comprises modifying the first confidence score;
determining that the second confidence score exceeds a threshold associated with the event; and
in response to determining that the second confidence score exceeds the threshold associated with the event,
determining that the first actor is associated with the event.

8. The method of claim 5, wherein detecting at least the first hand comprises at least one of:
determining that the first hand is beyond a threshold distance of the event location; or
determining that third portion of the first image is beyond a threshold number of pixels of the first portion of the first image.

9. The method of claim 5, wherein detecting at least the first hand comprises:
determining that the first hand is not at the event location.

10. The method of claim 5, further comprising:
determining that the second vector extends from the third portion of the first image to the second portion of the first image,
wherein determining that the one of the first actor or the second actor is associated with the event based at least in part on the first confidence score and the second vector comprises:
in response to determining that the second vector extends from the third portion of the first image to the second portion of the first image, determining that the second actor is associated with the event.

11. The method of claim 5, further comprising:
determining that the first confidence score does not exceed a predetermined threshold associated with the event; and
in response to determining that the first confidence score does not exceed the predetermined threshold associated with the event,
identifying a plurality of hands depicted within the first image based at least in part on the first record, wherein the first hand is one of the plurality of hands.

12. The method of claim 11, further comprising:
identifying a subset of the plurality of hands, wherein each of the plurality of hands of the subset is beyond a predetermined range of the event location, and wherein the first hand is one of the plurality of hands of the subset; and
determining vectors between each hand of the subset of the plurality of hands and one of a plurality of heads depicted within the first image,
wherein the plurality of heads comprises the first head and the second head.

13. The method of claim 5, further comprising:
providing the first image as an input to a machine learning tool operated by a processor unit of an imaging device that captured the first image; and
receiving an output from the machine learning tool,
wherein each of the first vector, the first confidence score and the second vector is determined based at least in part on the output.

14. The method of claim 5, further comprising:
determining a third vector based at least in part on the first image, wherein the third vector extends from the first portion of the first image to the fourth portion of the first image; and
determining a second confidence score that the second actor is associated with the event based at least in part on the third vector,
wherein determining that one of the first actor or the second actor is associated with the event is based at least in part on the first confidence score, the second confidence score, and the second vector.

15. The method of claim 5, further comprising:
providing the first image to a machine learning system as an input, wherein the machine learning system is operated by a first processor unit of an imaging device that captured the first image, and wherein the machine learning system is trained to detect the at least one body part within an image, to generate information associating portions of an image with a location of the at least one body part within the image, and to calculate a confidence score associated with the information; and
determining at least one output from the machine learning system,
wherein the first vector is generated by the first processor unit based at least in part on the output.

16. The method of claim 5, further comprising:
receiving a plurality of records over a network, wherein each of the records is received from one of a plurality of cameras, and wherein each of the plurality of records comprises data regarding one of a plurality of images captured at the first time;
storing the plurality of records in at least one data store; and in response to receiving the indication that the event has occurred at the event location of the inventory area at the first time,
determining that at least a first camera of the plurality of cameras included the event location in a field of view at the first time; and
retrieving a first record of the plurality of records from the at least one data store, wherein the first record was received from the first camera, wherein the first record comprises data regarding the first image, and
wherein each of the first vector, the first confidence score and the second vector is determined based at least in part on the first record.

17. The method of claim 5, wherein the at least one sensor is one of:
a first imaging device including at least the event location within a first field of view, wherein the first imaging device captured the first image;
a second imaging device including at least the event location within a second field of view;
a weight sensor provided in association with a surface at the event location;
an RFID receiver provided within a vicinity of the event location; or
a LIDAR receiver provided within a vicinity of the event location.

18. The method of claim 5, further comprising:
identifying an item associated with the event location;
determining that the item is associated with the event; and
storing an indication that at least one of the item has been added to a virtual shopping cart of the one of the first actor or the second actor or removed from the virtual shopping cart.

19. A system comprising:
a digital camera comprising an optical sensor having a field of view and a processor unit in communication with the optical sensor; and
a server in communication with at least the digital camera,
wherein the server is programmed with one or more sets of instructions that, when executed by the server, cause the server to at least:
determine that an event has occurred at a location;
identify a first regression vector from a portion of an image captured by the digital camera depicting a first body part of a first person to a portion of the image corresponding to the location of the event based at least in part on a record received from the digital camera;
identify a first confidence score in the first regression vector based at least in part on the image;
identify a second regression vector from a portion of the image depicting a second body part of a second person to the portion of the image corresponding to the location of the event based at least in part on the image;
identify a second confidence score in the second regression vector based at least in part on the image;
detect a third body part depicted within the image, wherein the third body part is a hand located beyond a predetermined distance of the location of the event;
identify a third regression vector from a portion of the image depicting the third body part to one of the portion of the image depicting the first body part or the portion of the image depicting the second body part;

determine that the third regression vector is from the portion of the image depicting the third body part to the portion of the image depicting the second body part; and in response to determining that the third regression vector is from the portion of the image depicting the third body part to the portion of the image depicting the second body part, determine that the first actor is associated with the event based at least in part on the first confidence score and the third regression vector.

20. The system of claim 19, wherein the one or more sets of instructions, when executed by the server, cause the server to at least:

detect a plurality of body parts depicted within the image, wherein each of the plurality of body parts is a hand; and identify a subset of the plurality of body parts, wherein each of the plurality of body parts of the subset is beyond the predetermined distance of the location of the event, and wherein the third body part is one of the plurality of body parts of the subset.

21. A method comprising:

receiving, from at least one sensor, an indication that an event has occurred at an event location of an inventory area at a first time;

in response to receiving the indication that the event has occurred at the event location of the inventory area, determining a first vector based at least in part on a first image of the event location captured at the first time, wherein the first vector extends from a first portion of the first image corresponding to the event location to a second portion of the first image corresponding to a first body part of a first actor;

determining a first confidence score that the first actor is associated with the event based at least in part on the first vector;

detecting at least a second body part depicted within at least the first image;

determining a second vector based at least in part on the first image, wherein the second vector extends from a third portion of the first image corresponding to the second body part to one of:

the second portion of the first image; or a fourth portion of the first image corresponding to a first body part of a second actor, wherein the first body part of the first actor and the first body part of the second actor are of a common type, and wherein the second body part is not of the common type; and determining that one of the first actor or the second actor is associated with the event based at least in part on the first confidence score and the second vector.

22. A system comprising:

a digital camera comprising an optical sensor having a field of view and a processor unit in communication with the optical sensor; and a server in communication with at least the digital camera, wherein the server is programmed with one or more sets of instructions that, when executed by the server, cause the server to at least:

determine that an event has occurred at a location;

identify a first regression vector from a portion of an image captured by the digital camera depicting a first body part of a first person to a portion of the image corresponding to the location of the event based at least in part on a record received from the digital camera;

identify a second regression vector from a portion of the image depicting a second body part of a second person to the portion of the image corresponding to the location of the event based at least in part on the image;

detect a third body part depicted within the image, wherein the third body part is a hand located beyond a predetermined distance of the location of the event;

identify a third regression vector from a portion of the image depicting the third body part to one of the portion of the image depicting the first body part or the portion of the image depicting the second body part;

determine that the third regression vector is from the portion of the image depicting the third body part to the portion of the image depicting the second body part; and in response to determining that the third regression vector is from the portion of the image depicting the third body part to the portion of the image depicting the second body part, determine that the first actor is associated with the event based at least in part on the third regression vector.

* * * * *